US010045153B2

(12) United States Patent
Smith et al.

(10) Patent No.: US 10,045,153 B2
(45) Date of Patent: Aug. 7, 2018

(54) ENHANCED LOCATION BASED INFORMATION ENABLING SELF-REALIZED LEASES

(71) Applicant: Rivada Research, LLC, Colorado Springs, CO (US)

(72) Inventors: Clint Smith, Warwick, NY (US); Pumima Surampudi, Katy, TX (US)

(73) Assignee: RIVADA RESEARCH, LLC, Colorado Springs, CO (US)

(*) Notice: Subject to any disclaimer, the term of this patent is extended or adjusted under 35 U.S.C. 154(b) by 0 days.

(21) Appl. No.: 15/465,781

(22) Filed: Mar. 22, 2017

(65) Prior Publication Data

US 2017/0287085 A1 Oct. 5, 2017

Related U.S. Application Data

(63) Continuation-in-part of application No. 15/431,274, filed on Feb. 13, 2017, which is a continuation of
(Continued)

(51) Int. Cl.
*H04W 24/00* (2009.01)
*H04W 4/02* (2018.01)
(Continued)

(52) U.S. Cl.
CPC .......... *H04W 4/023* (2013.01); *G01S 5/0252* (2013.01); *G01S 19/13* (2013.01); *G01S 19/48* (2013.01); *H04W 4/027* (2013.01); *H04W 4/08* (2013.01)

(58) Field of Classification Search
CPC ....... H04W 64/00; H04W 4/02; H04W 4/029; H04W 4/22; H04W 4/023; H04W 4/027; H04W 4/08; G01S 5/0009; G01S 5/0289
See application file for complete search history.

(56) References Cited

U.S. PATENT DOCUMENTS 6,397,147 B1 5/2002 Whitehead
7,764,231 B1 7/2010 Karr et al.
(Continued)

FOREIGN PATENT DOCUMENTS

CN 1688892 A 10/2005
CN 101305567 A 11/2008
(Continued)

OTHER PUBLICATIONS

Notification of Transmittal of the International Search Report and the Written Opinion of the International Search Authority, or the Declaration; issued for International Application No. PCT/US2016/036231 dated Sep. 21, 2016.
(Continued)

*Primary Examiner* — Nhan Le
(74) *Attorney, Agent, or Firm* — The Marbury Law Group, PLLC

(57) ABSTRACT

Methods, devices and systems for generating enhanced location information on or about a wireless device. A fixed wireless device (e.g., fixed infrastructure device) may be configured to determine its current location based on location information received from one or more other devices. For example, the fixed wireless device may determine its current three-dimensional location based on latitude coordinate values, longitude coordinate values, and altitude coordinate values received from a plurality of the devices that are in proximity to the fixed wireless device. The fixed wireless device may then dynamically determine whether the fixed wireless device should be included in a telecommunication resource lease based on its determined current location. The fixed wireless device may allocate its available radio frequency resources use by devices that subscribe to a different network in response to determining that it should be included in the telecommunication resource lease.

27 Claims, 41 Drawing Sheets

Related U.S. Application Data application No. 15/083,760, filed on Mar. 29, 2016, now Pat. No. 9,609,616, which is a continuation of application No. 14/823,244, filed on Aug. 11, 2015, now Pat. No. 9,332,386, which is a continuation of application No. 14/293,056, filed on Jun. 2, 2014, now Pat. No. 9,232,354, which is a continuation of application No. 13/585,125, filed on Aug. 14, 2012, now Pat. No. 8,787,944.

(60) Provisional application No. 62/311,777, filed on Mar. 22, 2016, provisional application No. 61/575,300, filed on Aug. 18, 2011, provisional application No. 61/573,636, filed on Sep. 9, 2011.

(51) Int. Cl.
*G01S 19/13* (2010.01)
*G01S 19/48* (2010.01)
*H04W 4/08* (2009.01)
*G01S 5/02* (2010.01)

(56) References Cited

U.S. PATENT DOCUMENTS

| | | |
|---|---|---|
| 8,224,984 B2 | 7/2012 | Bloch et al. |
| 8,359,643 B2 | 1/2013 | Low et al. |
| 8,508,361 B2 | 8/2013 | Paolini |
| 9,232,354 B2 | 1/2016 | Smith |
| 9,332,386 B2 | 5/2016 | Smith |
| 9,609,616 B2 | 3/2017 | Smith |
| 2004/0008138 A1 | 1/2004 | Hockley et al. |
| 2005/0221843 A1 | 10/2005 | Friedman et al. |
| 2007/0049266 A1 | 3/2007 | Voss |
| 2007/0232319 A1 | 10/2007 | Bells et al. |
| 2007/0275730 A1 | 11/2007 | Bienas et al. |
| 2008/0227462 A1 | 9/2008 | Freyman et al. |
| 2009/0047973 A1 | 2/2009 | MacNaughtan et al. |
| 2009/0079622 A1 | 3/2009 | Seshadri et al. |
| 2009/0149202 A1 | 6/2009 | Hill et al. |
| 2009/0209266 A1 | 8/2009 | Ha et al. |
| 2010/0062792 A1 | 3/2010 | Han et al. |
| 2010/0142448 A1* | 6/2010 | Schlicht ............... H04W 4/20 370/328 |
| 2011/0009130 A1 | 1/2011 | Wu |
| 2011/0025494 A1 | 2/2011 | Adcook et al. |
| 2011/0117934 A1 | 5/2011 | Mate |
| 2011/0124347 A1 | 5/2011 | Chen et al. |
| 2011/0151892 A1 | 6/2011 | Vengroff et al. |
| 2011/0171973 A1 | 7/2011 | Beck et al. |
| 2011/0227788 A1 | 9/2011 | Lundgren et al. |
| 2011/0276556 A1 | 11/2011 | Meler et al. |
| 2011/0288771 A1 | 11/2011 | Mazium et al. |
| 2012/0052836 A1 | 3/2012 | Buratti et al. |
| 2012/0286997 A1 | 11/2012 | Lin et al. |
| 2013/0030931 A1 | 1/2013 | Moshfeghi |
| 2013/0231130 A1 | 9/2013 | Cherian et al. |
| 2013/0281115 A1 | 10/2013 | Dupray et al. |
| 2014/0080514 A1 | 3/2014 | Das et al. |
| 2014/0273920 A1 | 9/2014 | Smith |
| 2014/0368382 A1 | 12/2014 | Vartanian et al. |

FOREIGN PATENT DOCUMENTS

| | | |
|---|---|---|
| CN | 101720058 A | 6/2010 |
| JP | 2005-331423 A | 12/2005 |
| JP | 2010-69910 A | 4/2010 |
| WO | 2004008171 A1 | 1/2004 |
| WO | 2011/037214 A1 | 3/2011 |
| WO | 2013-025824 A1 | 2/2013 |

OTHER PUBLICATIONS

Chinese Office Action Decision of Rejection for Chinese Application No. 201280050710.4 entitled Method and System for Providing Enhanced Location Based Information for Wireless Handsets:, dated May 5, 2016.
PCT Notification of Transmittal of the International Search Report and the Written Opinion of the International Searching Authority, International Application No. PCT/US2016/028240; dated Jul. 26, 2016.
First Office Action Issued by State Intellectual Property Office for Chinese Application No. 201280050710.4 dated Oct. 31, 2014.
Mexican Office Action Issued by the Mexican Patent Office for Mexican Application No. MX/a/2014/001745 dated May 19, 2015.
Japanese Office Action Issued by the Japanese Patent Office for Japanese Application No. 2014-526179 dated May 12, 2015 corresponding to PCT/US2012/050981.
Russian Office Action Issued by the Russian Patent Office for Russian Application No. 2014109421/07(014916) dated May 16, 2015 corresponding to PCT/US2012/050981.
Chinese Office Action Issued by the Chinese Patent Office for Chinese Application No. 201280050710.4 dated Mar. 20, 2015.
Communication Pursuant to Rules 70(2) and 70a(2) EPC Issued by the European Patent Office for European Application No. 12824068.6-1812 dated Mar. 5, 2015.
Extended European Search Report Issued by the European Patent Office for European Application No. 12824068.6-1812 dated Feb. 16, 2015.
International Search Report and Written Opinion issued in PCT Application No. PCT/US2012/050981 dated Jan. 29, 2013.
International Preliminary Report on Patentability and Written Opinion for PCT/US2012/050981 dated Feb. 18, 2014.
Zyren, "Overview of the 3GPP Long Term Evolution Physical Layer", Freescale Semiconductor, 3GPPEVOLUTIONWPP, pp. 1-27, (Jul. 2007).
Keithley, "OFDM.MIMO Master Class Understanding the Physical Layer Principles of WPLAN, WMAX and LTE", www.keithley.com, pp. 1-119, (2004).
Xiong, et al. "SecureAngle: Improving Wireless Security Using Angle-of-Arrival Information", Hotnets, pp. 1-6, (Oct. 20-21, 2010).
3GPP, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9)", 3GPP TS 36.305, V9.3.0, pp. 1-52, (Jun. 2010).
MultiService Forum, MSF Whitepaper on Location Services in LTE Networks, MultiService Forum, MSF-TR-SERVICES-005-FINAL, pp. 1-19, (2009).
"Comments of Motorola Mobility, Inc. and Motorola Solutions, Inc.," before the Federal Communications Commission, Washington, DC 20554, Matter of *Wireless E911 Location Accuracy Requirements* (PS Docket No. 07-114) vs *E911 Requirements for IP-Enabled Service Providers* (WC Docket No, 05-196), pp. 1-20, (Jan. 19, 2011).
3GPP, "3rd Generation Partnership Project; Technical Specification Group Core Network; Universal Geographical Area Description (GAD), (Release 1999)", 3G TS 23.032, V3.1.0 pp. 1-29, (Mar. 2000).
3GPP, "LTE; Evolved Universal Terrestrial Radio Access (E-UTRA); Physical Layer Procedures (3GPP TS 36.213 version 10.1.0 Release 10)", ETSI TS 136 213 V10.1.0 pp. 1-117 (Apr. 2011).
3GPP, "LTE; Evolved Universal Terrestrial Radio Access (E-UTRA); LTE Positioning Protocol (LPP) (3GPP TS 36.355 version 10.1.0 Release 10)", ETSI TS 136 355, V10.0.0 pp. 1-115 (Jan. 2011).
3GPP, LTE; NAS Signaling for Control Plane LCS in Evolved Packet System (EPS), (3GPP TS 24.171 version 9.0.0 Release 9) ETSI TS 124 171, V9.0.0, pp. 1-19, (Apr. 2010).

* cited by examiner

Multiple Layer
Antenna

US 10,045,153 B2

ENHANCED LOCATION BASED INFORMATION ENABLING SELF-REALIZED LEASES

CROSS REFERENCE TO RELATED PATENT APPLICATIONS

This application claims the benefit of priority to U.S. Provisional Patent Application Ser. No. 62/311,777 entitled "Enhanced Location Based Information Enabling Self-Realized Leases" filed on Mar. 22, 2016, and is a continuation in part of U.S. patent application Ser. No. 15/431,274 entitled "Methods and Systems for Providing Enhanced Location Based Information for Wireless Handsets" filed on Feb. 13, 2017, which is a continuation of U.S. patent application Ser. No. 15/083,760 entitled "Method and System for Providing Enhanced Location Based Information for Wireless Handsets" filed Mar. 30, 2016, which is a continuation of U.S. patent application Ser. No. 14/823,244 entitled "Method and System for Providing Enhanced Location Based Information for Wireless Handsets" filed Aug. 11, 2015 and issued May 3, 2016 as U.S. Pat. No. 9,332,386, which is a continuation of U.S. patent application Ser. No. 14/293,056 entitled "Method and System for Providing Enhanced Location Based Information for Wireless Handsets" filed Jun. 2, 2014 and issued Jan. 5, 2016 as U.S. Pat. No. 9,232,354, which is a continuation of U.S. patent application Ser. No. 13/585,125 entitled "Method and System for Providing Enhanced Location Based Information for Wireless Handsets" filed Aug. 14, 2012 and issued Jul. 22, 2014 as U.S. Pat. No. 8,787,944, which claims the benefit of priority of U.S. Provisional Application No. 61/575,300, entitled "Method and System for Providing Enhanced Location Based Information for Wireless Handsets" filed Aug. 18, 2011, and U.S. Provisional Application No. 61/573,636, entitled "Method and System for Providing Enhanced Location Based Information for Wireless Handsets" filed Sep. 9, 2011, the entire contents of all of which are hereby incorporated by reference for all purposes.

BACKGROUND

Wireless communication technologies and mobile electronic devices (e.g., cellular phones, tablets, laptops, etc.) have grown in popularity and use over the past several years. To keep pace with increased consumer demands, mobile electronic devices have become more powerful and feature rich, and now commonly include global positioning system (GPS) receivers, sensors, and many other components for connecting users to friends, work, leisure activities and entertainment. However, despite these advancements, mobile devices remain lacking in their ability to provide effective location based services, information, or communications. As mobile devices and technologies continue to grow in popularity and use, generating enhanced location information for mobile devices is expected to become an important and challenging design criterion for mobile device manufactures and network engineers.

SUMMARY

The various aspects include methods of using an enhanced location based service (eLBS) in a fixed wireless device, including determining, via a processor of the fixed wireless device, a location of the fixed wireless device based on location information received from one or more other devices, and dynamically determining, via the processor, whether the fixed wireless device may be included in a telecommunication resource lease based on the determined location. In an aspect, determining the location of the fixed wireless device based on the location information received from the one or more other devices includes determining an approximate location of the fixed wireless device, grouping the fixed wireless device with the one or more other devices based on their proximity to the fixed wireless device to form a communication group, sending the determined approximate location of the fixed wireless device to the one or more other devices in the communication group, receiving the location information in the fixed wireless device from the one or more other devices, and determining a more precise location of the fixed wireless device based on the determined approximate location and the location information received from the fixed wireless device. In an aspect, dynamically determining whether the fixed wireless device may be included in the telecommunication resource lease based on the determined location includes determining whether the fixed wireless device may be included in the telecommunication resource lease based on the determined more precise location.

In a further aspect, determining the location of the fixed wireless device based on the location information received from the one or more other devices includes determining a three-dimensional location of the fixed wireless device based on a latitude coordinate value, a longitude coordinate value, and an altitude coordinate value received from each of the one or more other devices, and dynamically determining whether the fixed wireless device may be included in the telecommunication resource lease based on the determined location includes determining whether the fixed wireless device may be included in the telecommunication resource lease based on the determined three-dimensional location of the fixed wireless device. In a further aspect, the fixed wireless device is one of a small cell, a femtocell, a WiFi access node, or a beacon. In a further aspect, dynamically determining whether the fixed wireless device may be included in the telecommunication resource lease based on the determined location includes determining whether to activate a service of the fixed wireless device based on the determined location.

In a further aspect, the fixed wireless device is included in a first network, and dynamically determining whether the fixed wireless device may be included in the telecommunication resource lease based on the determined location includes dynamically determining whether the fixed wireless device should allocate radio frequency resources for use by wireless devices that subscribe to a second network based on the determined location. In a further aspect, determining the location of the fixed wireless device based on the location information received from the one or more other devices includes determining, via the processor, whether the fixed wireless device is able to acquire satellite signals and navigation data from a geospatial system, collecting location information from one or more devices in a communication group in response to determining that the fixed wireless device is not able to acquire satellite signals or navigation data from the geospatial system, and computing more precise location information for the fixed wireless device based on the location information collected from the one or more devices in the communication group, and dynamically determining whether the fixed wireless device may be included in the telecommunication resource lease based on the determined location includes determining whether to include the fixed wireless device in the telecommunication resource lease based on the more precise location information.

In a further aspect, determining the location of the fixed wireless device based on the location information received from the one or more other devices includes determining, via the processor, whether information obtained via a geospatial system of the fixed wireless device is accurate, collecting location information from one or more devices in a communication group in response to determining that the information obtained via the geospatial system of the fixed wireless device is not accurate, and computing more precise location information for the fixed wireless device based on the location information collected from the one or more devices in the communication group, and dynamically determining whether the fixed wireless device may be included in the telecommunication resource lease based on the determined location includes determining whether to include the fixed wireless device in the telecommunication resource lease based on the more precise location information. In a further aspect, determining the location of the fixed wireless device based on the location information received from the one or more other devices includes obtaining location information for a current location of the fixed wireless device via a first connection to a data network, in which the first connection is not a cellular data uplink transmission path, determining a variance between the received location information and a fixed wireless device determined location, determining whether the variance exceeds a threshold value, collecting location information from a plurality of devices in a communication group in response to determining that the variance exceeds the threshold value, computing more precise location information for the fixed wireless device based on the location information collected from the plurality of devices in the communication group, and dynamically determining whether the fixed wireless device may be included in the telecommunication resource lease based on the determined location includes determining whether to include the fixed wireless device in the telecommunication resource lease based on the more precise location information. In a further aspect, allocating radio frequency resources of the fixed wireless device for use by devices that subscribe to a different network in response to determining that the fixed wireless device should be included in the telecommunication resource lease based on the determined location.

Further aspects include a fixed wireless device that includes a processor configured with processor-executable instructions to perform operations that may include determining a location of the fixed wireless device based on location information received from one or more other devices, and dynamically determining whether the fixed wireless device may be included in a telecommunication resource lease based on the determined location.

In an aspect, the processor may be configured with processor-executable instructions to perform operations such that determining the location of the fixed wireless device based on the location information received from the one or more other devices includes determining an approximate location of the fixed wireless device, grouping the fixed wireless device with the one or more other devices based on their proximity to the fixed wireless device to form a communication group, sending the determined approximate location of the fixed wireless device to the one or more other devices in the communication group, receiving the location information in the fixed wireless device from the one or more other devices, and determining a more precise location of the fixed wireless device based on the determined approximate location and the location information received from the fixed wireless device, and dynamically determining whether the fixed wireless device may be included in the telecommunication resource lease based on the determined location includes determining whether the fixed wireless device may be included in the telecommunication resource lease based on the determined more precise location.

In a further aspect, the processor may be configured with processor-executable instructions to perform operations such that determining the location of the fixed wireless device based on the location information received from the one or more other devices includes determining a three-dimensional location of the fixed wireless device based on a latitude coordinate value, a longitude coordinate value, and an altitude coordinate value received from each of the one or more other devices, and dynamically determining whether the fixed wireless device may be included in the telecommunication resource lease based on the determined location includes determining whether the fixed wireless device may be included in the telecommunication resource lease based on the determined three-dimensional location of the fixed wireless device. In a further aspect, the fixed wireless device is one of a small cell, a femtocell, a WiFi access node, or a beacon.

In a further aspect, the processor may be configured with processor-executable instructions to perform operations such that dynamically determining whether the fixed wireless device may be included in the telecommunication resource lease based on the determined location includes determining whether to activate a service of the fixed wireless device based on the determined location. In a further aspect, the fixed wireless device is included in a first network, and the processor may be configured with processor-executable instructions to perform operations such that dynamically determining whether the fixed wireless device may be included in the telecommunication resource lease based on the determined location includes dynamically determining whether the fixed wireless device should allocate radio frequency resources for use by wireless devices that subscribe to a second network based on the determined location. In a further aspect, the processor may be configured with processor-executable instructions to perform operations such that determining the location of the fixed wireless device based on the location information received from the one or more other devices includes determining, via the processor, whether the fixed wireless device is able to acquire satellite signals and navigation data from a geospatial system, collecting location information from one or more devices in a communication group in response to determining that the fixed wireless device is not able to acquire satellite signals or navigation data from the geospatial system, and computing more precise location information for the fixed wireless device based on the location information collected from the one or more devices in the communication group, and dynamically determining whether the fixed wireless device may be included in the telecommunication resource lease based on the determined location includes determining whether to include the fixed wireless device in the telecommunication resource lease based on the more precise location information.

In a further aspect, the processor may be configured with processor-executable instructions to perform operations such that determining the location of the fixed wireless device based on the location information received from the one or more other devices includes determining, via the processor, whether information obtained via a geospatial system of the fixed wireless device is accurate, collecting location information from one or more devices in a communication group in response to determining that the information obtained via the geospatial system of the fixed wireless device is not accurate, and computing more precise location information for the fixed wireless device based on the location information collected from the one or more devices in the communication group, and dynamically determining whether the fixed wireless device may be included in the telecommunication resource lease based on the determined location includes determining whether to include the fixed wireless device in the telecommunication resource lease based on the more precise location information.

In a further aspect, the processor may be configured with processor-executable instructions to perform operations such that determining the location of the fixed wireless device based on the location information received from the one or more other devices includes obtaining location information for a current location of the fixed wireless device via a first connection to a data network, in which the first connection is not a cellular data uplink transmission path, determining a variance between the received location information and a fixed wireless device determined location, determining whether the variance exceeds a threshold value, collecting location information from a plurality of devices in a communication group in response to determining that the variance exceeds the threshold value, computing more precise location information for the fixed wireless device based on the location information collected from the plurality of devices in the communication group, and dynamically determining whether the fixed wireless device may be included in the telecommunication resource lease based on the determined location includes determining whether to include the fixed wireless device in the telecommunication resource lease based on the more precise location information. In a further aspect, the processor may be configured with processor-executable instructions to perform operations further including allocating radio frequency resources of the fixed wireless device for use by devices that subscribe to a different network in response to determining that the fixed wireless device should be included in the telecommunication resource lease based on the determined location.

Further aspects include a non-transitory computer readable storage medium having stored thereon processor-executable software instructions configured to cause a computing device processor in a fixed wireless device to perform operations including determining a location of the fixed wireless device based on location information received from one or more other devices, and dynamically determining whether the fixed wireless device may be included in a telecommunication resource lease based on the determined location. In an aspect, the stored processor-executable instructions may be configured to cause a processor to perform operations such that determining the location of the fixed wireless device based on the location information received from the one or more other devices includes determining an approximate location of the fixed wireless device, grouping the fixed wireless device with the one or more other devices based on their proximity to the fixed wireless device to form a communication group, sending the determined approximate location of the fixed wireless device to the one or more other devices in the communication group, receiving the location information in the fixed wireless device from the one or more other devices, and determining a more precise location of the fixed wireless device based on the determined approximate location and the location information received from the fixed wireless device, and dynamically determining whether the fixed wireless device may be included in the telecommunication resource lease based on the determined location includes determining whether the fixed wireless device may be included in the telecommunication resource lease based on the determined more precise location.

In a further aspect, the stored processor-executable instructions may be configured to cause a processor to perform operations such that determining the location of the fixed wireless device based on the location information received from the one or more other devices includes determining a three-dimensional location of the fixed wireless device based on a latitude coordinate value, a longitude coordinate value, and an altitude coordinate value received from each of the one or more other devices, and dynamically determining whether the fixed wireless device may be included in the telecommunication resource lease based on the determined location includes determining whether the fixed wireless device may be included in the telecommunication resource lease based on the determined three-dimensional location of the fixed wireless device. In a further aspect, the fixed wireless device is one of a small cell, a femtocell, a WiFi access node, or a beacon.

In a further aspect, the stored processor-executable instructions may be configured to cause a processor to perform operations such that dynamically determining whether the fixed wireless device may be included in the telecommunication resource lease based on the determined location includes determining whether to activate a service of the fixed wireless device based on the determined location. In a further aspect, the stored processor-executable instructions may be configured to cause a processor to perform operations such that the fixed wireless device is included in a first network, and dynamically determining whether the fixed wireless device may be included in the telecommunication resource lease based on the determined location includes dynamically determining whether the fixed wireless device should allocate radio frequency resources for use by wireless devices that subscribe to a second network based on the determined location.

In a further aspect, the stored processor-executable instructions may be configured to cause a processor to perform operations such that determining the location of the fixed wireless device based on the location information received from the one or more other devices includes determining, via the processor, whether the fixed wireless device is able to acquire satellite signals and navigation data from a geospatial system, collecting location information from one or more devices in a communication group in response to determining that the fixed wireless device is not able to acquire satellite signals or navigation data from the geospatial system, and computing more precise location information for the fixed wireless device based on the location information collected from the one or more devices in the communication group, and dynamically determining whether the fixed wireless device may be included in the telecommunication resource lease based on the determined location includes determining whether to include the fixed wireless device in the telecommunication resource lease based on the more precise location information. In a further aspect, the stored processor-executable instructions may be configured to cause a processor to perform operations such that determining the location of the fixed wireless device based on the location information received from the one or more other devices includes determining, via the processor, whether information obtained via a geospatial system of the fixed wireless device is accurate, collecting location information from one or more devices in a communication group in response to determining that the information obtained via the geospatial system of the fixed wireless device is not accurate, and computing more precise location information for the fixed wireless device based on the location information collected from the one or more devices in the communication group, and dynamically determining whether the fixed wireless device may be included in the telecommunication resource lease based on the determined location includes determining whether to include the fixed wireless device in the telecommunication resource lease based on the more precise location information.

In a further aspect, the stored processor-executable instructions may be configured to cause a processor to perform operations such that determining the location of the fixed wireless device based on the location information received from the one or more other devices includes obtaining location information for a current location of the fixed wireless device via a first connection to a data network, in which the first connection is not a cellular data uplink transmission path, determining a variance between the received location information and a fixed wireless device determined location, determining whether the variance exceeds a threshold value, collecting location information from a plurality of devices in a communication group in response to determining that the variance exceeds the threshold value, computing more precise location information for the fixed wireless device based on the location information collected from the plurality of devices in the communication group, and dynamically determining whether the fixed wireless device may be included in the telecommunication resource lease based on the determined location includes determining whether to include the fixed wireless device in the telecommunication resource lease based on the more precise location information. In a further aspect, the stored processor-executable instructions may be configured to cause a processor to perform operations further including allocating radio frequency resources of the fixed wireless device for use by devices that subscribe to a different network in response to determining that the fixed wireless device should be included in the telecommunication resource lease based on the determined location.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
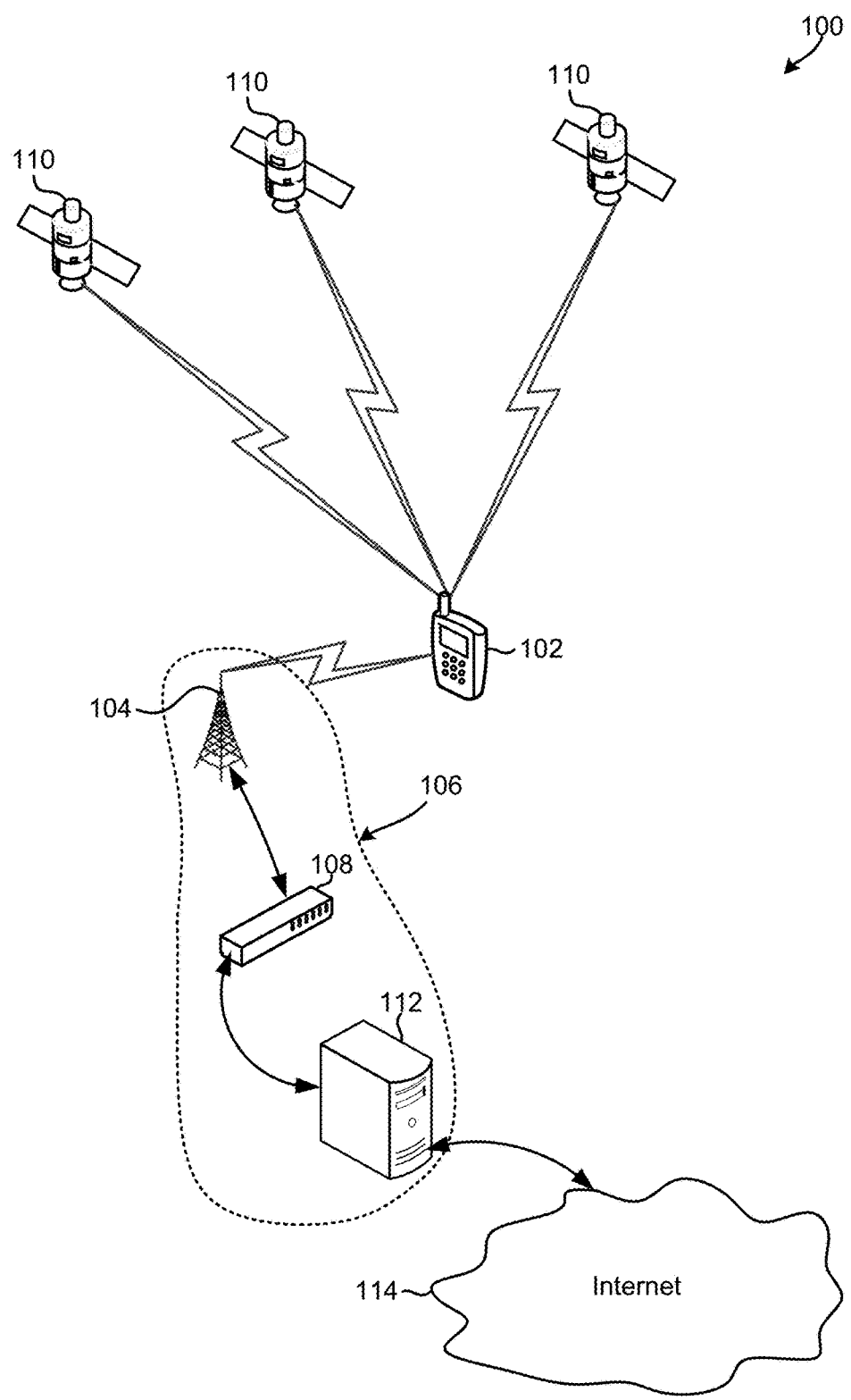
FIG. 1 is a communication system block diagram illustrating network components of an example telecommunication system suitable for use in a mobile-device centric approach for determining the location of a mobile device in accordance with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "cellular telephone," and "cell phone" are used interchangeably herein to refer to any one or all of cellular telephones, smartphones, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals. While the various embodiments are particularly useful in mobile devices, such as cellular telephones, which have limited battery life, the embodiments are generally useful in any computing device that may be used to wirelessly communicate information.

The term is "wireless network", "network", "cellular System", "cell tower" and "radio access point" may used generically and interchangeably to refer to any one of various wireless mobile systems. In an embodiment, wireless network may be a radio access point (e.g., a cell tower), which provides the radio link to the mobile device so that the mobile device can communicate with the core network.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), and land mobile radio (LMR). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

A number of different methods, technologies, solutions, and/or techniques (herein collectively "solutions") are currently available for determining the location of mobile device, any or all of which may be implemented by, included in, and/or used by the various embodiments. Such solutions include, e.g., global positioning system (GPS) based solutions, assisted GPS (A-GPS) solutions, and cell-based positioning solutions such as cell of origin (COO), time of arrival (TOA), observed time difference of arrival (OT-DOA), advanced forward link trilateration (AFLT), and angle of arrival (AOA). In various embodiments, such solutions may implemented in conjunction with one or more wireless communication technologies and/or networks, including wireless wide area networks (WWANs), wireless local area networks (WLANs), wireless personal area networks (WPANs), and other similar networks or technologies. By way of example, a WWAN may be a Code Division Multiple Access (CDMA) network, a Frequency Division Multiple Access (FDMA) network, an OFDMA network, a 3GPP LTE network, a WiMAX (IEEE 802.16) network, and so on. The WPAN may be a Bluetooth network, an IEEE 802.15x network, and so on. A WLAN may be an IEEE 802.11x network, and so on. A CDMA network may implement one or more radio access technologies (RATs) such as CDMA2000, Wideband-CDMA (W-CDMA), and so on.

Various embodiments discussed herein may generate, compute, and/or make use of location information pertaining to one or more mobile devices. Such location information may be useful for providing and/or implementing a variety of location-based services, including emergency location services, commercial location services, internal location services, and lawful intercept location services. By way of example: emergency location services may include services relating to the provision of location and/or identification information to emergency service personal and/or emergency systems (e.g., to 911 system); commercial location services may include any general or value-added service (e.g., asset tracking services, navigation services, location-based advertising services, etc); internal location services may include services pertaining to the management of the wireless service provider network (e.g., radio resource management services, message delivery services, paging services, call delivery services, services for providing position/location network enhancements, etc.); and lawful intercept location services may include any service that provides public safety and/or law enforcement agencies with identification and/or location information pertaining to a mobile device or a mobile device user. While the various embodiments are particularly useful in applications that fall within one or more of the categories/types of location based services discussed above, the embodiments are generally useful in any application or service that benefits from location information.

Modern mobile electronic devices (e.g., mobile phones) typically include one or more geospatial positioning systems/components for determining the geographic location of the mobile device. Location information obtained by these geospatial systems may be used by location-aware mobile software applications (e.g., Google® Maps, Yelp®, Twitter® Places, "Find my Friends" on Apple®, etc.) to provide users with information regarding the mobile device's physical location at a given point in time. In recent years, such location-based services and software applications have increased in popularity, and now enable mobile device users to navigate cities, read reviews of nearby restaurants and services, track assets or friends, obtain location-based safety advice, and/or take advantage of many other location-based services on their mobile devices.

Consumers of modern mobile devices now demand more advanced, robust, and feature-rich location-based services than that which is currently available on their mobile devices. However, despite many recent advances in mobile and wireless technologies, mobile devices remain lacking in their ability to provide their users/consumers with location based services that are accurate or powerful enough to meet the demands of these consumers. For example, while existing location-aware mobile software applications (e.g., "Find my Friends" on Apple®, Google® Latitude, etc.) enable a mobile device user to view the approximate geographical position of other mobile devices on a two-dimensional map, they lack the capability to accurately, efficiently and consistently pin point the precise location and/or position of the other mobile devices in all three dimensions and/or within a wireless communication network. The various embodiments overcome these and other limitations of existing solutions by collecting information from multiple mobile devices, generated more precise location information on or about one or more mobile devices, generating advanced three-dimensional location and position information on or about one or more mobile devices, and using the generated location/position information to provide mobile device users with more accurate, more powerful, and more reliable location based services.

One of the challenges associated with using geo-spatial positioning technology on a mobile device is that the mobile device's ability to acquire satellite signals and navigation data to calculate its geospatial location (called "performing a fix") may be hindered when the mobile device is indoors, below grade, and/or when the satellites are obstructed (e.g., by tall buildings, etc.). The presence of physical obstacles, such as metal beams or walls, may cause multipath interference and signal degradation of the wireless communication signals when the mobile device is indoors or in urban environments that include tall buildings or skyscrapers. In rural environments, the mobile device may not have sufficient access to satellite communications (e.g., to a global positioning system satellite) to effectively ascertain the mobile device's current location. These and other factors often cause existing geo-spatial technologies to function inaccurately and/or inconsistently on mobile devices, and hinder the mobile device user's ability to fully utilize location-aware mobile software applications and/or other location based services and applications on his/her mobile device.

Another problem with using existing geo-spatial positioning technologies is that position accuracy afforded by existing technologies is not sufficient for use in emergency services due to the relatively high level of position accuracy required by these services.

The various embodiments include improved location determination solutions that determine the location of a mobile device at the level of position accuracy which is suitable for use in emergency location services, commercial location services, internal location services, and lawful intercept location services.

Generally, there are three basic approaches for determining the location of mobile devices in a communication network: a mobile-device centric approach, a network centric approach and a hybrid approach that may include aspects of both the mobile device centric approach and the network centric approach.

FIG. 1 illustrates an example communication system 100 suitable for implementing a mobile-device centric approach for determining the location of a mobile device 102 in accordance with various embodiments. The mobile device 102 may include a global positioning system (GPS) receiver in communication with multiple geo-spatial positioning and navigation satellites 110 and a base tower 104 of a communication network 106. The mobile device 102 may receive (e.g., via the GPS receiver) radio signals emitted by the satellites 110, measure the time required for the signals to reach the mobile device 102, and use trilateration techniques to determine the geographical coordinates (e.g., latitude and longitude coordinates) of the mobile device 102. The mobile device 102 may send the geographical coordinates to the communication network 106 at various times and/or in response to various conditions or events, such as upon initial acquisition with the communication network 106, in response to network-based requests, in response to third party requests, etc.

In an embodiment, the communication network may be a cellular telephone network. A typical cellular telephone network includes a plurality of cellular base stations 104 coupled to a network operations center 108, which operates to connect voice and data calls between mobile devices 102 (e.g., mobile phones) and other network destinations, such as via telephone land lines (e.g., a POTS network, not shown) and the Internet 114. Communications between the mobile devices 102 and the cellular telephone network 11 may be accomplished via two-way wireless communication links, such as 4G, 3G, CDMA, TDMA, and other cellular telephone communication technologies. The network 106 may also include one or more servers 112 coupled to or within the network operations center 108 that provide connections to the Internet 114.

In various embodiments, the mobile device 102 may be configured to communicate with a radio access node, which can include any wireless base station or radio access point such as LTE, CDMA2000/EVDO, WCDMA/HSPA, IS-136, GSM, WiMax, WiFi, AMPS, DECT, TD-SCDMA, or TD-CDMA and switch, Land Mobile Radio (LMR) interoperability equipment, a satellite Fixed Service Satellite (FSS) for remote interconnection to the Internet and PSTN.

Figure 2:
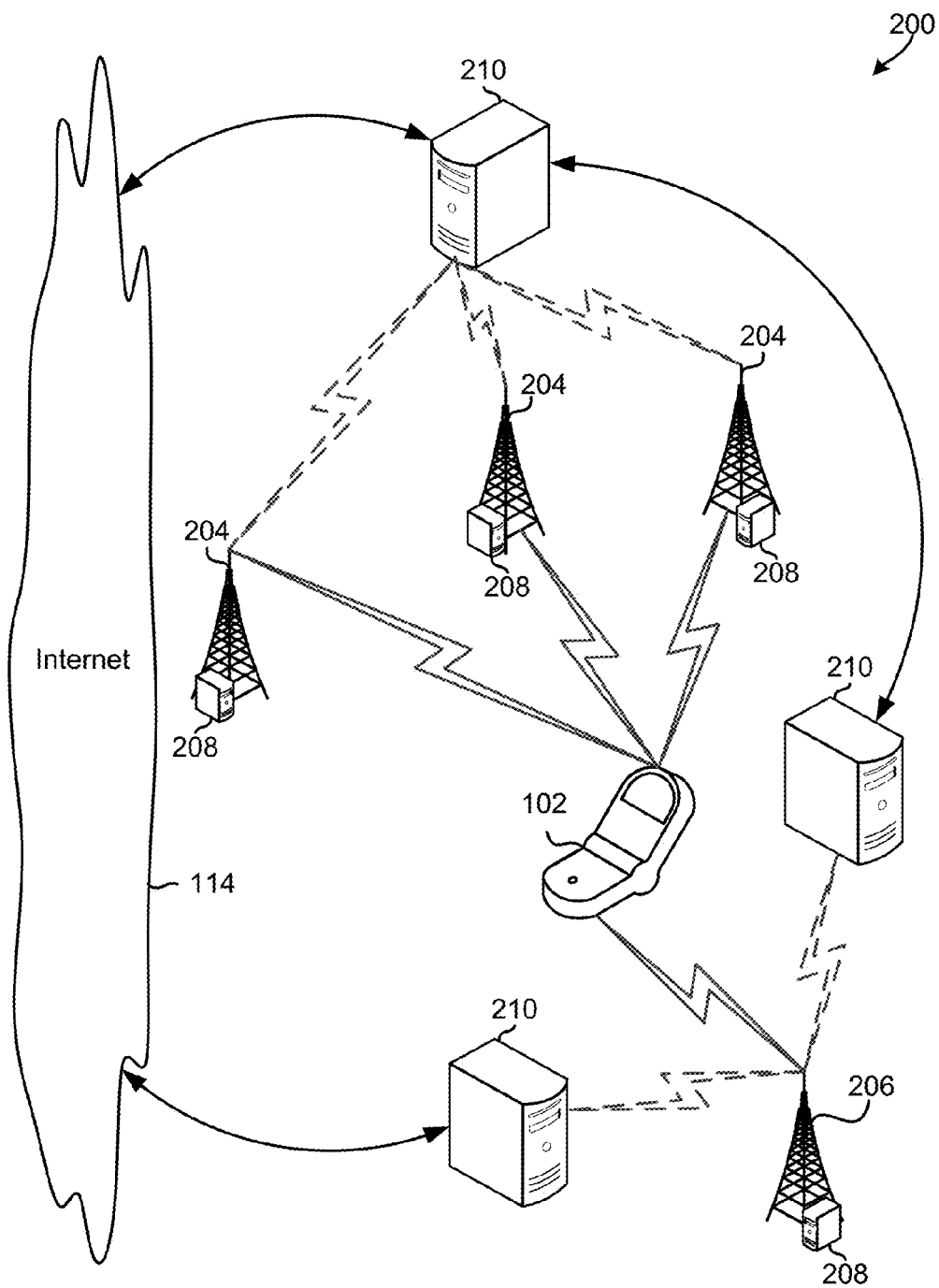
FIG. 2 is a communication system block diagram illustrating network components of an example telecommunication system suitable for use in a network centric approach for determining the location of a mobile device in accordance with various embodiments.

FIG. 2 illustrates an example communication system 200 suitable for implementing a network centric approach for determining the location of a mobile device 102 in accordance with various embodiments. The mobile device 102 may include a circuitry for wirelessly sending and receiving radio signals. The communication system 200 may include a plurality of radio access points 204, 206 having installed thereon additional radio equipment 208 for measuring the location of the mobile devices in the communication system. For example, the mobile device 102 may transmit radio signals for reception by one or more (e.g., typically three) radio access points 204, and the radio access points may receive the transmitted signals and measure the signal strength and/or radio energy of the received signals to identify the location of the mobile device 102.

In an embodiment, the radio access points 204 may be configured to determine the location of the mobile device relative to a known location of a network component, such as the illustrated radio access point 206. In this manner, the additional radio equipment 208 installed on the radio access points 204, 206 provides the communication system 200 with similar functionality as is provided by a GPS receiver for signals received from the mobile device. For example, the radio equipment on one or more of the radio access points 204 may measure how long it takes for the radio signal to travel from the mobile device 102 to another radio access point 206, and using trilateration techniques (e.g., time of arrival, angle of arrival, or a combination thereof), the mobile device 102 or a network server 210 may estimate the location of the mobile device 102 to within an accuracy of 100 to 300 meters. Once the network has estimated the latitude and longitude coordinates of the mobile device 102, this information can be used to determine the geo-spatial location of the mobile device 102, which may be communicated to other systems, servers or components via the Internet 114.

Various embodiments may implement and/or make use of a hybrid approach for determining the location of mobile devices in a communication network, which may include aspects of both the device-centric and the network-centric approaches discussed above with reference to FIGS. 1 and 2. For example, an embodiment may implement a hybrid approach in which the GPS capabilities of mobile devices, the measured signal strengths and/or radio energy of radio signals transmitted from the mobile devices, and known locations of network components are used in combination to estimate the locations of one or more mobile devices in a network. In a further embodiment, the mobile devices and/or network components (e.g., severs, radio access points, etc.) may be configured to dynamically determine which factors (e.g., radio signal strength, GPS, etc.) to measure and/or use in determining the location of the mobile devices.

Figure 3:
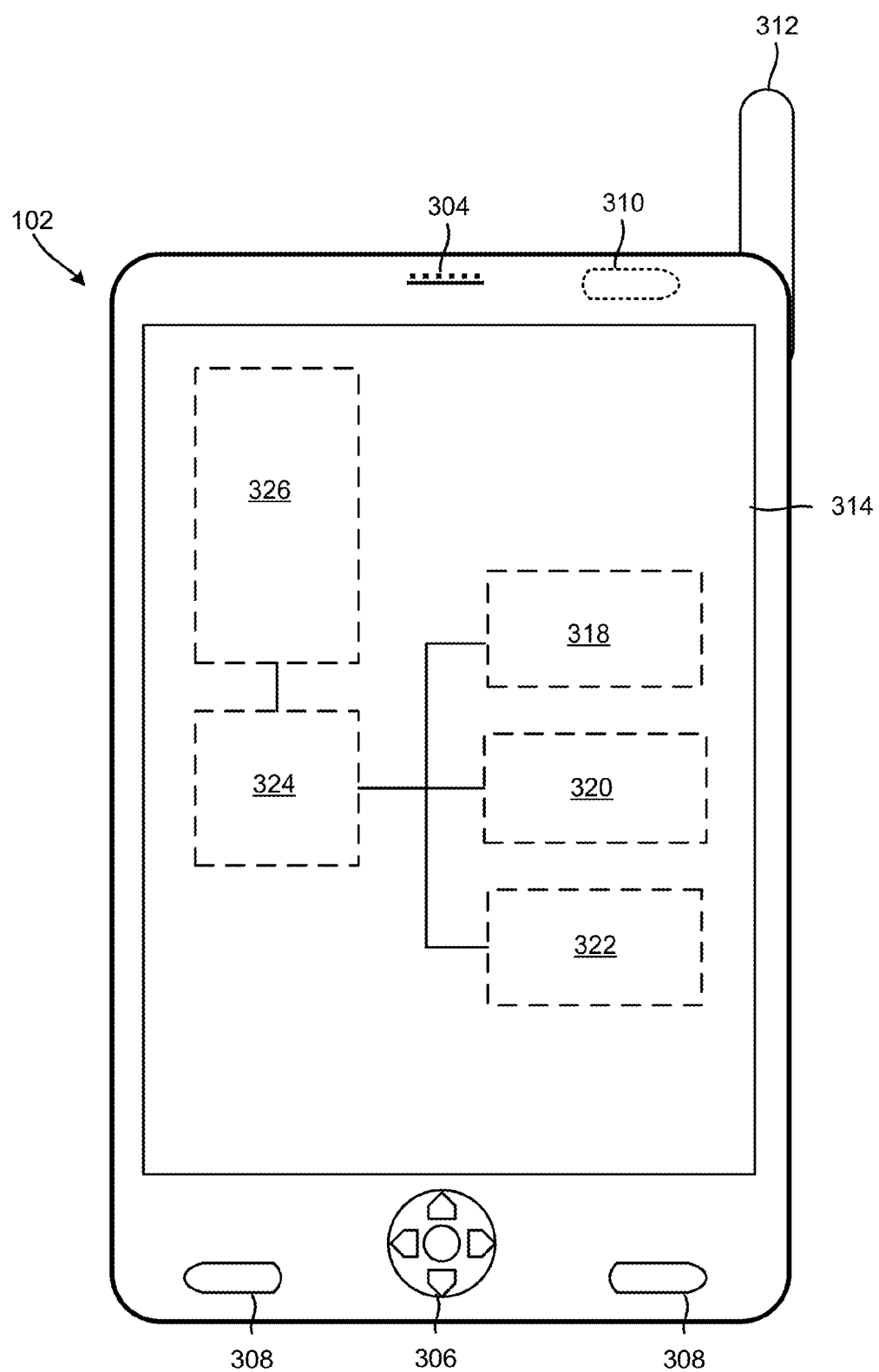
FIG. 3 is an illustration of an example mobile device suitable for use in grouping with other mobile devices and computing precise location information in accordance with the various embodiments.

FIG. 3 illustrates sample components of a mobile device in the form of a phone 102 that may be used with the various embodiments. The phone 102 may include a speaker 304, user input elements 306, microphones 308, an antenna 312 for sending and receiving electromagnetic radiation, an electronic display 314, a processor 324, a memory 326 and other well known components of modern electronic devices.

The phone 102 may also include one or more sensors 310 for monitoring physical conditions (e.g., location, motion, acceleration, orientation, altitude, etc.). The sensors may include any or all of a gyroscope, an accelerometer, a magnetometer, a magnetic compass, an altimeter, an odometer, and a pressure sensor. The sensors may also include various bio-sensors (e.g., heart rate monitor, body temperature sensor, carbon sensor, oxygen sensor, etc.) for collecting information pertaining to environment and/or user conditions. The sensors may also be external to the mobile device and paired or grouped to the mobile device via a wired or wireless connection (e.g., Bluetooth®, etc.). In embodiment, the mobile device 102 may include two or more of the same type of sensor (e.g., two accelerometers, etc.).

The phone 102 may also include a GSPS receiver 318 configured to receive GPS signals from GPS satellites to determine the geographic location of the phone 102. The phone 102 may also include circuitry 320 for transmitting wireless signals to radio access points and/or other network components. The phone 102 may further include other components/sensors 322 for determining the geographic position/location of the phone 102, such as components for determining the radio signal delays (e.g., with respect to cell-phone towers and/or cell sites), performing trilateration and/or multilateration operations, identifying proximity to known networks (e.g., Bluetooth® networks, WLAN networks, WiFi, etc.), and/or for implementing other known geographic location technologies.

The phone 102 may also include a system acquisition function configured to access and use information contained in a subscriber identity module (SIM), universal subscriber identity module (USIM), and/or preferred roaming list (PRL) to, for example, determine the order in which listed frequencies or channels will be attempted when the phone 102 is to acquire/connect to a wireless network or system. In various embodiments, the phone 102 may be configured to attempt to acquire network access (i.e., attempt to locate a channel or frequency with which it can access the wireless/communication network) at initial power-on and/or when a current channel or frequency is lost (which may occur for a variety of reasons).

The mobile device 102 may include pre-built in USIM, SIM, PRL or access point information. In an embodiment, the mobile device may be configured for first responders and/or public safety network by, for example, setting the incident radio system as the default and/or preferred communication system.

As mentioned above, despite recent advances in mobile and wireless communication technologies, determining the specific location of a mobile device in a wireless network remains a challenging task for a variety of reasons, including the variability of environmental conditions in which mobile devices are often used by consumers, deficiencies in existing technologies for computing and/or measuring location information on mobile devices, and the lack of uniform standards. For example, there is currently no universally accepted standard for implementing or providing location-based services. As a result, mobile device designers and wireless network operators, in conjunction with local public safety and third party providers, are using a variety of inefficient, incoherent, and sometimes incompatible methods, technologies, solutions, and/or techniques to determine the location of a mobile device and/or to provide location based services.

While there are no universally accepted standards for implementing or providing location-based services, there are certain requirements or standards associated with determining the location of a mobile device that may be of use in various embodiments. The U.S. Congress has mandated that cellular service providers configure their networks, communication systems and/or mobile devices so that the locations of mobile devices can be determined when a 911 call is placed. To implement Congress's mandate, the Federal Communications Commission (FCC) requested cellular service providers upgrade their systems in two phases (herein "Phase I" and "Phase II" respectively). While the level of precision/accuracy provided by these Phase I and II upgrades are generally inadequate for providing effective location based services that meet the demands of modern users of mobile devices, these upgrades provide a foundation from which more effective location based solutions may be built.

As mentioned above, the FCC requested cellular service providers upgrade their systems in two phases. In the first phase (Phase I), cellular service providers were to upgrade their systems so that emergency calls (e.g., 911 calls) are routed to the public service answering point (PSAP) closest to the cell-tower antenna with which the mobile device is connected, and so that PSAP call-takers can view the phone number of the mobile device and the location of the connecting cell-tower. The location of the connecting cell-tower may be used to identify the general location of the mobile device within a 3-6 mile radius.

In the second phase (Phase II), cellular service providers were to upgrade their systems so that PSAP call-takers could identify the location of the mobile device to within 300 meters. To meet these Phase II requirements, wireless service providers have implemented a variety of technologies, and depending on the technology used, can generally identify the location of the mobile device to within 50-300 meters. For example, on systems that have implemented a network-based solution (e.g., triangulation of nearby cell towers, etc.), the location of a mobile device can be determined within an accuracy of 100 meters 67% of the time, and to within an accuracy of 300 meters 95% of the time. On systems that have adopted a mobile device-based solution (e.g., embedded global positioning system receivers, etc.), the location of the mobile device may be determined to within 50 meters 67% of the time, and to within 150 meters 95% of the time.

Existing phase I and II solutions, alone, are not adequate for generating location information having sufficient accuracy or detail for use in providing accurate, powerful, and reliable location based services. Various embodiments may use some or all of the capabilities built into existing systems (e.g., as part of phase I and II upgrades, device-centric systems, network-centric systems, etc.), in conjunction with more advanced location determination techniques, to compute location information suitable for the advanced location based services demanded by today's consumers.

In addition to the three basic approaches discussed above, a number of different solutions are currently available for determining the location of mobile device, any or all of which may be implemented by and/or included in the various embodiments.

Most conventional location determination solutions use distance estimation techniques that are based on single-carrier signals, and one of the fundamental operations in ground-based (or network-centric) location determination solutions is timing estimation of a first-arrival path of a signal. That is, a single-carrier signal transmitted between a transceiver and a mobile device can be received via multiple paths (i.e., multipath), and the multiple paths of the signal can have different received powers and arrival times. The received signal may be cross-correlated to distinguish the multiple paths of the received signal. In this method it is generally assumed that the first-arrival path (e.g., first detected signal, strongest signal, etc.) is associated with the path traveling the shortest distance, and hence is the right value to use in estimating distance between the mobile device and the transceiver. Often, this first-arrival path is the strongest path due to zero or fewer reflections, relative to the other paths, between the transceiver and the mobile device.

In various embodiments, the first-arrival time of the identified first-arrival path may be used in addition to other parameters (e.g., an estimated signal transmission time and/or a time offset between clocks of the transceiver and the mobile device, etc.) to estimate distance between a mobile device and a network component (e.g., another mobile device, a transceiver, an access point, a base station, etc.). The first-arrival time may be estimated by the mobile device (e.g., based on the downlink received signal) or by the network component (e.g., based on an uplink received signal).

The location of the mobile device may also be determined by estimating the distance between the mobile device and a network component or other signal sources (e.g., a transceiver, ground or satellite-based signal sources, etc.). For example, the location of the mobile device may be determined by performing trilateration using estimated distances between multiple (e.g., three or more) transceivers and the mobile device.

Another location determination solution may include computing an observed time difference of arrival (OTDOA) value by measuring the timing of signals received from three network components (e.g., mobile devices, transceivers, access points, etc.). For example, a mobile device may be configured to compute two hyperbolas based on a time difference of arrival between a reference transceiver signal and signals of two neighbor transceivers. The intersection of the computed hyperbolas may define a position on the surface of the earth that may be used by various embodiments to determine the location of the mobile device.

The accuracy of such OTDOA solutions may be a function of the resolution of the time difference measurements and the geometry of the neighboring transceivers. As such, implementing an OTDOA solution may require determining the precise timing relationship between the neighboring transceivers. However, in existing asynchronous networks, this precise timing relationship may be difficult to ascertain.

In various embodiments, location measurement units (LMUs) may be added throughout a deployment region of an asynchronous network to measure/compute timing information for one or more network components (e.g., transceivers) relative to a high quality timing reference signal. For example, a mobile device or an LMU may determine the observed time difference between frame timing of transceiver signals, and the observed time difference may be sent to the transceiver or a radio network controller of the communication network to determine the location of the mobile device. The location of the mobile device may also be determined based on the observed time difference and assistance data (e.g., position of the reference and neighbor transceivers) received from the communication network.

Another location determination solution may include computing an uplink-time difference of arrival (U-TDOA) based on network measurements of the time of arrival of a known signal sent from the mobile device and received at multiple (e.g., four or more) LMUs. For example, LMUs may be positioned in the geographic vicinity of the mobile device to accurately measure the time of arrival of known signal bursts, and the location of the mobile device may be determined using hyperbolic trilateration based on the known geographical coordinates of the LMUs and the measured time-of-arrival values.

As discussed above, conventional location determination solutions are typically based on single-carrier signals. The various embodiments include a ground-based location determination solution based on multi-carrier signals. A location determination solution based on multi-carrier signals may improve the accuracy of the computed location information by, for example, improving the accuracy of the timing estimation (e.g., by expanding the bandwidth of cellular signals). Location determination solutions based on multiple carriers may be used in both the device-centric (e.g., mobile device-based) and network-centric (e.g., base station-based) approaches, and may be applied to both 3GPP and 3GPP2 wireless communication technologies.

In various embodiments, a mobile device may be configured to determine its geospatial location based on information collected from mobile device sensors (e.g. gyroscope, accelerometer, magnetometer, pressure sensor, etc.), information received from other mobile devices, and information received from network components in a communication system.

Figure 4A:
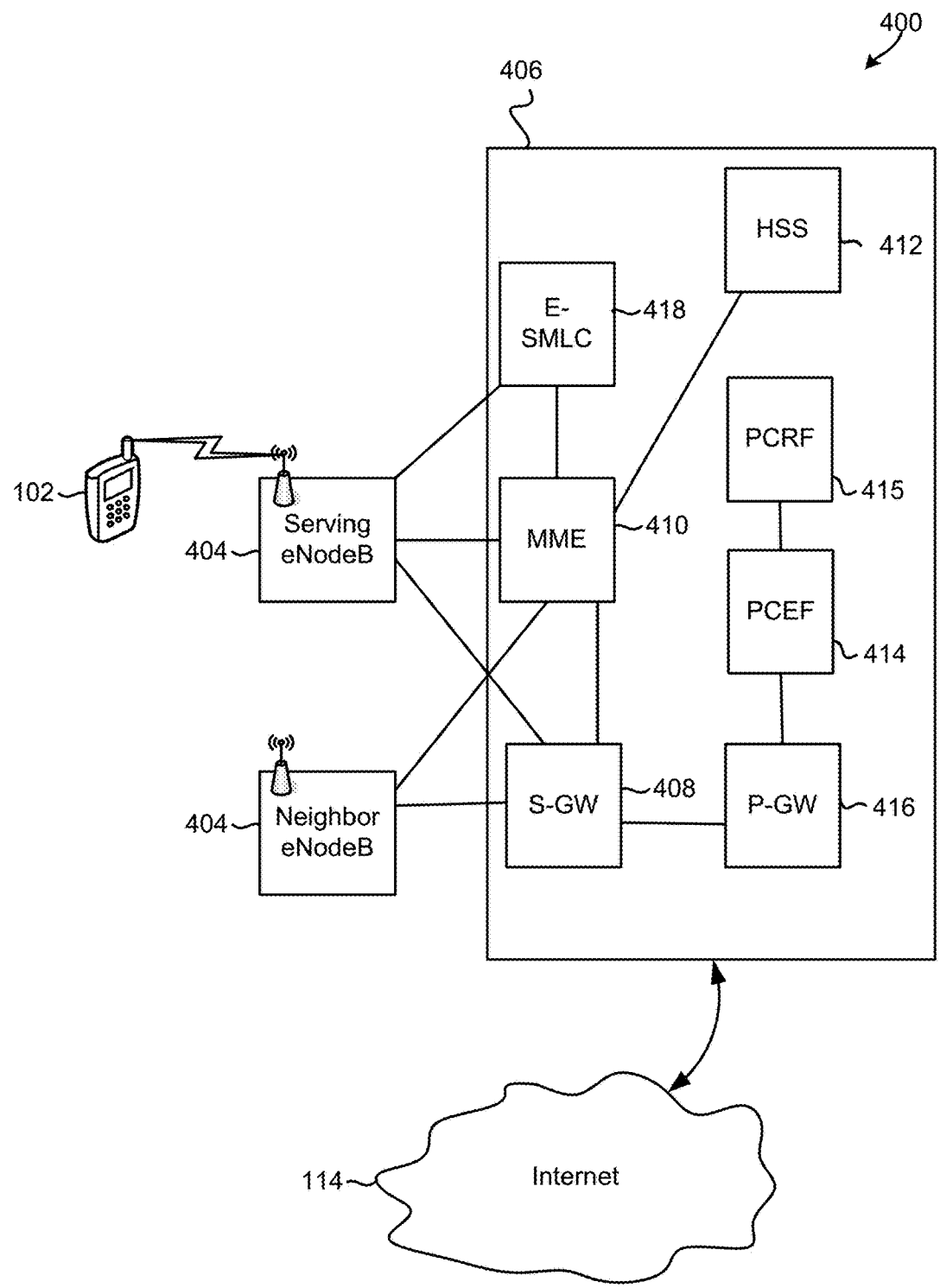
FIG. 4A is a communication system block diagram illustrating network components of an example LTE communication system suitable for use with various embodiments.

FIG. 4A illustrates an example communication system within which the various embodiments may be implemented. Generally, the mobile device 102 may be configured to send and receive communication signals to and from a network 406, and ultimately the Internet 114, using a variety of communication systems/technologies (e.g., GPRS, UMTS, LTE, cdmaOne, CDMA2000™). In the example illustrated in FIG. 4, long term evolution (LTE) data transmitted from the wireless device 102 is received by a eNodeB (eNB) 404 and sent to a serving gateway (S-GW) 408 located within the core network 406. The mobile device 102 or serving gateway 408 may also send signaling (control plane) information (e.g., information pertaining to security, authentication, etc.) to a mobility management entity (MME) 410.

The MME 410 may request user and subscription information from a home subscriber server (HSS) 412, perform various administrative tasks (e.g., user authentication, enforcement of roaming restrictions, etc.), and send various user and control information to the S-GW 408. The S-GW 408 may receive and store the information sent by the MME 410 (e.g., parameters of the IP bearer service, network internal routing information, etc.), generate data packets, and forward the data packets to a packet data network gateway (P-GW) 416. The P-GW 416 may process and forward the packets to a policy and control enforcement function (PCEF) 414 which receives the packets and requests charging/control policies for the connection from a policy and charging rules function (PCRF) 415. The PCRF 415 provides the PCEF 414 with policy rules that it enforces to control the bandwidth, the quality of service (QoS), and the characteristics of the data and services being communicated between the network (e.g., Internet, service network, etc.) and the mobile device 102. In an embodiment, the PCEF 414 may be a part of, or perform operations typically associated with, the P-GW 416. Detailed information about policy and charging enforcement function operations may be found in "3rd Generation Partnership Project Technical Specification Group Services and System Aspects, Policy and Charging Control Architecture," TS 23.203, the entire contents of which are incorporated herein by reference.

In an embodiment, the network 406 may also include an Evolved Serving Mobile Location Center (E-SMLC) 418. Generally, the E-SMLC 418 collects and maintains tracking information about the mobile device 102. The E-SMLC 418 may be configured to provide location services via a lightweight presentation protocol (LLP), which supports the provision of application services on top of TCP/IP networks. The E-SMLC 418 may send or receive (e.g., via LPP) almanac and/or assistance data to and from the MME 410 and/or eNB 404. The E-SMLC 418 may also forward external or network initiated location service requests to the MME 410.

In addition, the mobile device 102 may receive information from the serving eNodeB 404 via System Information Blocks that includes the neighbor cells to scan that are on the same system using the same frequencies or different frequencies, Home eNB (HeNB), in addition to CDMA, GERAN and UTRA cells.

Figure 4B:
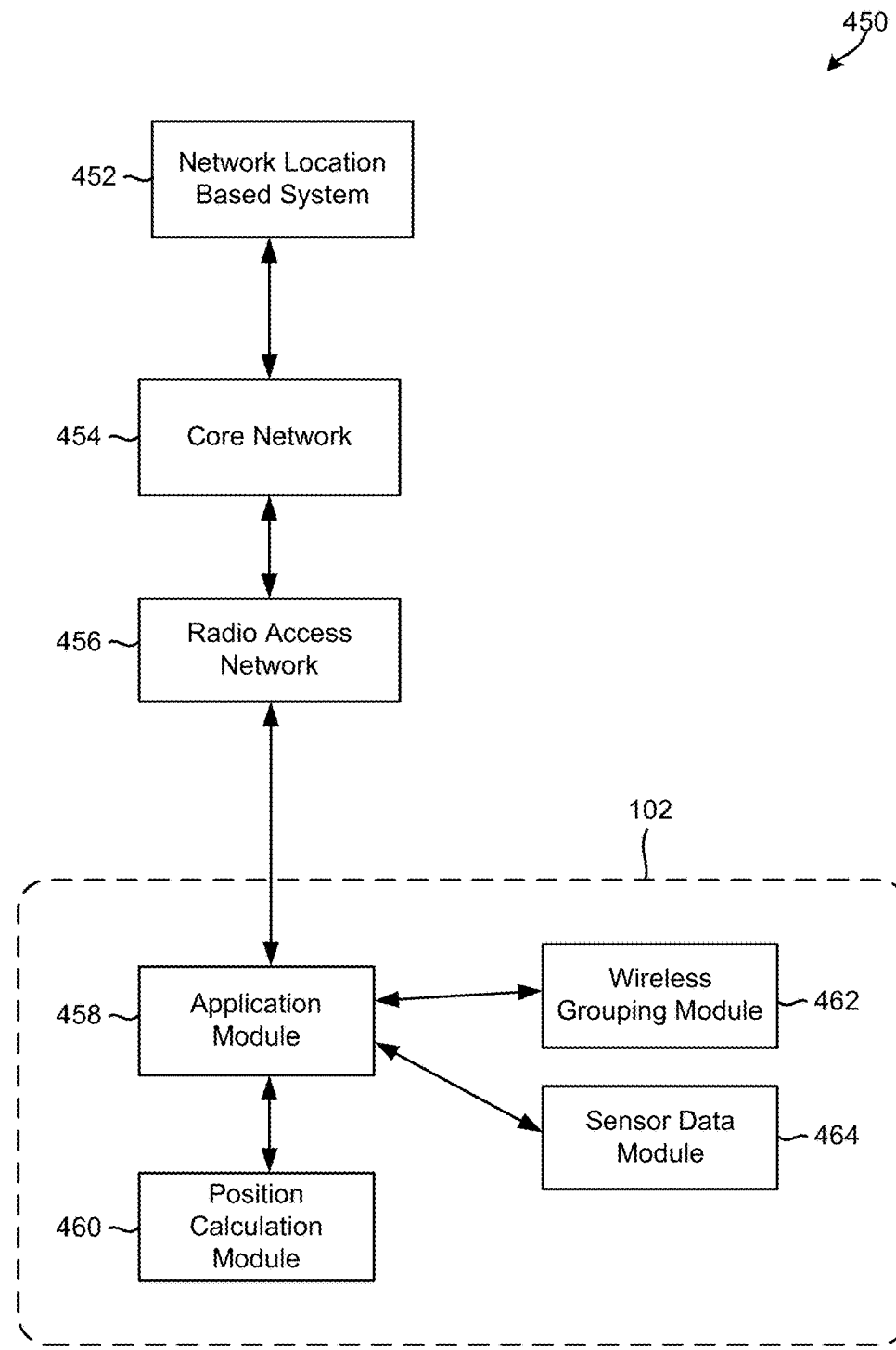
FIG. 4B is a block diagram illustrating logical components, communication links and information flows in an embodiment communication system.

FIG. 4B illustrates logical components, communication links, and information flows in an embodiment communication system 450 suitable for use in determining the location of the mobile device. The communication system 450 may include a network location based system 452, a core network 454, and a radio access network 456. The communication system 450 may also include an application module 458, a position calculation module 460, a wireless grouping module 462, and a sensor data module 464, any or all of which may be included in a mobile device 102. The application module 458 (e.g., client software) may request and receive location information from the network location based system 452 (e.g., through the core network 454 and the radio access network 456). Likewise, the network location based system 452 (or another client attached to, or within, the core network 454) may request and receive location information from the application module 458.

In various embodiments, the mobile device 102 may be configured to determine its geospatial location based on information collected from mobile device sensors (e.g. gyroscope, accelerometer, magnetometer, pressure sensor, etc.), information received from other mobile devices, and information received from network components in a communication system. In an embodiment, the collection and reporting of sensor information may be controlled/performed by the sensor data module 464. For example, the application module 458 may retrieve/receive sensor information from the sensor data module 464 and send the sensor information to the position calculation module 460 to compute the location of the mobile device locally for position updates and/or position augmentation. The application module 458 may also send the computed location information to the network location based system 452 and or other mobile devices.

As mentioned above, in various embodiments, the mobile device 102 may be configured to determine its geospatial location based on information collected from other mobile devices. In these embodiments, two or more mobile devices may be organized into groups. Each mobile device may also share its location information with the other mobile devices with which the mobile device is grouped. For example, mobile devices may be configured to share their current location and/or position information (e.g., latitude, longitude, altitude, velocity, etc.) and an estimate of a distance between themselves and a target mobile device with other mobile devices in their group.

In an embodiment, the grouping of mobile devices may be controlled by the wireless grouping module 462. For example, the application module 458 may retrieve wireless group information (e.g., information pertaining to the locations of other mobile devices) from the wireless grouping module 462, and send the group information to the position calculation module 460 to perform local calculations for position updates and/or position augmentation. In an embodiment, the position calculation module 460 may perform the local calculations based on both sensor information received from the sensor data module 464 and group information received from the wireless grouping module 462.

In an embodiment, the mobile device 102 may be configured to automatically share its location information with other mobile devices upon discovery of the other mobile devices. Mobile devices may augment their location information (e.g., position coordinates) with information received from other mobile devices within same geographic location, and in a controlled pseudo ad-hoc environment. Since the shared location information (e.g., latitude, longitude, altitude, velocity, etc.) involves a relatively small amount of data, in an embodiment the mobile devices may receive such information from a network server by in-band and or out-of-band signaling.

When implemented in a 3GPP-LTE network, the various embodiments may include an E-SMLC 418 component configured to send and receive location information (e.g., latitude, longitude, altitude, velocity, etc.) to and from the mobile devices, which may be achieved both on-net and off-net. The location information may be delivered in standard formats, such as those for cell-based or geographical co-ordinates, together with the estimated errors (uncertainty) of the location, position, altitude, and velocity of a mobile device and, if available, the positioning method (or the list of the methods) used to obtain the position estimate To aid in the determination of the locations of mobile devices, 3GPP-LTE networks have standardized several reference signals. Various embodiments may use these reference signals for timing based location and positioning solutions. Such reference signals may include the primary and secondary synchronization signals and the cell specific reference signals.

As mentioned above, two or more mobile devices may be organized into groups. Mobile devices within the same group may be part of the same network, or may be associated with different networks and/or network technologies. The mobile devices within the same group may also operate on different network operating systems (NOSs) and/or radio access networks (RANs).

Figure 5A:
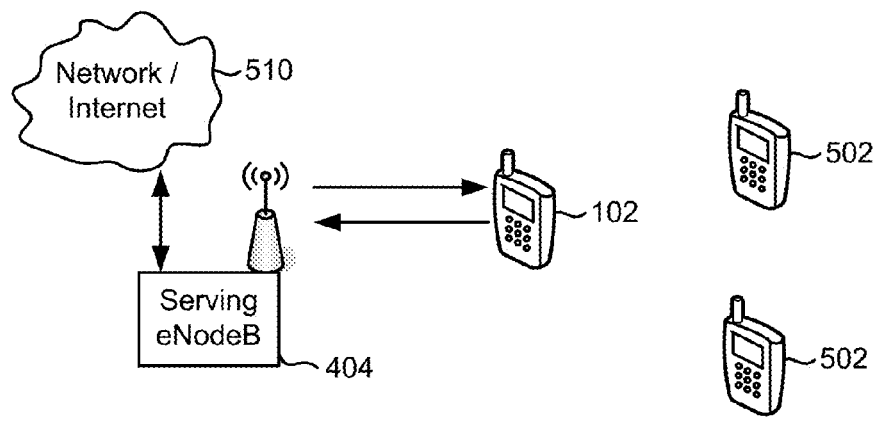
FIGS. 5A-5C are component block diagrams illustrating functional components, communication links, and information flows in an embodiment method of grouping mobile devices and sharing location information between grouped mobile devices.
Figure 5B:
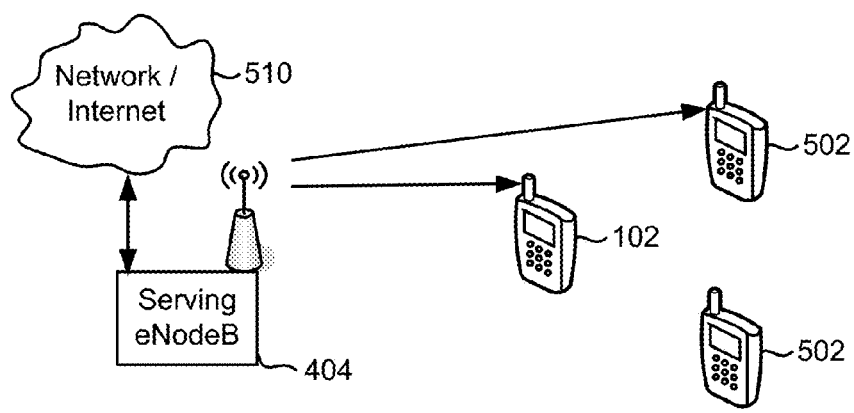
Figure 5C:
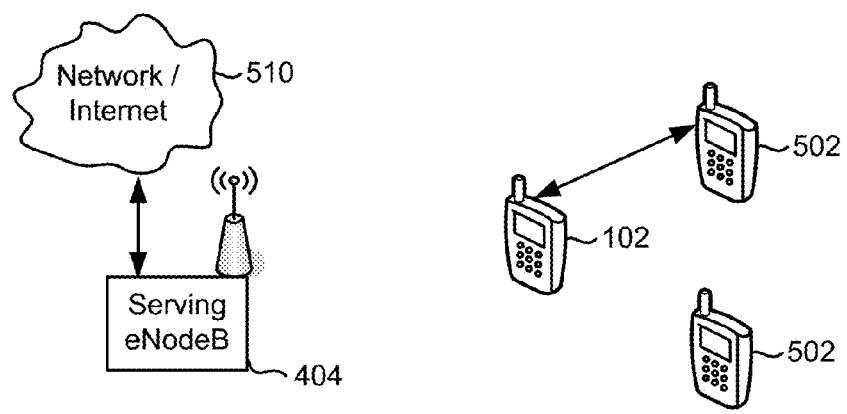

FIGS. 5A-5C illustrate functional components, communication links, and information flows in an embodiment method of grouping mobile devices and sharing location information between grouped mobile devices. With reference to FIG. 5A, after a mobile device 102 is powered on, the mobile device 102 may scan the airwaves for predefined and/or preferred radio frequency carriers and/or systems with which the mobile device 102 may connect to the network. If the mobile device 102 does not find an appropriate network with which it may connect (or loses its connection) the mobile device 102 may scan the airwaves for other radio access systems (e.g., mobile network, radio access point associated with a mobile device, etc.) to acquire (i.e., connect to) until a connection to a network/Internet 510 is established. These operations may also be performed in the event of a dropped call or power interruption.

The mobile device 102 may also begin acquiring GPS signals while scanning the airwaves for radio frequency carriers and/or systems. If the mobile device 102 cannot acquire GPS signals, a network component (not illustrated) may help determine the relative position of the mobile device 102 based on one or more of the location determination solutions discussed herein (e.g., based on the antenna used for the radio access point, the time delay, angle of arrival, etc.).

The mobile device 102 may acquire (i.e., connect to) an appropriate radio access system, radio frequency carrier and/or system via the mobile device's system acquisition system. In the examples illustrated in FIGS. 5A-5C, the mobile device 102 establishes a connection to a network 510 via an eNodeB 404. However, it should be understood that any or all of the communication technologies discussed above are contemplated and within the scope of the various embodiments.

After the mobile device 102 acquires the radio access system, the network 510 (i.e., a component in the network such as a server) will know the approximate location of the mobile device 102 (e.g., via one or more of the location determination solutions discussed above, such as proximity to base towers). In addition, the mobile device 102 may compute its current location (e.g., via GPS and/or the location determination solutions discussed above), store the computations in a memory of the mobile device, and report its current location to the network 510.

In addition to knowing the approximate location of the mobile device 102, the network 510 may also be informed of the locations of other mobile devices 502 and the proximity of the other mobile devices 502 to the recently acquired mobile device 102.

FIG. 5B illustrates that the network 510 may send instructions/commands to the mobile devices 102, 502 to cause the mobile devices 102, 502 to group with mobile devices 102, 502 and possibly others. In an embodiment, the network 510 may be configured to automatically group the mobile devices 102, 502 based on the proximity of the devices 102, 502 with respect to one another. In an embodiment, the network 510 may be configured to allow an incident command system (ICS) commander to group the devices. In an embodiment, the network 510 may be configured to allow the mobile devices to form groups based on their proximity to one another.

FIG. 5C illustrates that the mobile device 102 may pair/group with another mobile device 502 and/or establish communication links so that the mobile devices 102, 502 may share real-time relative location information with each other. Two or more grouped/paired mobile devices 102 and 502 may identify their relative positions to each other by sending relative location information over the established communication links. The relative location information may include time-to-arrival, angle-of-arrival, and existing or self-aware location information.

The mobile devices 102, 502 may be configured report sensor information to each other and/or the network 510. The sensor information may include x, y, z coordinate information and velocity information. The sensor information may be polled on a continuous basis, may be requested periodically, and/or made available on demand in response to network/system requests.

In an embodiment, a mobile device 102, 502 may be configured to report sensor information in response to determining that there is a high likelihood that there has been change in a location of the mobile device 102, 502 (e.g., in response to detecting motion). The mobile devices 102, 502 may also be configured collect and report sensor information to the network 510 in response to receiving an instruction/command from the network 510 (i.e., a component in the network such as a server or E-SLMC 418 illustrated in FIG. 4). The network 510 (i.e., a component in the network) may be configured to receive the sensor and location information from the mobile devices 102, 502, and compute and store information about the distances (e.g., in time delay and angle of arrival with respect to the mobile devices 102, 502).

In an embodiment, the reporting of sensor information may be based on local parameter settings. For example, the mobile devices 102, 502 may be configured to transmit sensor information when any of the measured parameters (e.g., x, y, z and velocity information) meet or exceed a threshold value (e.g., exceed a rate-of-change, meet a timeout limit), which may be identified by local parameter settings stored in a memory of the mobile devices 102, 502. In an embodiment, the mobile devices 102, 502 may be configured to re-compute and/or update their location information in response to determining that the measured parameters (e.g., x, y, and z coordinates and velocity information) meet or exceed a threshold value.

In an embodiment, a mobile device 102 and/or the network 510 (i.e., a component in the network) may be configured to compare collected sensor information to computed latitude and longitude coordinates, relative altitude information, and other available information to determine if there is a discrepancy between the collected/measured values and the expected values. When it is determined that there exists a discrepancy between the expected and measured values, the mobile device 102 and/or network 510 may perform additional measurements to improve the location accuracy of the measurements/location information.

Figure 5D:
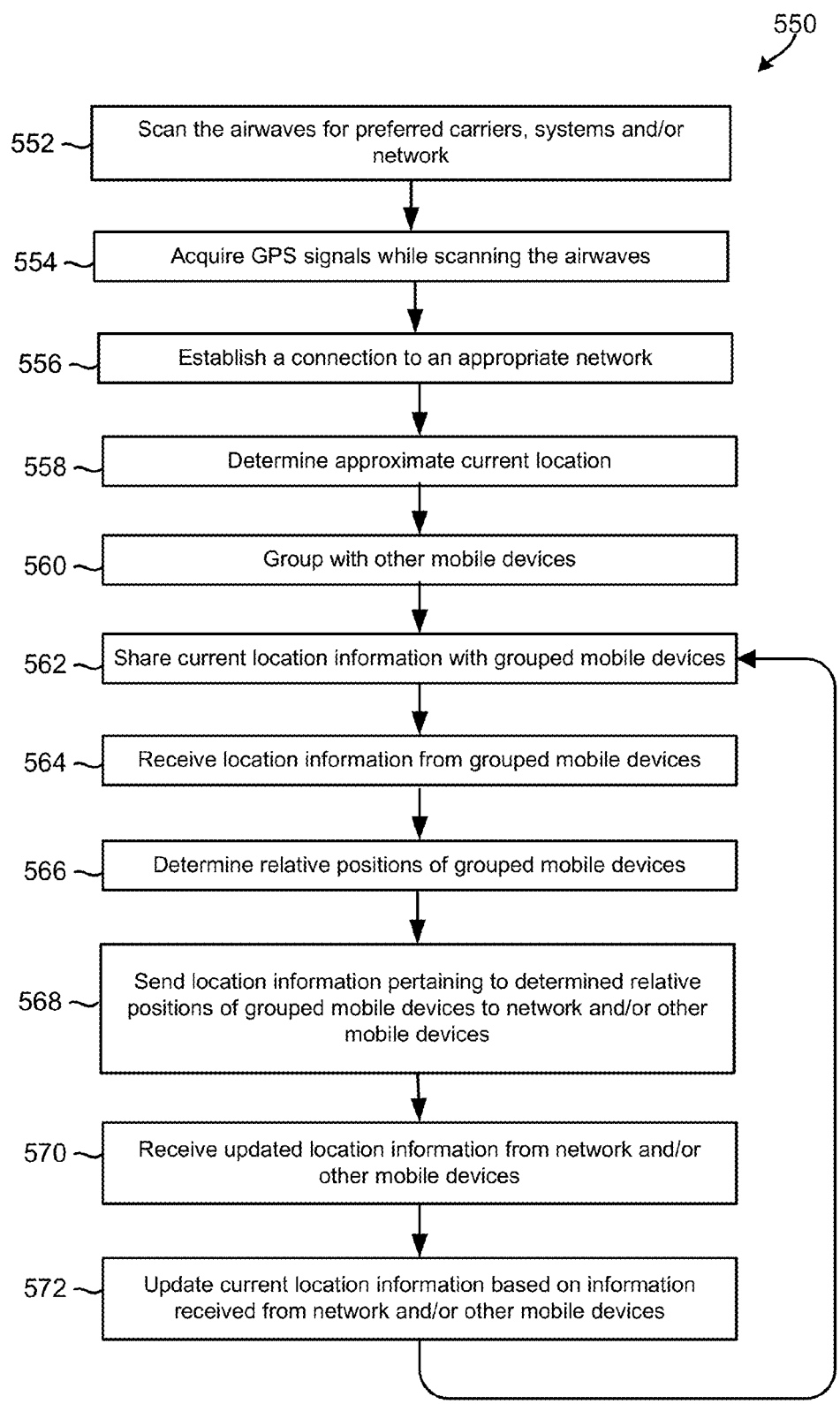
FIG. 5D is a process flow diagram illustrating an embodiment mobile device method for grouping mobile devices and sharing location information between grouped mobile devices and the network to compute enhanced location information.

FIG. 5D illustrates an embodiment mobile device method 550 for grouping mobile devices and sharing location information between grouped mobile devices and the network to compute enhanced location information. After a mobile device is powered on, in block 552, the mobile device may scan the airwaves for predefined and/or preferred radio frequency carriers and/or systems with which the mobile device may connect. In block 554, the mobile device may begin acquiring GPS signals while scanning the airwaves for radio frequency carriers and/or systems. If the mobile device cannot acquire GPS signals, the mobile device or a network component may, as part of block 554, determine the relative position of the mobile device based on one or more of the location determination solutions discussed herein. In block 556, the mobile device may acquire (i.e., connect to) an appropriate radio access system, radio frequency carrier, system and/or network.

In block 558, the mobile device may compute its current location (e.g., via GPS and/or the location determination solutions discussed above), store the computations in a memory, and report its current location to the network. In block 560, the mobile device may group with other mobile devices in response to receiving instructions/commands from a network component and/or in response to detecting that the other mobile devices are within a predefined proximity to the mobile device (i.e., within a threshold distance). In block 562, the mobile device may share its current location information, as well as information collected from sensors, with the grouped mobile devices. In block 564, the mobile device may receive location and/or sensor information from the grouped mobile devices. The sensor information may include x, y, z coordinate information and velocity information.

In block 566, the mobile device may identify the relative positions of the other mobile devices, which may be achieve by evaluating the location and sensor information received from the other mobile devices and/or via any or all of the location determination solutions discussed herein. In block 568, the mobile device may send the relative location information, its current location information, and/or sensor information to a network component and/or the other mobile devices, which may receive the sensor and location information and compute updated location information (e.g., based on distance in time delay and angle of arrival, relative altitude information, etc.). In block 570, the mobile device may receive updated location information from the network component and/or the other grouped mobile devices. In block 572, the mobile device may update its current location calculation and/or information based on the information received from the network component and/or the other grouped mobile devices. The operations of blocks 562-572 may be repeated until the desired level of precision is achieved for the location information.

FIGS. 6A-6D illustrate functional components, communication links, and information flows in an embodiment method for computing location information in which the grouped/paired mobile devices 102, 502 are updated with their respective location information.

Figure 6A:
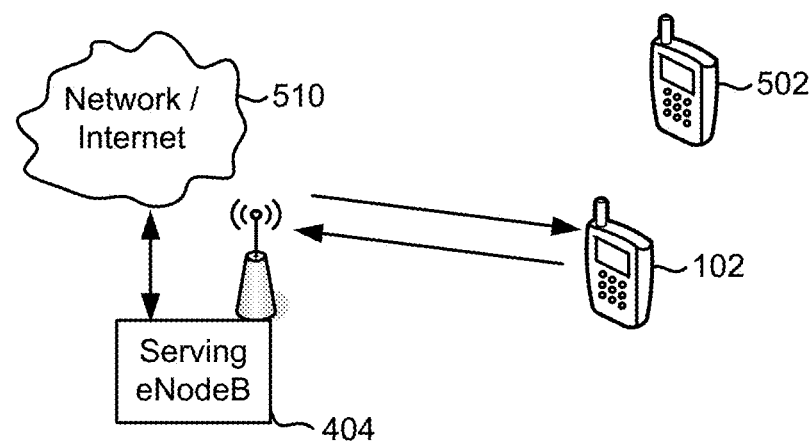
FIGS. 6A-6D are component block diagrams illustrating functional components, communication links, and information flows in an embodiment method for computing location information in which the grouped/paired mobile devices are updated with their respective location information.

FIG. 6A illustrates that the mobile device 102 may communicate with a serving eNodeB 404 to relay its location information to the network 510 and/or to receive location information from the network 510.

Figure 6B:
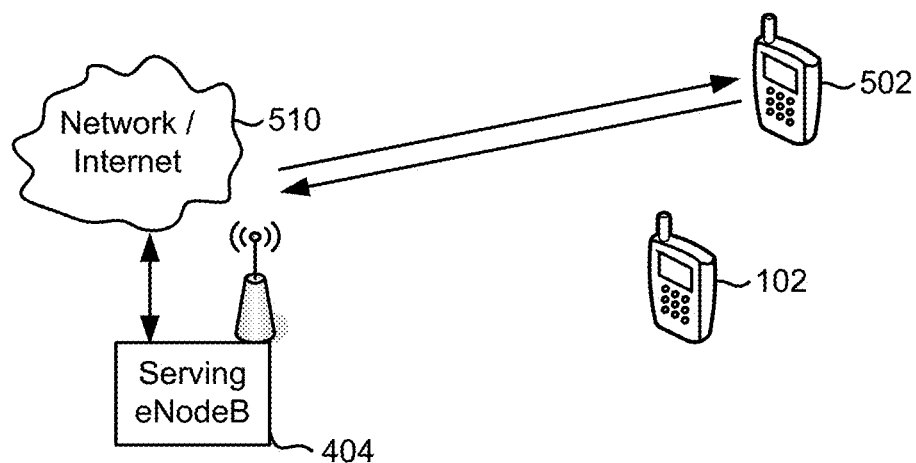

FIG. 6B illustrates that another mobile device 502 may also communicate with the serving eNodeB 404 to relay its location information to the network 510 and/or to receive location information from the network 510.

Figure 6C:
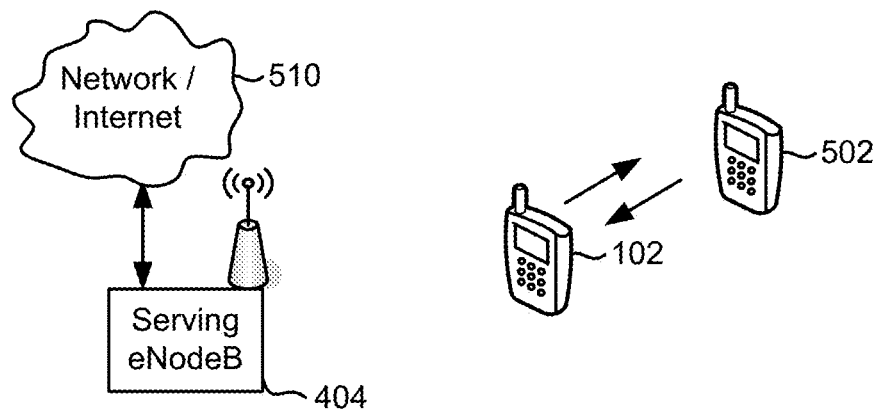

FIG. 6C illustrates that the grouped/paired mobile devices 102, 502 may communicate with each other to determine the distance between each other, which may be achieved by the mobile devices 102, 502 communicating various types of information, such as time-of-arrival, relative position with angle-of-arrival measurements, and other similar values, measurements, or computations. The mobile devices 102, 502 may then re-compute, refine, and/or update their current location calculations and/or location information based on information received from the other mobile devices 102, 502.

Figure 6D:
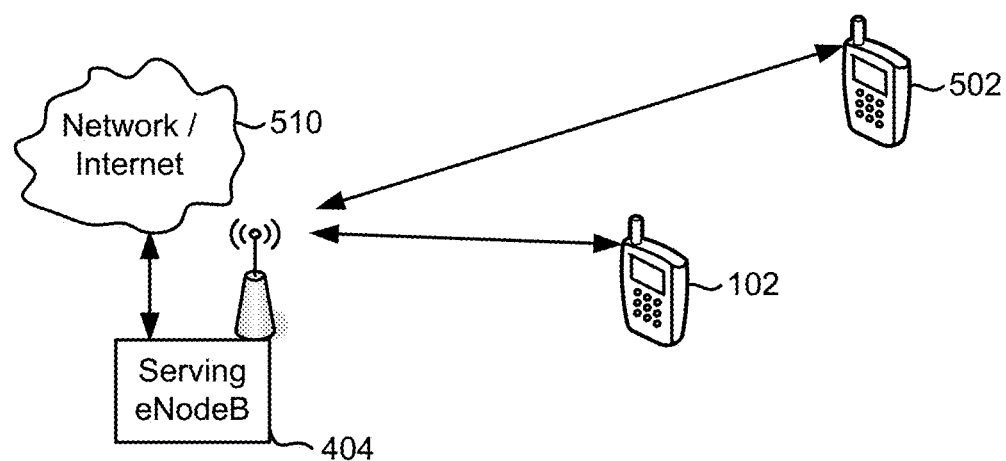

FIG. 6D illustrates that the grouped/paired mobile devices 102 and 502 may send their self-aware location information and/or relative location information to the network 510 (via the serving eNodeB 404), and receive updated location information from the network 510. For example, the mobile devices 102 and 502 may send their present location coordinates, distances between mobile device (e.g., distance to each other), altitude, and bearings (e.g., where mobile device 102 is with respect to mobile device 502) to the network 220. The network may compute updated location information based on the received information (e.g., coordinates, sensor information, proximity information, etc.), and send the updated location information to the mobile devices 102, 502. The mobile devices 102, 502 may then re-compute, refine, and/or update their current location calculations and/or location information based on information received from the network.

The operations discussed above with respect to FIGS. 6A-6D may be repeated so that the mobile devices 102, 502 recursively, continuously, and/or periodically re-compute, refine, and/or update their current location calculations and/or location information based on updated information received from the other mobile devices and/or the network 510 until the desired level of precision is achieved for the location information.

Figure 6E:
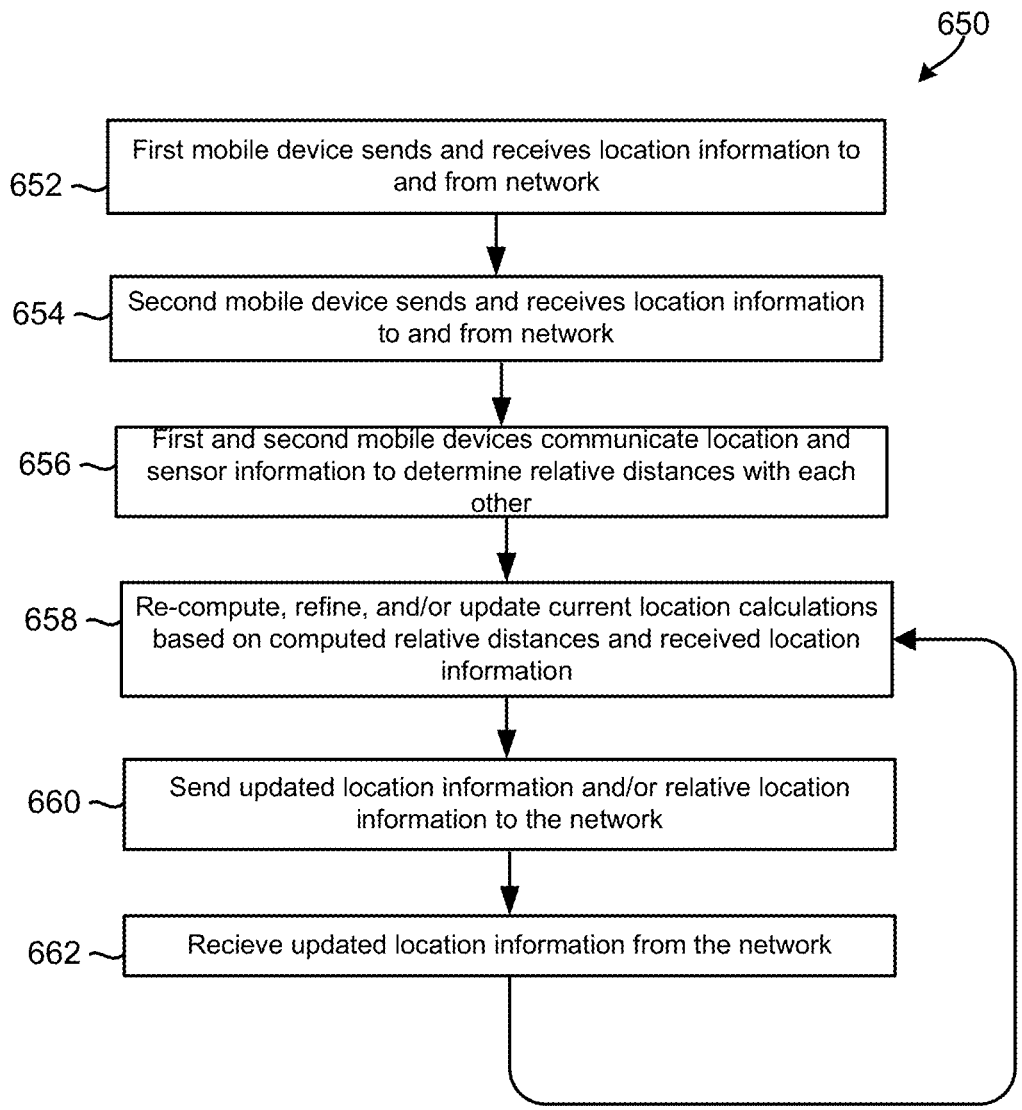
FIG. 6E is a process flow diagram illustrating an embodiment system method of determining the location of two or more grouped mobile devices.

FIG. 6E illustrates an embodiment system method 650 of determining the location of two or more grouped mobile devices. In block 652, a first mobile device may send and/or receive current location information to and from a network component. In block 654, a second mobile device may send and/or receive current location information to and from a network component. In block 656, the first and second mobile devices may communicate with each other to determine the relative distances between each other, which may be achieved by communicating various types of information, including time-of-arrival, relative position with angle-of-arrival measurements, velocity, altitude, etc.

In block 658, the first and/or second mobile devices may re-compute, refine, and/or update their current location calculations and/or location information based on information received from the other mobile devices and/or the network. In block 660, the first and/or second mobile devices may send their updated current location calculations and/or location information to the network component, which may receive the calculations/information and compute updated location information (e.g., based on distance in time delay and angle of arrival, relative altitude information, etc.). In block 662, the first and/or second mobile devices may receive updated location information from the network. The operations in blocks 658-662 may be repeated until the desired level of precision is achieved for the location information.

It should be understood that the methods and operations discussed above with reference to FIGS. 5A-5D and 6A-6F may also be performed such that they include more than two devices. For example, in an embodiment, the mobile devices may be grouped into units of four (4) such that each mobile device may triangulate its position relative to the other mobile devices in the same group.

In an embodiment, a mobile device 102 and/or a network component may store relative location information for all the mobile devices within each group, based on the type of grouping. For example, a network component may store relative location information for all the mobile devices grouped/paired by an incident command system (ICS) commander. Likewise, the network component may store relative location information for all the mobile devices grouped/paired based on their proximity to each another.

In an embodiment, the mobile device 102 may be configured to detect a low battery condition, and initiate operations to conserve battery. For example, a mobile device 102 may be configured to turn off its radio and/or terminate or reduce its participation in the group/pairing information exchange. As another example, a mobile device 102 may be flagged or identified as having a low battery condition, and the other grouped/paired mobiles devices may be informed of the low battery situation so that update intervals may be adjusted to reduce battery consumption.

Figure 6F:
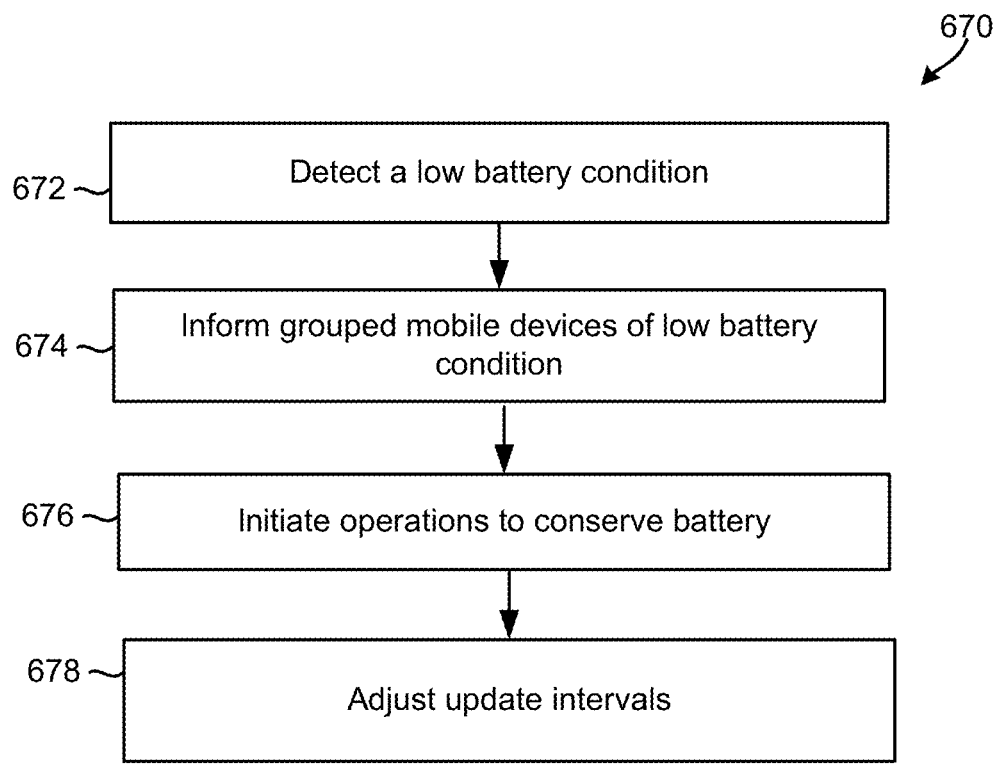
FIG. 6F is a process flow diagram illustrating an embodiment mobile device method of adjusting the update intervals in response to detecting a low battery condition.

FIG. 6F illustrates an embodiment method 670 of adjusting the update intervals in a mobile device in response to detecting a low battery condition. In block 672, the mobile device may detect/determine that the amount of power remaining in the mobile device battery is below a predetermined threshold. In block 674, the mobile device may transmit a signal or otherwise inform grouped mobile devices of the detected low battery condition. In block 676, may initiate operations to converse power, such as by turn off its radio and/or reducing its participation in exchanging information with grouped mobile devices. In block 678, the mobile device and/or the informed grouped mobile devices may adjust the update intervals with respect to the mobile device to reduce the load on the mobile device.

As discussed above, grouped mobile devices may share various types of information to improve the accuracy of the location determination calculations. For the information shared between grouped/paired mobile devices, a comparison may be made for the path, range, between the mobile devices using any or all of the information available to the mobile devices (e.g., location coordinates, sensor information, proximity information, etc.). If the two mobile devices report relative positional information that is within a user or network defined range tolerance as being acceptable this information may be forwarded to the network. If the relative positional information is not within the user or network defined range tolerance, additional polling operations may be performed to improve the accuracy of the measurements or location information. The above-mentioned operations may be repeated until the desired level of accuracy is achieved. In an embodiment, the number of times the above-mentioned operations are repeated may be determined based on a user-definable values which can be set by the network, user or algorithm used.

As mentioned above, a mobile device 102 may include two or more of the same type of sensor. In the embodiments in which the mobile device 102 includes more than one of the same type of sensor (e.g., includes two accelerometers), one of the sensors (e.g., one of the two accelerometers) may be identified as a master sensor. The values measures by each sensor may be compared, and if the difference between the values falls within a tolerance range, the values measured by the master sensor may be used to compute the sensor parameters (e.g., x, y, z, and velocity parameters). If the difference between the values falls outside a tolerance range, the mobile device may use information collected from other sensors (of the same or different types) to determine if the values measured by the master sensor are consistent with expected values. For example, the mobile device may use information collected from various other types of sensors to compute sensor parameters (e.g., x, y, z, and velocity parameters), and compare the computed sensor parameters to similar sensor parameters computed based on the values measured on the master sensor to determine if the master sensor is functioning correctly. Values measured on the master sensor may also be compared to information stored in the network or other mobile devices to determine if the master sensor is functioning correctly. If it is determined that the master sensor is not functioning correctly, a secondary sensor may be designated as the master sensor. The previous master sensor may be demoted to standby status (i.e., for use if the primary sensor has a failure) and not used for immediate positional calculations.

As mobile devices move into an area, the mobile devices may be asked to group/pair with more devices. The number of devices that a mobile device can group/pair with may be restricted by user configuration, through the system, and/or user intervention so as to conserve battery and computational efforts (e.g., when the mobile device detects a low battery condition).

In an embodiment, proximity grouping may be used in the x, y, and z coordinates/fields and/or for velocity information.

In the event that a mobile device is unable to group with another mobile device with which it is instructed to group/pair with (e.g., due to a RF path problems), the mobile device may group with yet another mobile device in an ad-hoc fashion. If no mobile device is pairable with the mobile device, it may rely on its own geographic and/or and sensor information to report to the network.

When a mobile device 102 is undetected as being within a given proximity of a grouping radius, other mobile devices in the same group as the mobile device 102 may be informed of the decision to degroup/depair them from the mobile device 102. In an embodiment, the system may be configured so that an approval from the incident commander or user is required before the mobile is degrouped/depaired. In an embodiment, this may be achieved may transmitting a signal to a mobile device of the incident commander or user requesting approval, to which the incident commander or user may send a reply approving or disapproving of the request to degroup/depair. In an embodiment, the degrouping/depairing process may be transparent to the mobile device users.

In the event that a mobile device is unable to communicate with the network, the mobile device may send telemetry information pertaining to location services (and other telemetry information) to a grouped mobile device for relaying to the network.

In an embodiment, polling for information may be performed once the network has lost communication with the mobile device. Mobile devices that are known to be grouped to the mobile device may be instructed to communicate with the disconnected mobile even when it is trying to reacquire the network. A logical sequence based on proximity, signal quality to the network, and/or battery strength may be used to determine which mobile device will be used as a relay for communicating with the network.

The relayed telemetry information may include more than just positional information. For example, the telemetry information may also include bio sensor and user bio information reporting on the environment and user conditions, including heart rate and temperature, CO, O2 and other sensor information.

In an embodiment, the network may continuously measure/monitor the connected mobile devices. Knowing their location and relative location to each of the other mobile devices enables the network to continuously measure the uplink and downlink communication paths. If communication path degradation occurs and begins to fall within a defined system quality range (which may be user defined), a mobile device may be instructed to either handover to another radio access node for the same network and/or network technology, or be instructed to initiate to perform relay operations to relay communications though a defined mobile device as a secondary signal path.

In the event that a communication link is lost with the network the mobile device may attempt to acquire itself on another network. While the acquisition process is underway, a mobile device may act as a mesh device. Other mobile devices in the proximity group may also connect as a mesh network.

In an embodiment, the mobile devices may utilize dead reckoning (also called deducted reckoning) techniques to compute updated location information. Mobile devices may store the updated information for eventual relay to another mobile device which has network access or until one of the mobile devices or both devices have access to the initial network or another network and granted access to whether it is public or a private network.

Figure 7:
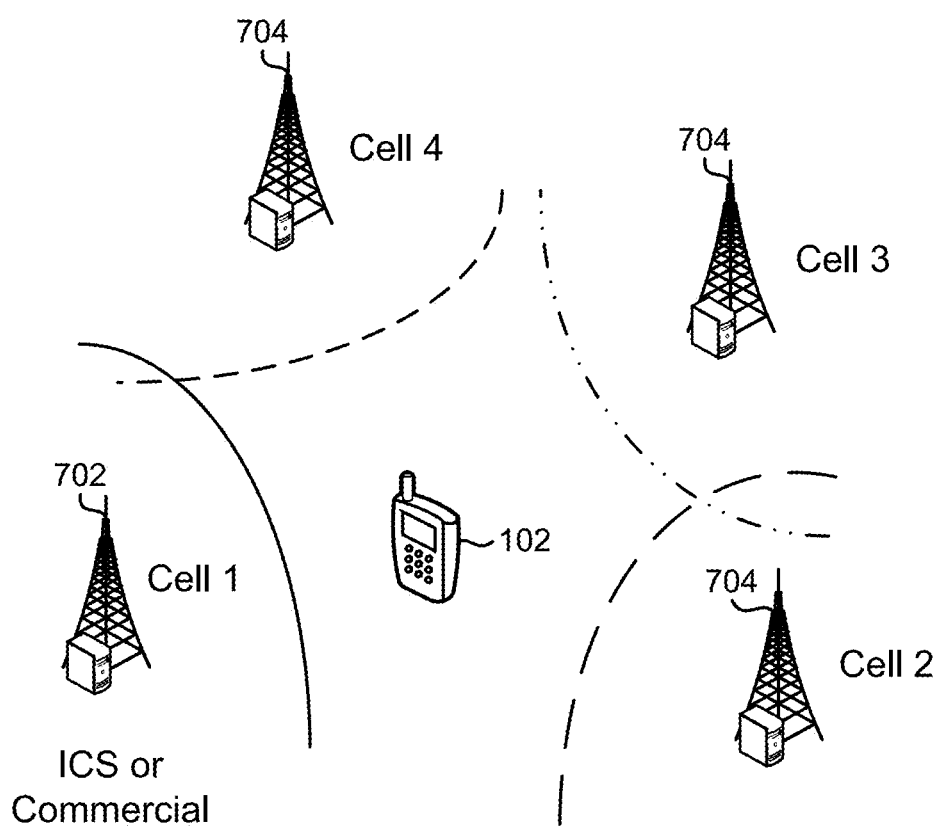
FIG. 7 is a component block diagram illustrating functional components, communication links, and information flows in embodiment method of periodically scan for cells.

FIG. 7 illustrates normal operating conditions in which a mobile device 102 will periodically scan for other cells 704, including its serving cell 903. If the radio access points are part of the network then the mobile device will report the identity and signaling information required by the existing network to determine (e.g., via triangulating and/or trilateration) the mobile device's location based on a network approach. If the mobile device detects a radio access point is not part of its preferred cell selection process, it may attempt to read the coordinates and positional information from the access point that is broadcast.

Once synched with the access point the mobile device may determine the timing difference and other requisite information to help determine its relative location and distance from the access point. This information may be related to the location system used by the mobile device to help refine its current location calculations.

Additionally the mobile device may be configured to compare each cell read to its own coordinate and using bearing and time difference for all the cells it reads. The mobile device may then triangulate on its own position.

During a 911 call a software application on the distressed mobile device may be executed. The software application may access an active neighbor list, read the overhead of each cell, and use that information to triangulate on the mobile device's own position. The mobile device may also read the time offset for each of the cells.

In this case the system begins to try and locate the distressed mobile's position with more precision an accuracy to assist First Responders with triangulating on the distressed mobile's position and sending the information to the incident commander and/or public service answering point (PSAP) with a relative distance to target indication that is updated on pre-defined intervals. If the mobile device has lost contact with the 911 center, PSAP then the last location is continuously displayed and any velocity information is also relayed to assist the first responders.

In an emergency, the mobile device 102 may be configured to send its location information to the network. The mobile device 102 may be configured to automatically send its location information in response to detecting the emergency, or may provide the user with an option to send the location information. In an embodiment, the mobile device 102 may be configured to send its location information in response to a network initiated command.

Each mobile device may become an access point (AP). The decision to be the access point may be periodically updated while still in communication with the network, or when no network is found. Upon powering up, each mobile device may act as a client, and on a pseudo random time interval, the mobile devices may become an access point and then a client.

The location based methodology may be the same for a frequency-division duplexing (FDD) and a time-division duplexing (TDD) system. However in the event that the communication link between the mobile device and the network is lost, the mobile device may be configured to relay its telemetry information through another mobile device having network access.

In an embodiment, all information sent via wireless communication links may be digital. In an embodiment, the information may be encrypted to a requisite advanced encryption standard (AES) standards level or the appropriate encryption level needed for the requisite communication system and access method used.

Generally, the location based systems (LBS) may utilize reactive or proactive based methods. In a reactive location based system, the mobile devices may synchronously interact with each other on a time basis or some other predetermined update method. In a proactive location based system, the mobile devices may update their location information based on a set of predetermined event conditions using an algorithm. The various embodiments may include both reactive and proactive aspects, taking the best of both approaches to enhance location accuracy and precision.

Various embodiments may include location determination solutions that utilize horizontal data (i.e., a set of reference points on the Earth's surface against which position measurements are made) and/or vertical data. Horizontal data define the origin and orientation of the coordinate system and are prerequisites for referring a position relative to the Earth's surface. Vertical data are based on geoids, which primarily serves as a basis to determine the height of a position relative to mean sea level for which the geoids act as a benchmark for origin and orientation. Various embodiments may utilize horizontal and vertical data to provide/generate enhanced three dimensional location information. The horizontal and vertical data can be global, national, local or custom depending on the locality and positioning reference system utilized.

Traditionally global data are used for position location as compared to a local datum. Global data are used for initial position fixing if possible and are based on GPS coordinates. Local data are based on a particular position on the surface of the earth, which allows for a non GPS based location based services to take place. The various embodiments may use global data, local data, or both. In an embodiment, GPS may be used to help identify the initial positional fix, and may be augmented by dead reckoning and a hybrid trilateration solution that utilizes both network and terminal based positioning. In this embodiment, both local and global data may be used.

Generally, a hybrid lateration and trilateration solution includes a mobile device performing a measurement and sending it to the network, and a network component performing the location determination calculations. The various embodiments include a hybrid lateration and trilateration solution in which the mobile device performs the location determination calculations, with and without the support of the network components.

Various embodiments may include sensor fusion operations in which a collaborative approach is used so that the sensors do not act as individual sensors, but as a collective team. As discussed above, the mobile device may include various sensors (e.g., accelerometer, gyros, magnetic compass, altimeters, odometers, etc.) capable of generating heading, orientation, distance traveled, and velocity as part of the sensor information collected on the mobile device. In various embodiments, information collected from any or all the internal sensors may be used for improving location or positioning accuracy and/or confidence improvements. Various embodiments may compute location information based on information from multiple sensors, with or without the aid of radio frequency propagation information.

The sensor fusion operations may include the sharing of telemetry including sensor data indicating relative movement of the individual mobile device, which enables temporal readings to assist in the location estimate, either with external assistance or dead reckoning.

Figure 8:
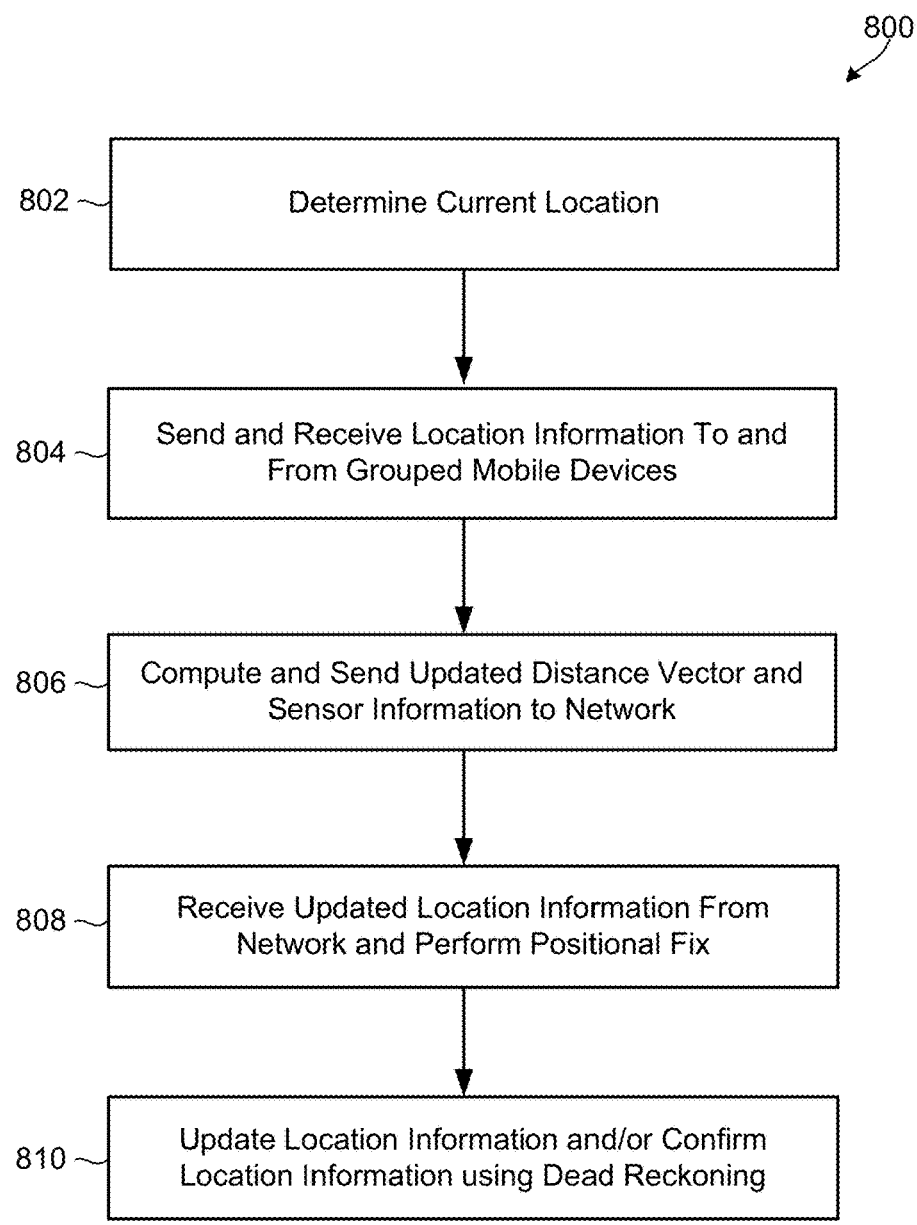
FIG. 8 is a process flow diagram illustrating an embodiment mobile device method for determining the location of a mobile device in a wireless network.

FIG. 8 illustrates an embodiment mobile device method 800 for determining the location of a mobile device in a wireless network. In block 802, a mobile device may determine its current location using any of the above mentioned location determination solutions. In block 804, the mobile device may share its location information with other grouped mobile devices and/or receive location information from other grouped mobile devices. In block 806, the mobile device may compute and send updated distance vector and sensor information to a network component for improved positional fix. In block 808, the mobile device may receive updated location information from the network component, and perform its own positional fix based on mobile data information received from the network. In block 810, the mobile device may update its location information and/or confirm its location information using dead reckoning to enhance positional accuracy.

Dead reckoning may provide the needed positional corrections as a local datum method for positioning when GPS or other network related positioning solutions are not available. Additionally dead reckoning may enhance the location position accuracy and precision calculations by providing additional horizontal and vertical datum comparisons.

With dead reckoning, the current position may be deduced (or extrapolated) from the last known position. The dead reckoning accuracy requires a known starting point which either can be provided by the network, GPS, near field communication link, RF beacon, or via another mobile device.

A dead reckoning system may be dependent upon the accuracy of measured distance and heading, and the accuracy of the known origin. However the problem with relying on dead reckoning alone to assist in positional improvement is error accumulation caused by sensor drift (i.e., differences or errors in values computed/collected from one or more sensors). In particular, magnetic, accelerometers and gyroscopes are susceptible to sensor drift. The error accumulation for any of the sensors may increase over undulating terrain, as compared to flat terrain. Bias error and step size error are leading contributors to dead reckoning errors.

Various embodiments may tightly couple the mobile device sensors and continuously recalibrate the sensors to reduce any drift problems caused by unaided dead reckoning. Additionally, as part of the tightly coupling the sensors, any bias drift associated with the sensors (e.g., a gyroscope) may be address by utilizing a Kalman filter to reduce the errors from the primary and/or secondary sensors (e.g., gyroscopes).

In various embodiments, the mobile device may be configured to include velocity computations as part of the location determination computations to account for position changes that occur. When a GPS signal is available, the step size (via velocity computation) and compass bias errors may be estimated by an Enhanced Kalman Filter (EKF). Additionally if GPS is available, the compass may also be able to identify slow motion changes due to changes in magnetic inclination. The compass may be relied upon for motion computations in addition to that of accelerometers and gyroscopes, with and without the availability of GPS.

Dead reckoning accuracy degrades with time, requiring regular position updates or positional corrections. Therefore, the mobile device may be configured to not only use its own internal sensors to compute the location/positional information, but may also communicate with other mobile devices to leverage their location/positional information to enhance its own location/positional information. In essence, the mobile devices may act as RF base stations, providing the lateration capability to improve the positional accuracy of other mobile devices.

In an embodiment, a mobile device may be configured to poll one or more other mobile devices to gain a better positional fix on its location.

Mobile devices may be grouped together, either through assignment by the network or through the mobile device acquiring/detecting/connecting to other mobile devices (which may or may not be in the same network) as part of a discovery method for sharing location information.

Location information may be shared via the use of a near field communications system (e.g., Bluetooth®, ultrawideband, peanut radios, etc.), infrared, ultrasonic, and other similar technologies, such as via the use of WiFi. The wireless communications may also be ad hoc or infrastructure based, or based on a TDD system, such as LTE, SD-CDMA, TD-CDMA, or any other TDD methods.

In an embodiment, the mobile device may be configured to initiate the sharing of location/position information in response to receiving a network-driven grouping request from a network component.

In an embodiment, when the mobile device has lost contact with the network, it may attempt to find a suitable mobile device to help in its location determination computations, and for possible connection to the network (e.g., via a relay).

In an embodiment, the mobile device may be configured to send a request for location information to another mobile device. The request may be sent after the authentication process between mobile devices, and may include a time stamp which may be sub-seconds in size (milliseconds). Another mobile device may respond with a message that also has its time stamp and when it received the time stamp from the initiating mobile device.

Several messages (e.g., three messages) may be exchanged quickly between the mobile devices to establish time synchronization and share location/positional information that includes x, y, and z coordinates and a velocity component in each message. The time differences along with the x, y, and z coordinates may be compared with possible pulses or pings to establish an estimated distance vector between the devices.

When the distance vector and the x, y, z coordinates of two mobile devices are known, a point-to-point fix may be established. This process may be repeated for all the mobile devices in a group that has been assigned or created by the mobile device itself. Having multiple distance vectors from other points to the mobile will enhance the positioning accuracy.

A mobile device may be configured to report back to the network location server the distance vectors it has found between different mobiles. The other mobile devices also involved with the positioning enhancement may also report their distance vectors to the network to have their overall position accuracy improved as well.

The positional accuracy is meant to be done in incremental steps and the process will continue until no more positional improvements will be achievable. The positional accuracy improvement threshold may be operator defined, and may be stored in a mobile device memory.

When collecting the distance vectors and other positional information, if the error in position is greater than x % for a lower positional confidence level then no update may be required. As the mobile device receives other sensor data and more than a pre-described distance in any direction or a combined distance vector than the positional update process begins again. However if the x % of positional confidence level is less than desired additional positional, updates may be made with the mobile devices grouped together in an interactive process to improve the confidence level of the positional information.

It is important to note that typical positional location methods that are used currently by the network are not necessarily replaced with above-described positional lateration. Instead, the hybrid lateration method may be used in various embodiments to augment the positioning accuracy and confidence for network based position request due to boundary changes or paging requests or other position/location triggered events.

Figure 9A:
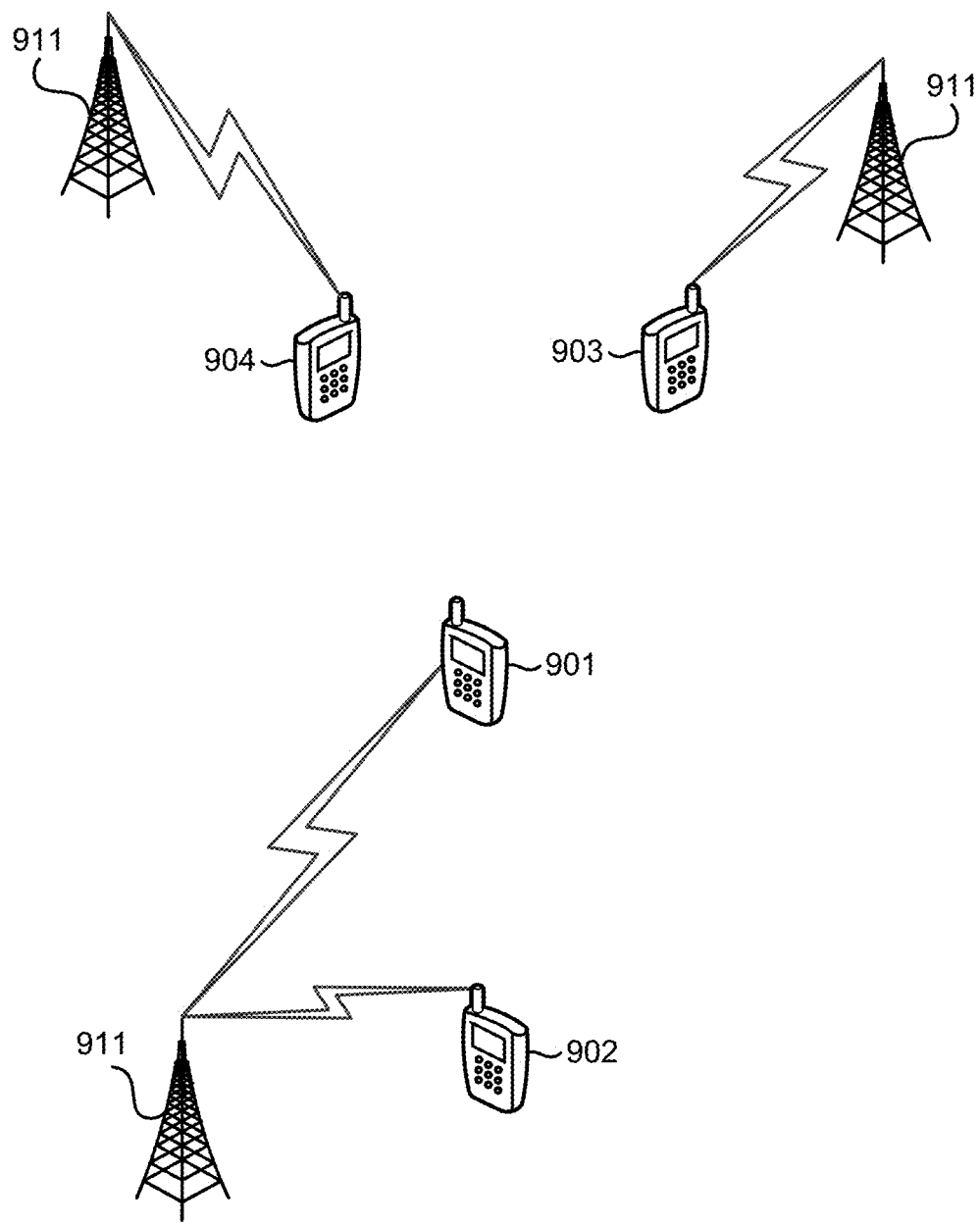
FIGS. 9A-9E are component block diagrams illustrating various logical and functional components, information flows and data suitable for use in various embodiments.

FIGS. 9A-9E illustrate various logical components, information flows and data suitable for use in various embodiments. FIG. 9A illustrates that mobile devices 901, 902, 903, and 904 are communicating with the wireless network via multiple cell sites/radio access points/eNodeBs 911. The mobile devices 901, 902, 903, and 904 may compute a relative fix on their initial location using any of the location determination solutions discussed above. A first mobile device 901 may be instructed to find and communicate with the other mobile devices 902, 903 and 904, and/or any or all of mobile devices 902, 903 and 904 may be instructed to communicate with the first mobile device 901. The mobile devices 901, 902, 903, and 904 may be grouped together (e.g., via one of the grouping methods discussed above). The network may also designate one of the mobile devices 901 (e.g., a mobile device having a high position confidence) to be used as the reference or beacon for the other mobile devices 902, 903, and 904 within the group of mobile devices 901, 902, 903, and 904.

Figure 9B:
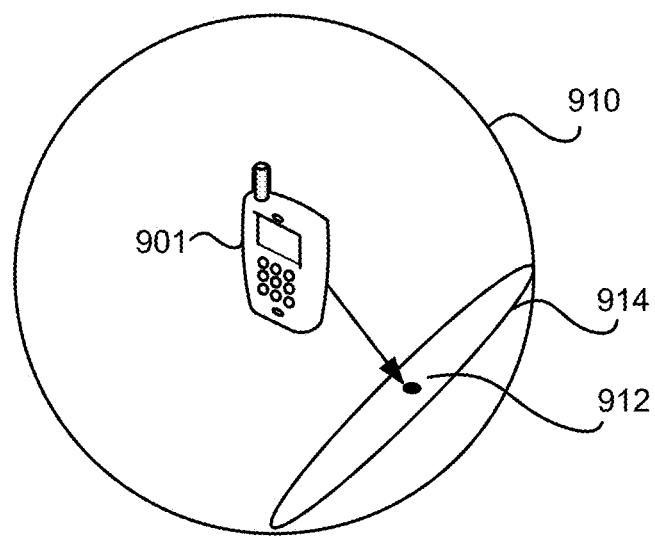

FIG. 9B illustrates that a combination of circular and hyperbolic trilateration operations may be performed as part of an embodiment location determination solution. For example, if any of the coordinate data provided by the sensors and/or mobile devices is in latitude and longitudinal coordinates, it may be converted to Cartesian coordinates to facilitate a hybrid lateration calculation. In the example illustrated in FIG. 9B, the mobile devices 901 has been designated as reference mobile device, reference number 912 identifies the position to be determined/computed (i.e., with a high level of accuracy) with respect to mobile device 901, reference number 910 identifies a three dimensional sphere that encompass the mobile device 901, and reference number 914 identifies an area of the three dimensional sphere (with x, y, and z coordinates) within which the device exists.

Figure 9C:
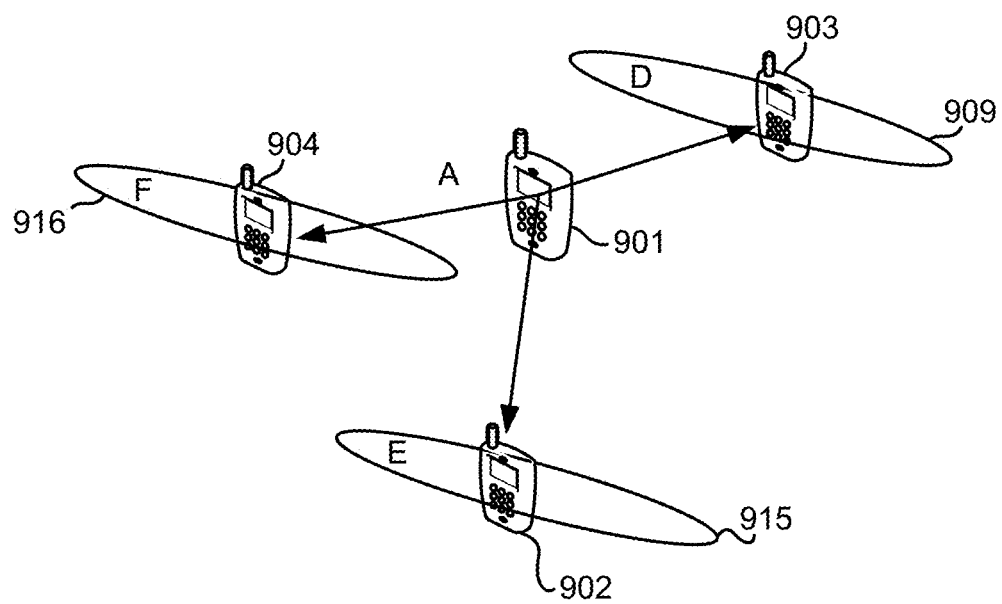
Figure 9D:
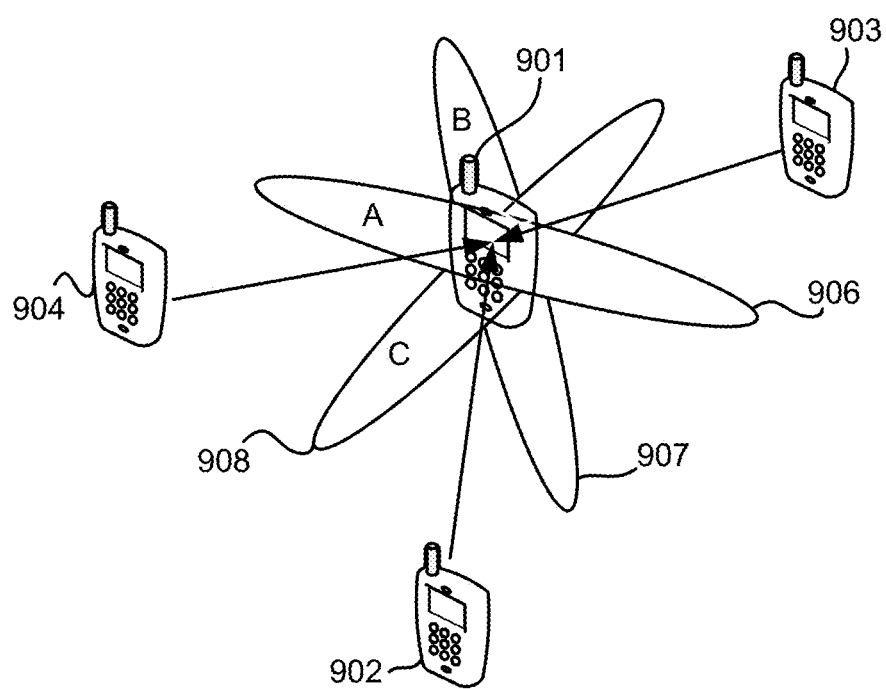

FIG. 9C-9D illustrate that distance vectors may be computed between the mobile devices 901, 902, 903, and 904 as part of an embodiment location determination solution. In FIG. 9C mobile 901 using the hybrid trilateration method determines a relative position with respect to mobile devices 902, 903, and 904 respectively. Additionally, reference numbers 915, 909, and 916 identify the relative areas of mobile devices 902, 903, and 904, respectively. As part of the hybrid trilateration operations of the embodiment location determination solution, mobile devices 902, 903, and 904 may locate mobile device 901, and the mobile device 901 may compute a distance vector between itself and mobile devices 902, 903, and or 904. The mobile device 901 may initiate communications with mobile device 902 (although mobile device 902 could initiate the communication) and exchange time stamps, positional information, sensor data. The same process may occur with respect to mobile devices 904 and 903, in which positional and sensor information is exchanged.

As illustrated in FIG. 9D, the mobile devices 902, 903, and 904 may establish a distance vector between themselves and mobile device 901. The same process may occur with respect to mobile devices 902, 903, and/or 904, in which positional and sensor information is exchanged. Where mobile device 902 undergoes the same process as that done with mobile device 901 as part of the hybrid trilateration process, mobile device 901 may use mobiles 902, 903, 904 to enhance it positional information and mobile device 902 may use mobiles 901, 903, and 904 to enhance its positional information, and so forth for all the mobile devices that are grouped together.

The three circles or ellipses 909, 915, and 916 illustrated in FIG. 9C and the three circles or ellipses 906, 907, and 908 illustrated in FIG. 9D do not intersect at a given point, but span an area of a particular size depending on the range involved.

Figure 9E:
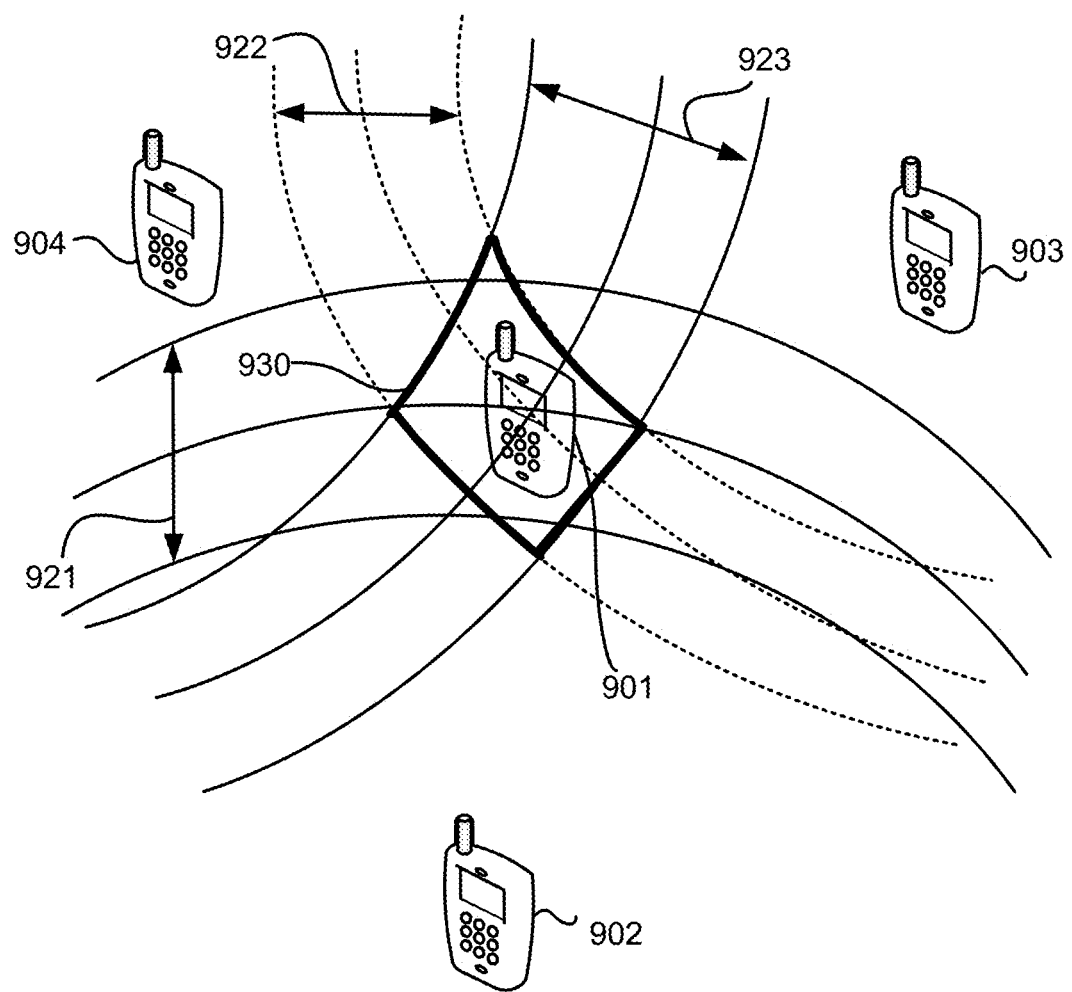

FIG. 9E illustrates an embodiment hybrid trilateration method in which the position of mobile device 901 is validated or improved upon. As part of the hybrid lateration method, a separate calculation operation may be required for each x, y, and z coordinates, in addition to accounting for velocity. However, the ability to have three mobile devices 902, 903, and 904 locate mobile device 901 may present an error window (or an error area) for each coordinate plane represented by reference number 930. The error window/area may be a combination of range errors from the mobile devices 902, 903, and 904. Contributing to the error window/area is the hybrid range errors illustrated by reference numbers 921, 922, and 923, where: reference number 921 is the hybrid range error associated with mobile device 902; reference number 922 is the hybrid range error associated with mobile device 903; and reference number 923 is the hybrid range error associated with mobile device 904. Additionally this process can be done with less or more mobile devices than used in the above example.

For each axis (x, y, or z), a similar process occurs where the error area 930 is a combination of determining the range between the other mobile devices and mobile device 901. The hyperbolic lateration is a typical calculation method used in location based systems and is based on the principal that the range between two locations is the same. However the range determined for the points may not be constant since both can be moving toward, away or together at a similar velocity and trajectory.

With the hybrid lateration method proposed a corrective distance vector $\Delta x, \Delta y, \Delta z$ is used that can be used to apply to the estimated position.

The three circles or ellipses 909, 915, and 916 illustrated in FIG. 9C and the three circles or ellipses 906, 907, and 908 illustrated in FIG. 9D do not intersect at a given point, but span an area of a particular size depending on the range involved. Therefore range is "r" and is denoted by the subscript representing the distance vector involved. Thus:

$$r = p_i + \text{error}$$

The pseudo range $p_i$ deviated from the actual range in any axis due to the inaccuracy in synchronization or propagation in a multipath environment or due to sensor induced errors. Where the distance vector accounting for change in direction is:

$$r_i = \sqrt{(X_i-x)^2 + (Y_i-y)^2 + (Z_i-z)^2}$$

Three range calculations are then averaged to determine the distance vector that is used. If the previous range calculation $r_j$ as compared to that of the current calculation has an error in excess of a user defined % or variant then the new measurement is disregarded. Included with the distance vector validation may be the fusion sensor information where expected position vector calculated may be included for the confidence interval.

$$\text{Range difference} = d_{ij} - r_i r_j$$

An iterative process may be used for position improvement, which may include the use of a least squares calculation fit to approximate the position solution in a step wise basis. The process may continue until the range difference measured does not produce any noticeable accuracy improvement, which may be user-defined, either at the mobile device or network or both.

The multi-lateration calculations may include estimating a location of a mobile device based upon estimated distances to three or more measurement locations (i.e., locations of three other mobile devices or wireless transceivers). In these calculations, the estimated distance from a measurement location (location of another mobile device) to the mobile device may be derived from the measured signal strength. Since signal strength roughly decreases as the inverse square of the separation distance, and the transmission power of the mobile device can be presumed, the distance $d_i$ can be simply calculated as:

$$d_i = \sqrt{(S_0/S_i)}$$

where:
$d_i$ is the estimated separation distance between a measurement location and the mobile device;
$S_i$ is the measured signal strength; and
$S_0$ is the strength of the signal transmitted by the other mobile device.

Alternatively, the signal strength readings may be translated into distances using a path loss model, such as the following:

$$\text{RSSI}_i = acb \log_{10}(d_i)$$

where:
a is the signal strength at $d_i=1$ meter;
b is the path loss exponent; and
c is the pathloss slope with 20 being used for free space.

The lateration operations may include performing a least squares computation, which may accomplished by a processor calculating the following formula:

$$\min_{(x,y)} \Sigma (d_i - \|MS_i - (x,y)\|)^2$$

where:
$d_i$ is the distance calculated based on a measured signal strength value;
$MS_i$ corresponds to the known location/position of the mobile device; and the minimization value of (x, y) is the estimated position of other mobile devices.

Figure 10:
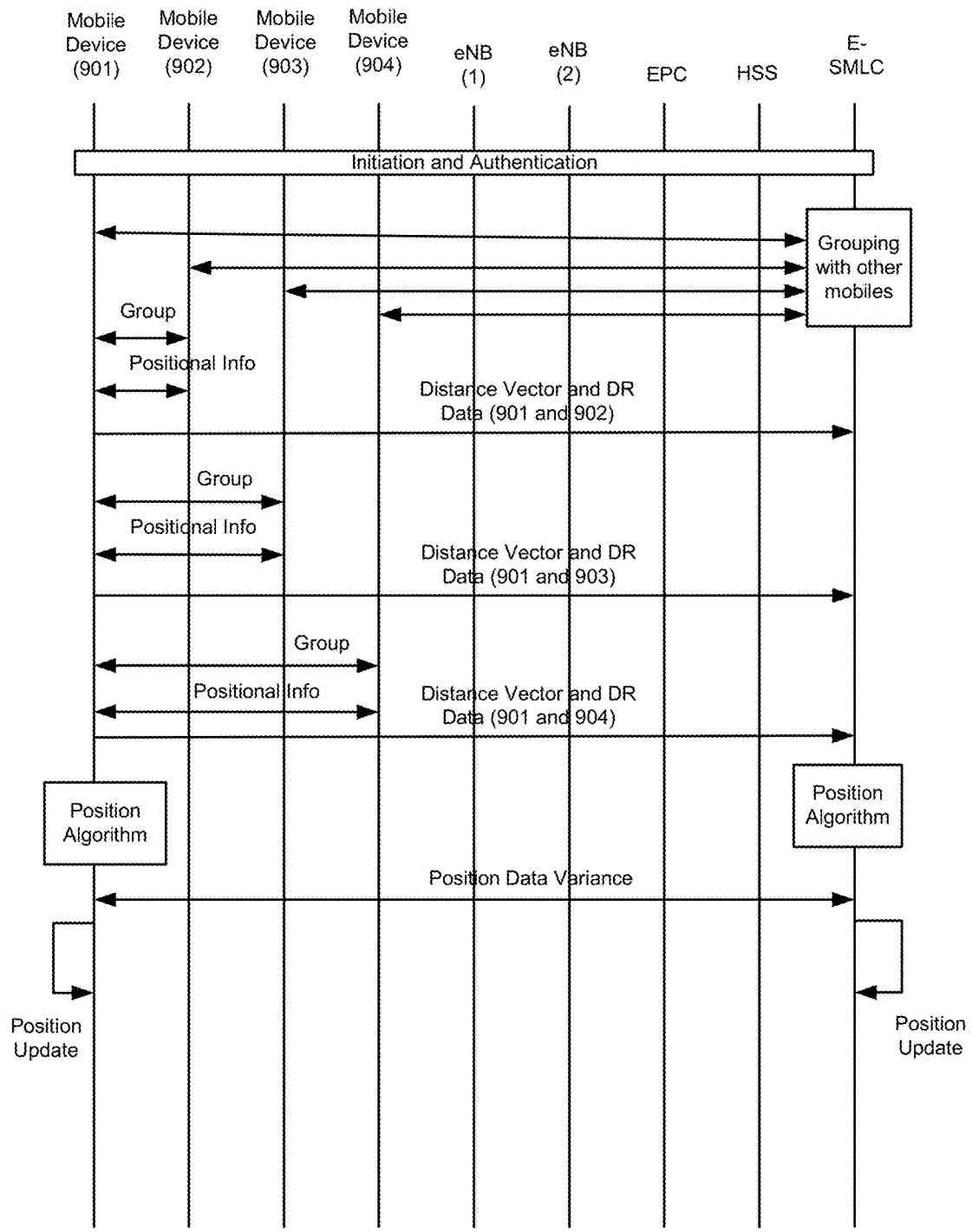
FIG. 10 is a sequence diagram illustrating an embodiment hybrid lateration method by which mobile devices may gain access to the network.

FIG. 10 illustrates an embodiment hybrid lateration method 100 in which mobile devices may gain access to the network. The mobile devices may be instructed to be grouped by the network. Mobile devices 901 and 902 may initiate sharing of information for position location, either due to the network driven grouping request or when the mobile device has lost contact with the network and attempts to find a suitable mobile device to help in its position location and possible connection to the network via a relay or to another network.

Mobile device 901 may send a request for position information to mobile device 902. The information may be sent after the authentication process between mobile devices, and may include a time stamp. The time stamp may be sub seconds in size (e.g., milliseconds). The mobile device 902 may respond with a message that also has a time stamp, and timing information pertaining to when the mobile device 902 received the time stamp from mobile device 901. Three messages may be transferred quickly to establish time synchronization. The time differences may then be compared, along with possible pulses or pings, to establish an estimated distance vector between the mobile devices. Knowing the distance vector and the x, y, and z coordinates of both 901 and 902, a point-to-point fix may be established.

The mobile device 901 may then initiate communication with mobile devices 903, 904 and repeat the operations discussed above with respect to mobile device 902 for each of mobile device 903, 904. After obtaining two or more distance vectors along with positional information, the mobile device 901 may compare the new coordinates to its previously computed current location, and adjust the location computations accordingly.

The positional information distance vectors may be sent to the network for positional processing with other network positional information. Based on the position calculated for the mobile device, the network (i.e., a component in the network, such as a network server or E-SMLC) may instruct the mobile device to adjust its positional information.

Additionally the mobile device 901 may also make a positional correction if the network does not respond in time, which may result in a message update time out. Alternatively, when the network cannot make the necessary correction, and the positional information may be used by another component and/or other mobile devices to perform the necessary corrections.

If the error is greater than x % for a lower positional confidence level then no update is required. As the mobile receives other sensor data and more than a pre-described distance in any direction or a combined distance vector than the positional update process begins again. If the x % of positional confidence level is less than desired, additional positional updates may be made with the grouped mobile devices (e.g., iteratively) to improve the confidence level of the positional information. Additionally if the positional information from one of the mobile devices that is being attempted to obtain a distance vector appears to be in error, then that mobile devices data may be selected to not be used for this iterative step of performing positional updates with other grouped mobile devices. However it will continue to be queried as part of the process since its position location could be corrected in one of the steps it is taking to improve its position location as well.

Additionally, in the event that one or more mobile devices lose communication with the core network it will still be possible to maintain position accuracy through one of the other grouped mobile devices. It will also be possible to continue to maintain a communication link by establishing a network relay connection with another of the mobile devices in the same group which still has communication with the network itself.

Figure 11:
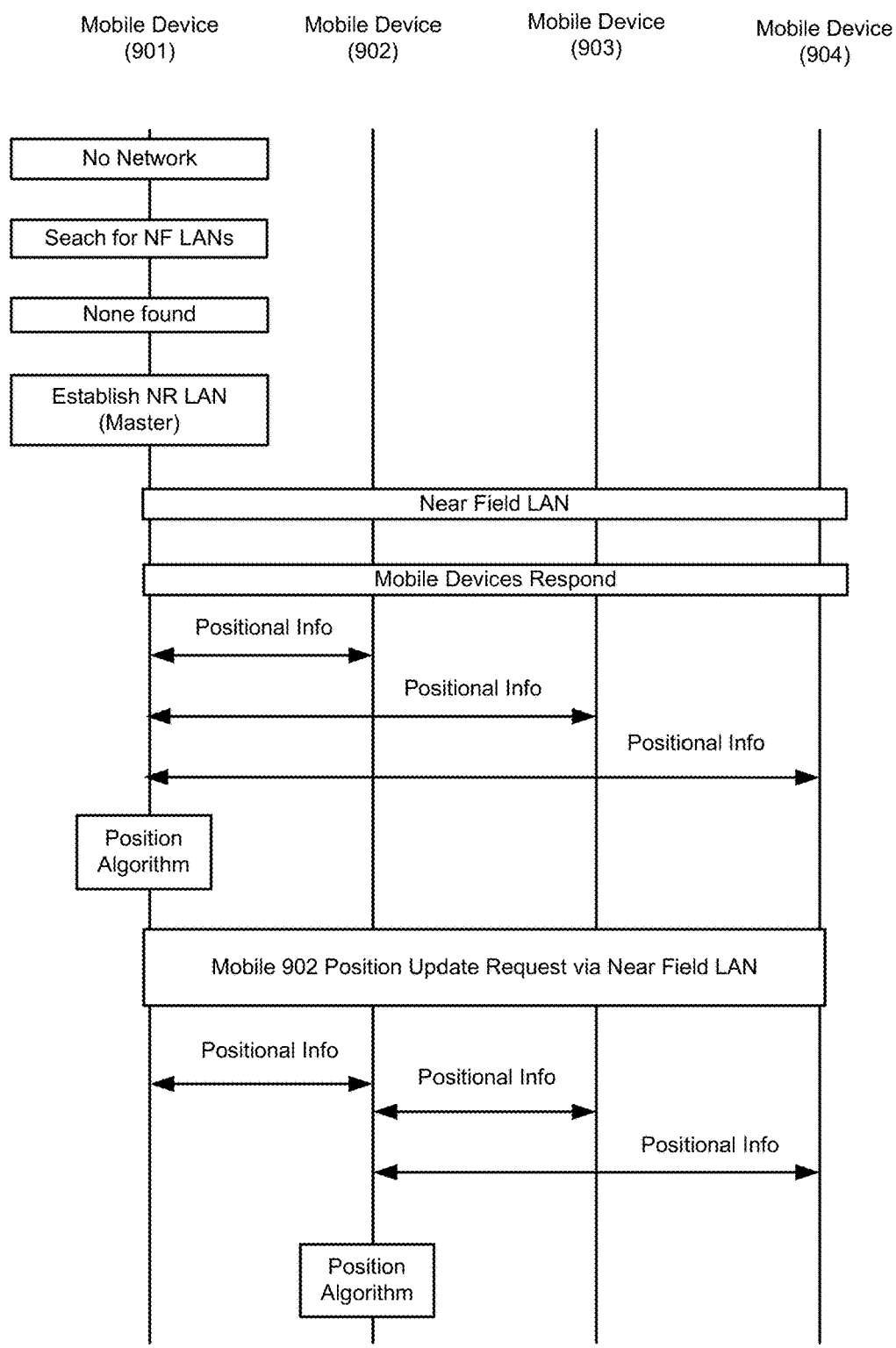
FIG. 11 is a sequence diagram illustrating another embodiment hybrid lateration method in which a mobile device cannot locate a network due coverage problems.

FIG. 11 illustrates another embodiment hybrid lateration method 100 in which a mobile device cannot locate a network due to coverage problems. The mobile device 901 may operate in an autonomous mode and attempt to locate another mobile device. The other mobile device could be used to relay information to the network and possibly set up a near field communication bridge in addition to providing location enhancement capability.

In the example illustrated in FIG. 11, mobile device 901 establishes a near field LAN inviting other mobile devices in proximity to communicate with it. Positional information can then be shared and the mobile device 901 can have its location improved and the positional information can be relayed back to the core network via another mobile device.

The mobile device 901 may also communicate its positional information and establish near field communication link with a mobile device that is not part of the home network associated with mobile device 901.

The mobile devices may have the USIM, SIM, PRL or access point information pre-built in. The mobile device for first responders may have the incident radio system set as their preferred system, or in the case that the radio access system being used as a public safety network.

For first responders to utilize a wireless mobile network (e.g., LTE) the position location information accuracy needs to improved for in building environments in addition to providing more accurate location information about where the mobile devices are actually located. Whether the mobile device is used by a first responder, commercial cellular user, or a combination of both.

The positional location improvement for first responders may be helpful to improve situation awareness, improved telemetry and overall communication with the incident commander. Since all incidents for first responders tend to be fluid, the ability to account for a dynamic environment of mobile devices coming into and out of the incident area. In addition the mobile devices proximity location to other mobile devices can and will change as the incident situation changes where resources are added and/or reassigned as the need arises for operational requirements.

The use of network and terminal driven position enhancement techniques previously discussed may be exploited. The grouping of mobile devices may be done either as part of pre-plan, with intervention by the incident commander or driven from the commercial wireless network, public safety wireless network, or local incident communication system (ICS) 1204 based on reported proximity of the mobile devices.

Figure 12A:
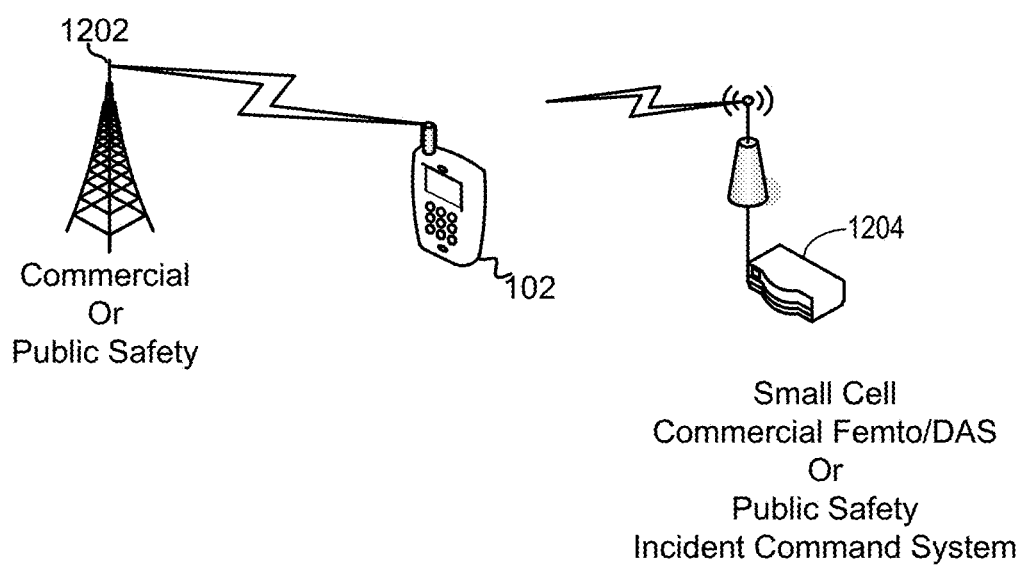
FIGS. 12A-12C are component block diagrams illustrating functional components, communication links, and information flows in an embodiment method of transferring a connection from a local radio system to the small cell system.

FIG. 12A illustrates that upon arriving at the incident scene, a mobile device 102 may recognize the existence of a local radio network 1202. If there is no ICS radio network 1204 with which the mobile device may connect, the mobile device 102 will continue to communicate via a commercial or other wireless network, 1202.

Figure 12B:
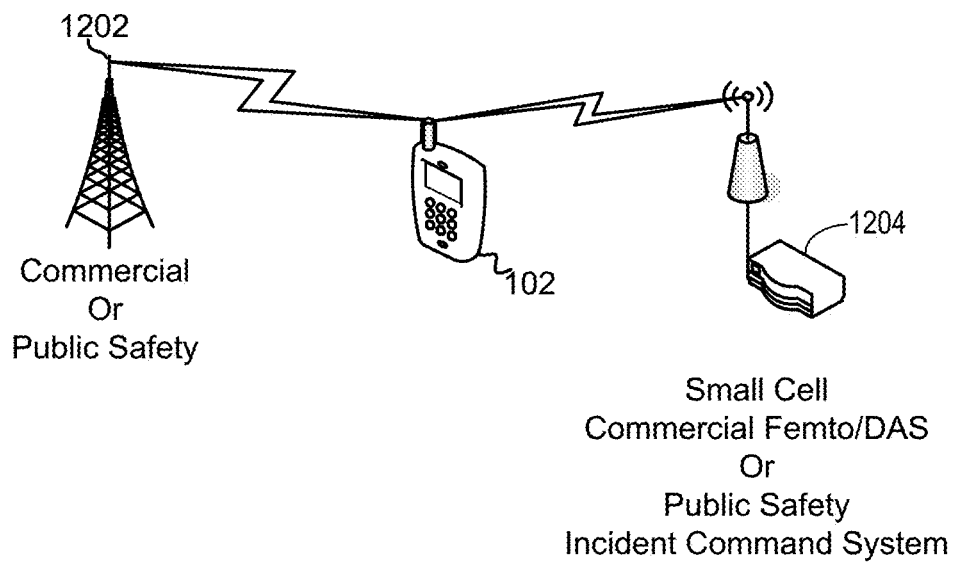

FIG. 12B illustrates that the mobile device 102 may determine that there is a valid local radio system 1202 with which it may communicate, and may have a priority access to small cell system 1204 based on a preferred network and cell selection process the mobile device 102 has been instructed to use.

Figure 12C:
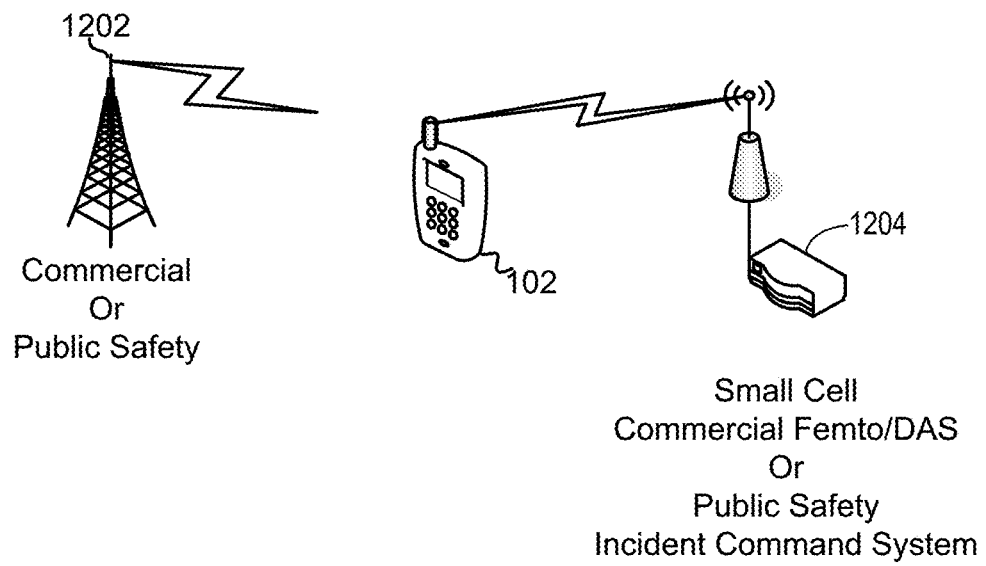

FIG. 12C illustrates that the mobile device 102 may transfer the connection from the local radio system 1202 to the small cell system 1204.

For first responders when a situation arises that requires finding a man down or responding to an emergency call (911) the location based process can be used to help in the search and rescue of the person.

Figure 13A:
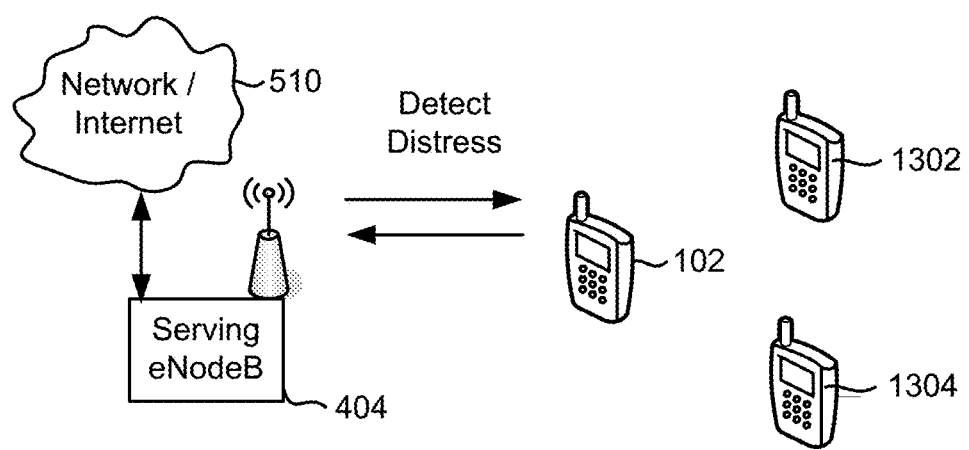
FIGS. 13A-13C are component block diagrams illustrating functional components, communication links, and information flows in an embodiment method of identifying and responding to a distressed mobile device.

FIG. 13A illustrates that the mobile device 102 may be identified by the network as being in distress via network monitoring of the mobile device 102 or via the mobile device transmitting a distress signal. The distressed mobile device 102 may determine that it has lost communication with the network, and may instruct the wearer/user to either disable or initiate a distress signal. The mobile device 102, upon initiation of a distress signal, may begin a grouping process previously defined.

Figure 13B:
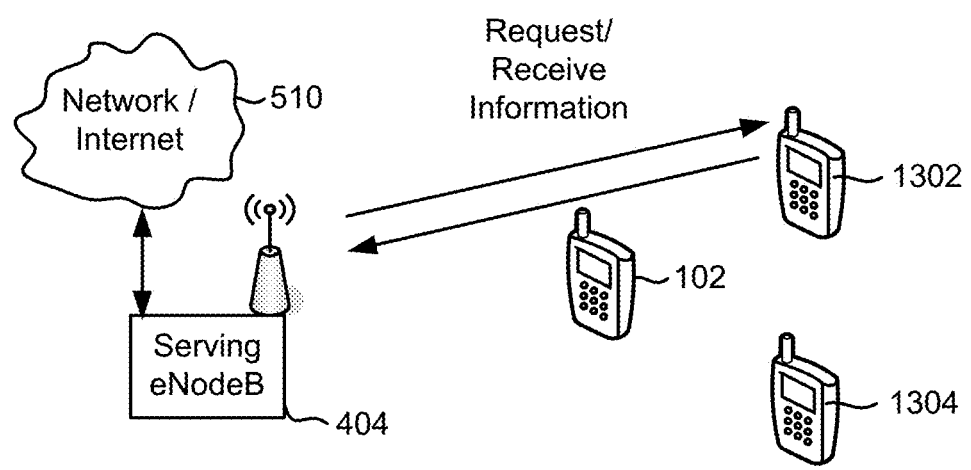

FIG. 13B illustrates that the network 510 to which the serving eNodeB 404 is connected to may instruct a mobile device 1302 in the same group as the distressed mobile device 102 to report the last known location of the mobile device 102 and time stamp.

Figure 13C:
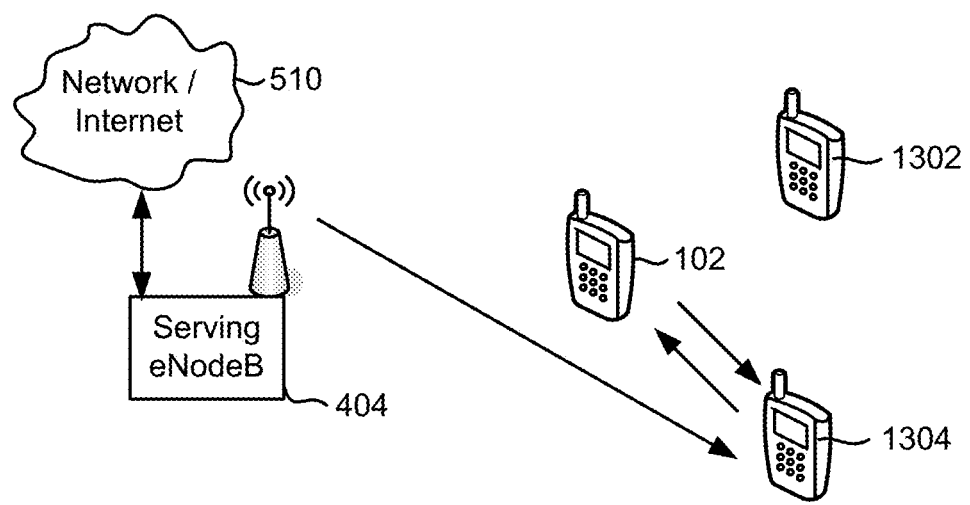

FIG. 13C illustrates that the network 510 may instruct additional mobiles devices 1304 to attempt to group with the distressed mobile device 102.

Figure 14:
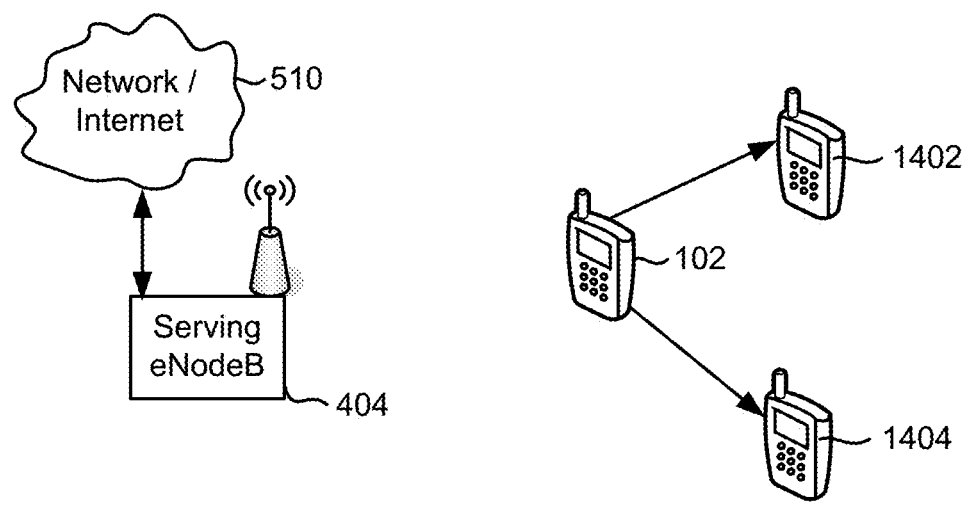
FIG. 14 is a component block diagrams illustrating functional components, communication links, and information flows in an embodiment method of performing dead reckoning grouping mobile devices in an ad-hoc scheme.

FIG. 14 illustrates that when the mobile device 102 is unable to communicate with the network 510, it may be operating under a dead reckoning process and continue to attempt to locate other mobile devices 1402, 1404 and group with them under an ad-hoc scheme.

Once the mobile device has been grouped, or is still connected to the network, the relative location of the mobile device will be sent to all the mobile devices that are in active search for that mobile device. The selection of which mobile devices will be searched may be determined by operator intervention and selection.

Figure 15:
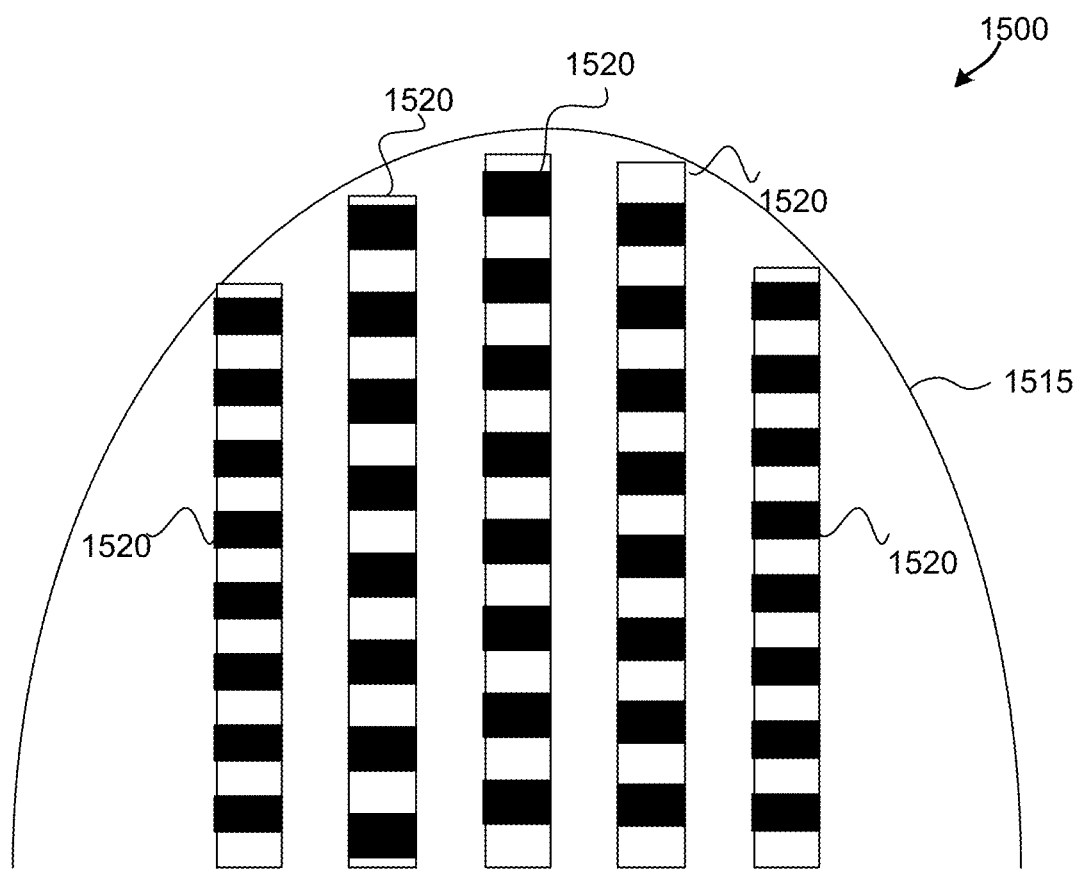
FIG. 15 is an illustration of an enhanced antenna that may be used with various embodiments to further improve positional accuracy.

FIG. 15 illustrates an embodiment enhanced antenna scheme 1500 that may be used by wireless network operators or first responders to improve the positional accuracy for the mobile device. The enhanced antenna scheme 1500 may include a radome 1515 that is curved over a series of patch antennas 1520. Several antennas 1520 may be used achieve better angle of arrival measurement. In an embodiment, the enhanced antenna scheme 1500 may include an array of antennas 1520 on flexible circuit boards so they can conform to the radome 1515.

Figure 16A:
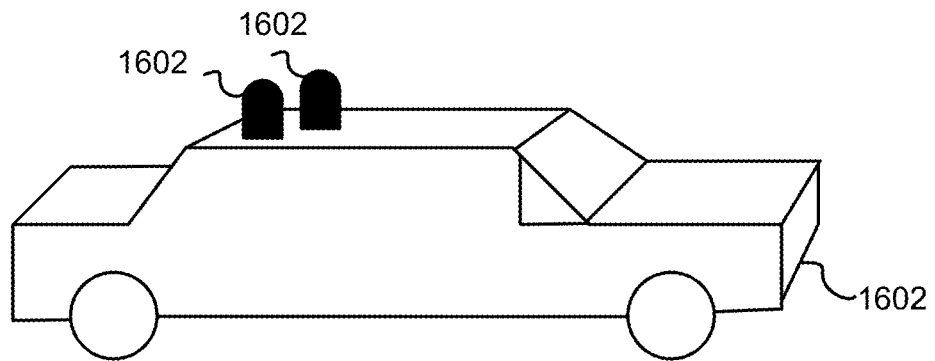
FIG. 16A-B are illustrations of various enhanced antenna configurations that may be used with the various embodiments to further improve positional accuracy.
Figure 16B:
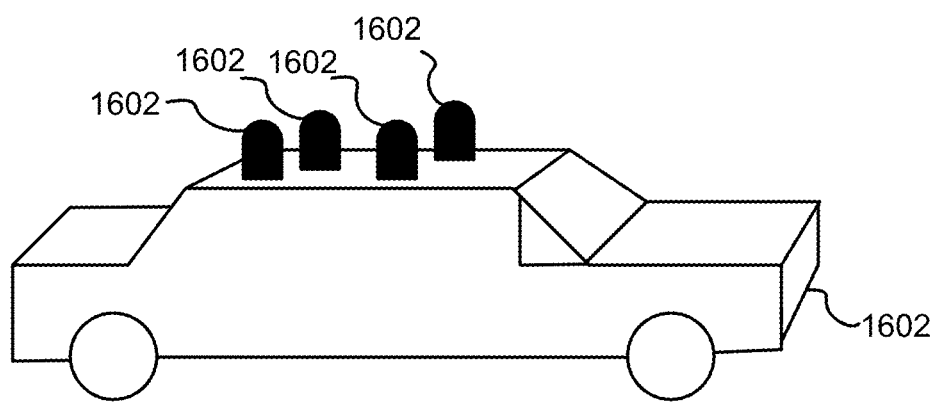

FIG. 16A-B illustrate that the above mentioned enhanced antenna scheme 1500 may be implemented on a vehicle 1602. Specifically, FIG. 16A illustrates an enhanced antenna scheme 1500 that includes two antennas 1602 for this purpose. FIG. 16B illustrates an enhanced antenna scheme 1500 that includes four antennas 1602 for this purpose. Each antenna 1602 may include an array of antennas 1520 on flexible circuit boards so they can conform to the radome 1515.

Figure 17A:
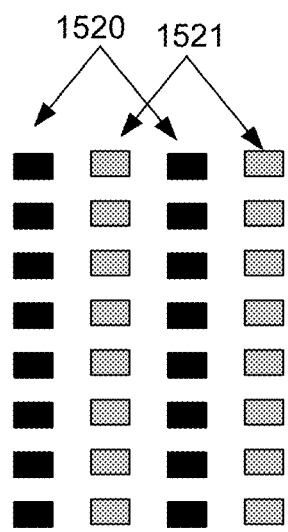
FIG. 17A-B are sectional diagrams illustrating strips of antenna patches that may be used in various embodiments.
Figure 17B:
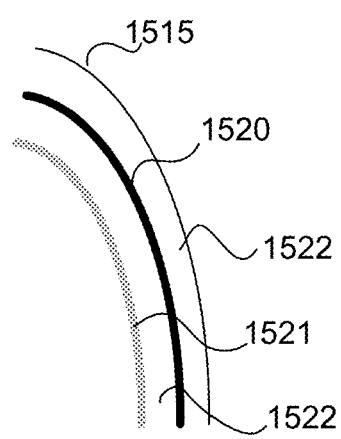

FIG. 17A-B illustrate strips of antenna patches that may be used in various embodiments. FIG. 17A illustrates two strips of antenna patches 1520 and 1521 next to each other in an antenna array (which may be on a flexible circuit board so they conform to a radome). FIG. 17B is an illustration of a cross sectional view of the radome 1515 in which the antenna patches 1520 and 1521 of the antenna array are shown layered. The antenna patch 1520 is closer to the outer radome cover 1515 than is antenna array 1521. A fiber glass or a transparent RF medium 1522 may provide rigidity and enable the antennas to be closely spaced. The antenna array may be cone shaped using a flexible circuit design (for receive only configurations). Envelope detectors may be used to determine which of the antenna patches are receiving the highest quality signal from the mobile device using an amplitude method for detection.

In an embodiment, the detection and tracking of a mobile device may be controlled so that the measurements are in-synch with a eNodeB pulse request to the mobile device for positional information.

Figure 18:
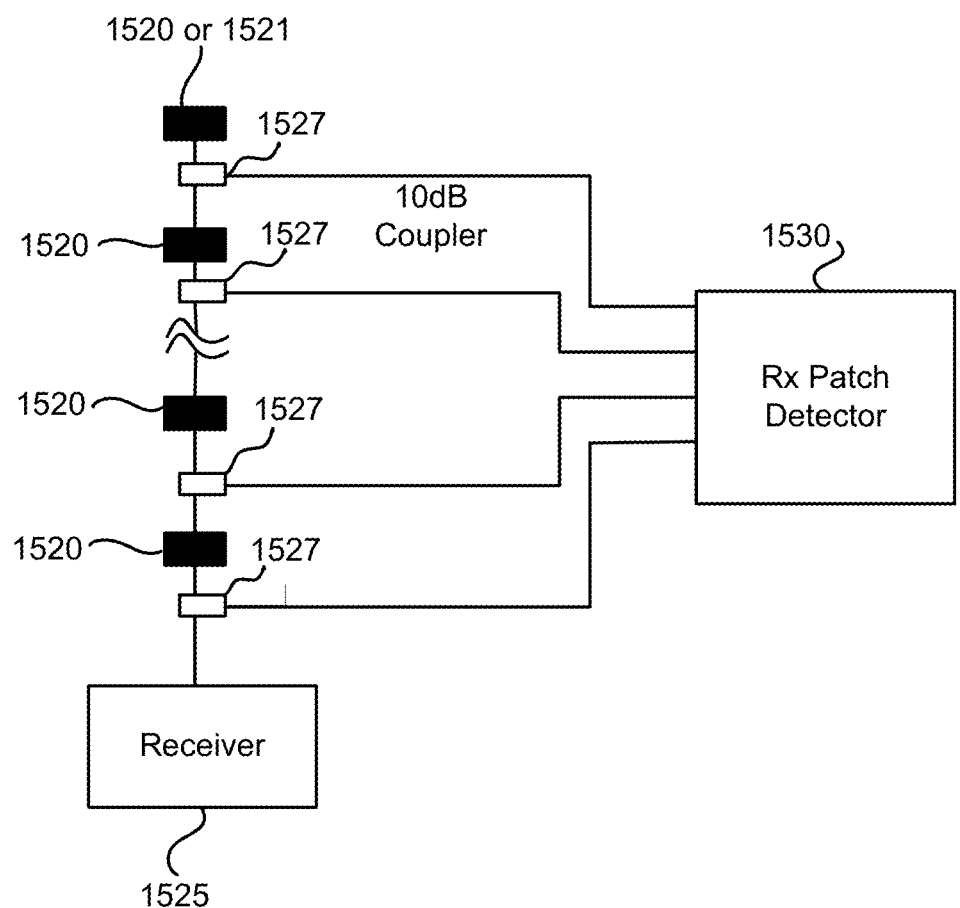
FIG. 18 is a circuit diagram of antenna system suitable for use with various embodiments.

FIG. 18 illustrates an antenna array (1520 or 1521) in which the antenna system is connected to the normal antenna port on a receiver (e.g., eNodeB) 1525. Each of the patch antennas may be matched to a 10 db coupler 1527 and configured to provide a port coupling to a receive patch detector 1530. The receive patch detector 1530 may be configured to determine which patch antenna has the strongest signal, and based on the number of patch antennas and the distance calculation, another altitude measurement may be made by the mobile device.

In an embodiment, the antenna array system may not be connected to the eNodeB receiver 1525 and control coordination may be provided by the E-SMLC for synchronization of the received signal from the mobile device.

Figure 19:
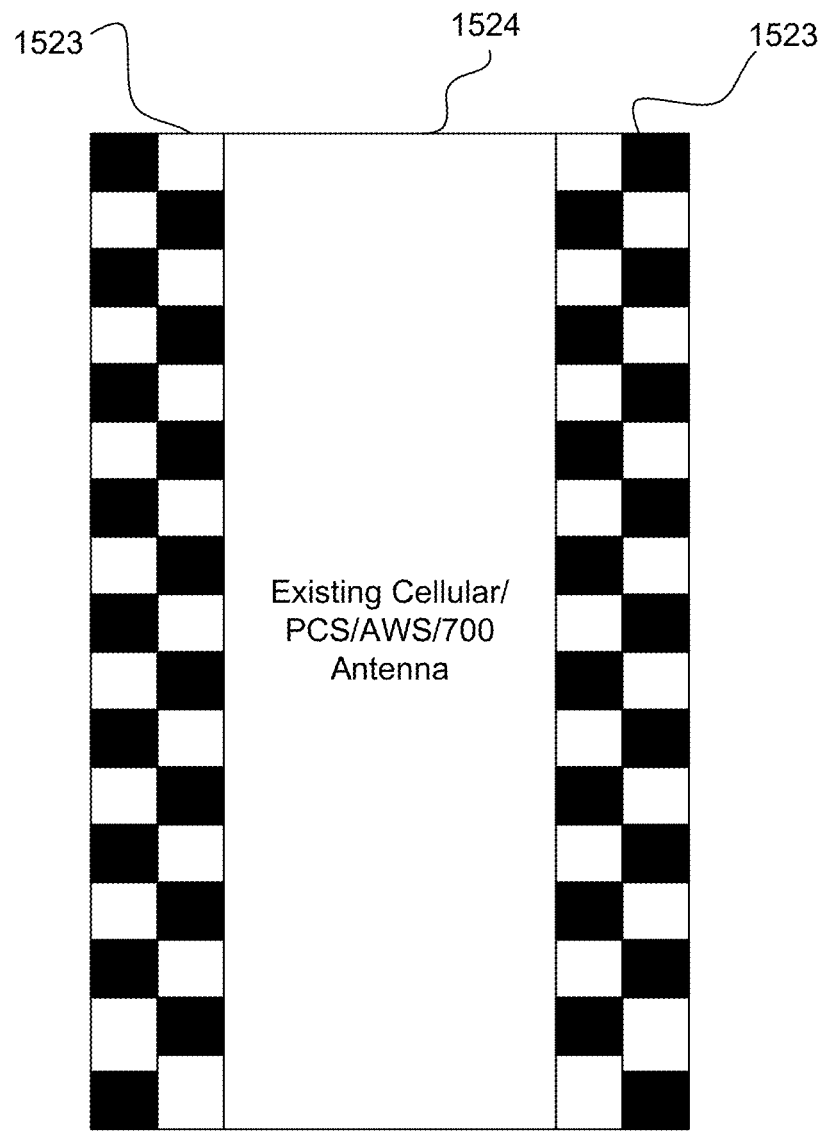
FIG. 19 is an illustration of an embodiment antenna array retrofitted into an existing cellular wireless network in accordance with an embodiment.

FIG. 19 illustrates an embodiment antenna array 1523 retrofitted into an existing cellular wireless network. The array 1523 may be installed in parallel to an existing antenna 1524. A control mechanism that is the same as or similar to the control mechanism illustrated in FIG. 18 may used for the commercial applications.

Figure 20:
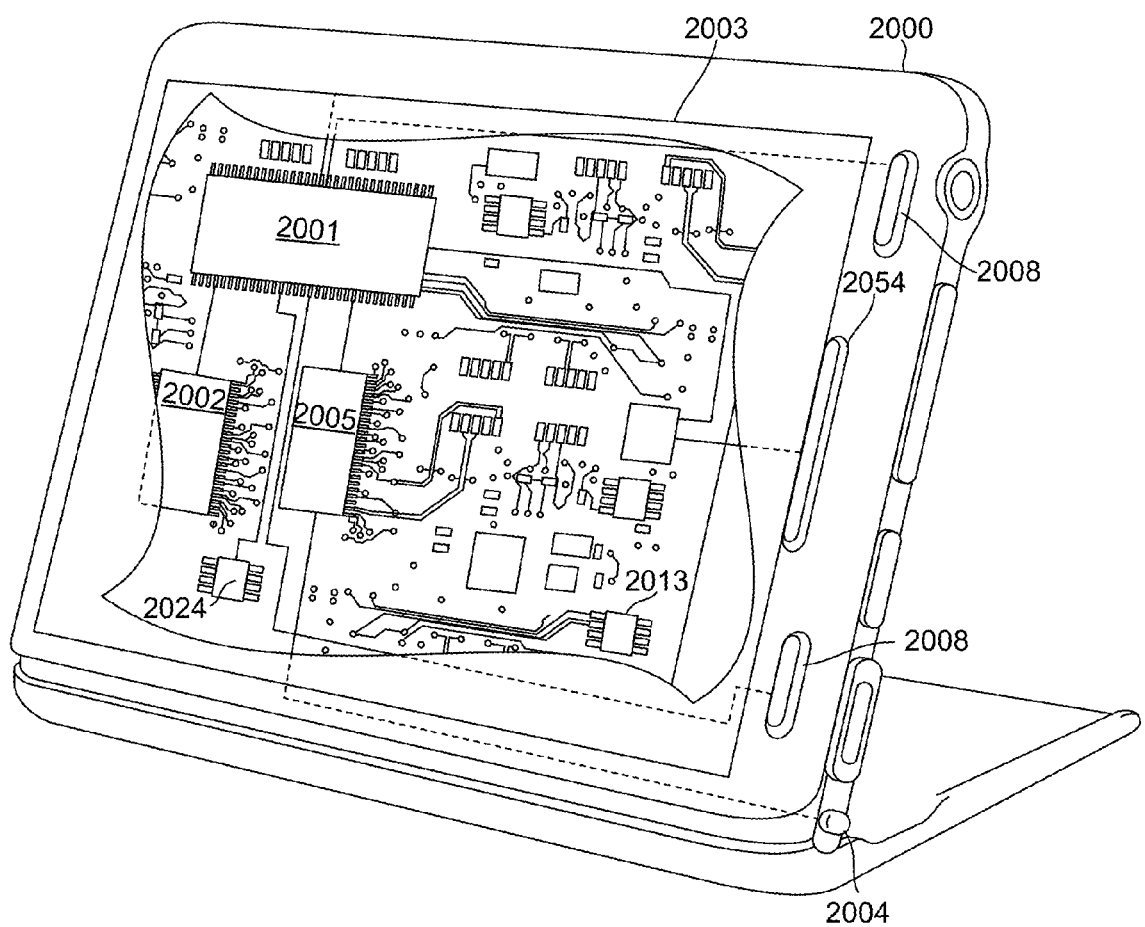
FIG. 20 is a component block diagram of a mobile device suitable for use with an embodiment.

The various embodiments may be implemented on a variety of mobile computing devices, an example of which is illustrated in FIG. 20. Specifically, FIG. 20 is a system block diagram of a mobile transceiver device in the form of a smartphone/cell phone 2000 suitable for use with any of the embodiments. The cell phone 2000 may include a processor 2001 coupled to internal memory 2002, a display 2003, and to a speaker 2054. Additionally, the cell phone 2000 may include an antenna 2004 for sending and receiving electromagnetic radiation that may be connected to a wireless data link and/or cellular telephone transceiver 2005 coupled to the processor 2001. Cell phones 2000 typically also include menu selection buttons or rocker switches 2008 for receiving user inputs.

A typical cell phone 2000 also includes a sound encoding/decoding (CODEC) circuit 2024 which digitizes sound received from a microphone into data packets suitable for wireless transmission and decodes received sound data packets to generate analog signals that are provided to the speaker 2054 to generate sound. Also, one or more of the processor 2001, wireless transceiver 2005 and CODEC 2024 may include a digital signal processor (DSP) circuit (not shown separately). The cell phone 2000 may further include a peanut or a ZigBee transceiver (i.e., an IEEE 802.15.4 transceiver) 2013 for low-power short-range communications between wireless devices, or other similar communication circuitry (e.g., circuitry implementing the Bluetooth® or WiFi protocols, etc.).

Figure 21:
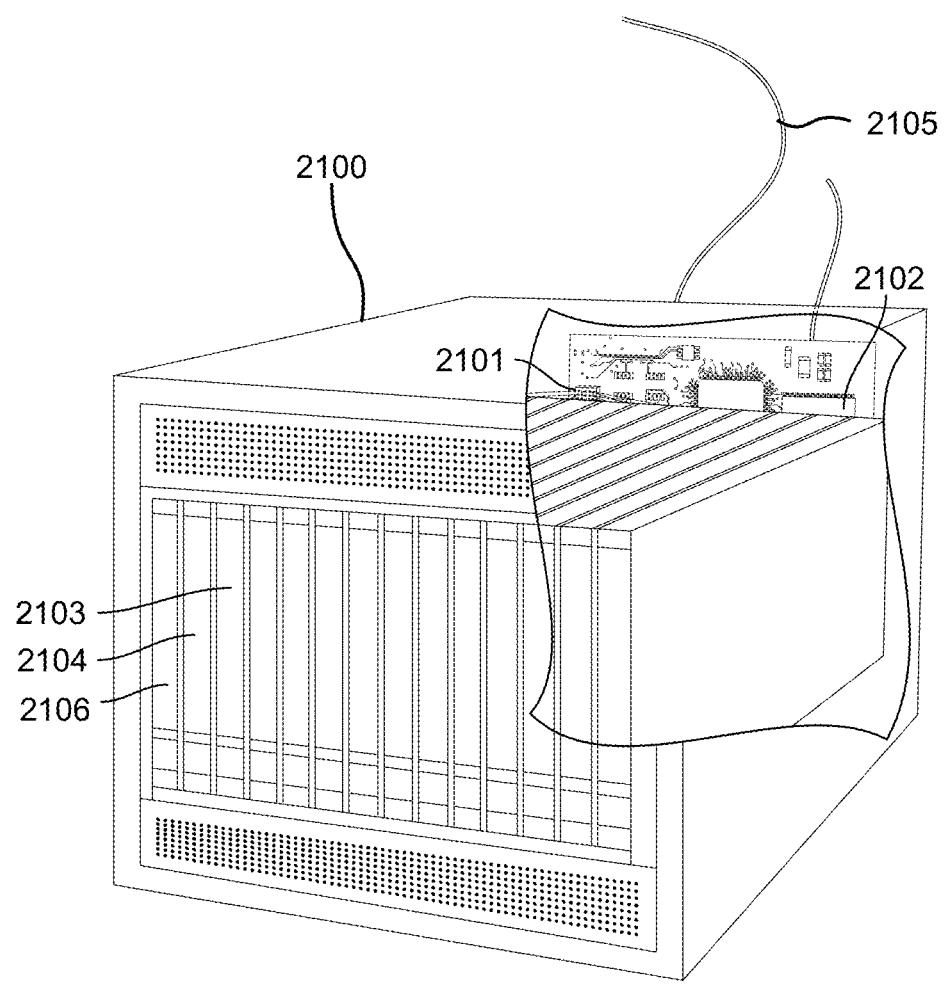
FIG. 21 is a component block diagram of a server suitable for use with an embodiment.

Various embodiments may be implemented on any of a variety of commercially available server devices, such as the server 2100 illustrated in FIG. 21. Such a server 2100 typically includes one or more processors 2101, 2102 coupled to volatile memory 2103 and a large capacity nonvolatile memory, such as a disk drive 2104. The server 2100 may also include a floppy disc drive, compact disc (CD) or DVD disc drive 2106 coupled to the processor 2101. The server 2100 may also include network access ports 2106 coupled to the processor 2101 for establishing data connections with a network 2105, such as a local area network coupled to other communication system computers and servers.

The processors 2001, 2101, and 2102 may be any programmable microprocessor, microcomputer, or multiple processor chip or chips that can be configured by software instructions (applications) to perform a variety of functions, including the functions of the various embodiments described below. In some mobile devices, multicore processors 2102 may be provided, such as one processor core dedicated to wireless communication functions and one processor core dedicated to running other applications. Typically, software applications may be stored in the internal memory 2002, 2103, and 2104 before they are accessed and loaded into the processor 2001, 2101, and 2102. The processor 2001, 2101, and 2102 may include internal memory sufficient to store the application software instructions.

A wireless device may be a mobile wireless device or a fixed wireless device. A fixed wireless device may be a fixed infrastructure node (FIN) or fixed infrastructure device (FID), such as a cell tower antenna, an eNodeB, a small cell device, a femtocell or femtocell device, a WiFi access node, or a beacon device, etc.

A waypoint may be an information structure that includes one or more information fields, component vectors, location information, position information, coordinate information, etc. Each waypoint may include coordinate values (e.g., x and y coordinates, latitude and longitude values, etc.), an altitude value, a time value, a timestamp, ranking values, confidence values, precision values, a range value, and an information type identifier (e.g., GPS, Loran C, sensor, combined, etc.). The coordinate and altitude value may identify the three-dimensional location of the corresponding device. The timestamp may identify the time that the location was determined/captured. The range value may identify a distance between the external device and the wireless device (or any other device that receives or uses the location information). In the various embodiments, a waypoint may be, or may include, a location estimate value, a location fix, a location set, a location position, or any other similar location information suitable for adequately conveying or communicating location information.

Some embodiments may include components, network servers, and/or wireless devices (e.g., fixed or mobile wireless devices) that are configured to compute a precision value that identifies, or which is indicative of, the repeatability factor of the measurements (or location determinations) over multiple measurements. The precision value may be used to determine how often the device reports the same position or location information (i.e., based on evaluating multiple reports indicating that the device has not moved more than X meters, etc.). The number or frequency in which the device reports the same position/location information may be used to determine the precision of its location determination or measurement (e.g., within 1 meter, etc.). The precision value may also be used to determine the likelihood or probability that repeating the computation (e.g., using the same inputs or input sources) will result in substantially the same values. In some embodiments, the precision value may be included as part of a waypoint.

Various embodiments include a dynamic spectrum arbitrage (DSA) system that is configured to dynamically manage the availability, allocation, access, and use of telecommunication resources, such as radio frequency (RF) spectrum and RF spectrum resources. In particular, the DSA system may include various DSA components (e.g., DPC, DSC, eNodeB, etc.) that are configured to allocate or lease-out resources, activate a service, monitor the usage of the leased resources, and automatically charge accounts for the usage of the leased resources. In some embodiments, the DSA components may manage the allocation, transfer, and/or use of resources based on a geographical area. For example, the DSA components may be configured to perform auction/arbitration operations that result in a successful bidder for a geographical area (which may include two whole networks, a region, cell sites, sectors, sub-sectors, etc.), and allocate resources based on whether a wireless device is located with that geographical area. In addition, the DSA components may be configured account for the mobility of the wireless devices with respect to the available/leased resources in the geographical area, which may be accomplished by dividing a relevant geographical area into subunits, generating a grid-map information structure that identifies these geographical subunits, and using the grid-map data structure to allocate, de-allocate, and reallocate resources based on the geographical locations of the wireless devices with respect to the available resources.

As discussed above, the various embodiments include a DSA system that is configured to dynamically manage the availability, allocation, access, and use of telecommunication resources, such as radio frequency (RF) spectrum and RF spectrum resources. In particular, the DSA system may include various DSA components (e.g., DPC, DSC, eNodeB, etc.) that are configured to allocate or lease-out resources, monitor the usage of the leased resources, and automatically charge accounts for the usage of the leased resources. In some embodiments, the DSA components may manage the allocation, transfer, and/or use of resources based on a geographical area. For example, the DSA components may be configured to perform auction/arbitration operations that result in a successful bidder for a geographical area (which may include two whole networks, a region, cell sites, sectors, sub-sectors, etc.), and allocate resources based on whether a wireless device is located with that geographical area. In addition, the DSA components may be configured account for the mobility of the wireless devices with respect to the available/leased resources in the geographical area, which may be accomplished by dividing a relevant geographical area into subunits, generating a grid-map information structure that identifies these geographical subunits, and using the grid-map data structure to determine whether to allocate, de-allocate, and reallocate resources based on the geographical locations of the wireless devices with respect to the available resources.

An embodiment DSA system may include a plurality of femtocells in a first telecommunication network, an optioonal home eNodeB gateway (HGW) coupled to each of the plurality of femtocells, a dynamic spectrum controller (DSC) coupled to the HGW if present or to the home eNodeB if HGW is not present, and a dynamic spectrum policy controller (DPC) coupled to the DSC. The plurality of femtocells may include a home eNodeB (HeNB) component that is configured to perform various operations, including operations for determining whether the HeNB has been moved. The HeNB component may monitor network conditions (e.g., network congestion, resource usage, resource availability, etc.), generate and send resource and congestion reports to the home eNodeB gateway (HGW) component, determine whether there is a suitable serving HGW (home eNodeB gateway) in the first telecommunication network, identify all of the serving HGW that are suitable or available for use, establish communication links to one of the identified serving HGWs, and terminate one or more of communication links to the femtocells.

The operations described above may allow the DSA system to better support mobility, better support small cell architectures (femtocell architectures), make better or more informed resource requests, better identify the resources that could be made available for allocation, and better allocate or lease-out the resources to another network, wireless network operator, or mobile virtual network operator (MVNO). As a result, the above-described operations may improve the performance, functioning, efficiency and speed of the DSA system, which in turn, improves the performance, functioning, efficiency and speed of the participating telecommunication network(s).

Further embodiments (e.g., discussed below with reference to FIGS. 22 through 28) may include DSA components that are configured to generate and use highly accurate location information to enable self-realized leases. For example, the various embodiments may include DSA components that are configured to use enhanced location based service (eLBS) techniques to generate precise location based service (LBS) information. The DSA components may then use the LBS information to intelligently and dynamically self-determine whether to participate in a resource auction, resource lease, or other DSA functions/operations. The DSA components may also use the LBS information to intelligently and dynamically allocate or lease-out resources, monitor the usage of the leased resources, and charge the revenant accounts for the usage of the leased resources (e.g., by sending a charging report to an eNode or DSC component for forwarding to a billing system, etc.).

By generating and using highly accurate location based service information that enable the DSA components to self-realize leases (e.g., locally determine whether to allocate or lease-out resources), the embodiments further improve the performance, functioning, efficiency and speed of the DSA system and participating network(s). As an example, a femtocell (a small, low power, and/or portable device that may be configured to provide telecommunication services to wireless devices in relatively small area, etc.) may be configured to determine whether it is included in a lessor network, determine whether it has excess resources (e.g., bandwidth, spectrum, capacity, etc.) to offer for allocation, use eLBS techniques to determine its current location, use eLBS techniques to determine the locations of other wireless devices (fixed or mobile) in a given geographical area and/or within the lessor network, use eLBS techniques to determine the location of a lessee device, determine the terms of the available leases, determine whether a lessee device or network has sufficient credentials, access rights, or credits to access and use its available resources (resources in the lessor network), determine whether the lessee device is in sufficiently close proximity to use its available resources (e.g., excess bandwidth, spectrum, or capacity), determine whether the other wireless devices in the area/network are better funded, better positioned, or better equipped to provide the lessee device with access or use of the same or similar resources, and intelligently determine whether to offer the lessee device access or use of its excess resources. These operations, which may be performed independently and/or by a multitude of individual DSA components, may improve the performance, functioning, efficiency and speed of the DSA system and participating network(s)

It is often important for the DSA system (or its constituent DSA components) to determine the locations of available resources and/or their proximities to the resources or wireless devices. For example, if a DSA component (e.g., DSC or DPC) is not aware of the precise location of a femtocell in a lessor network, it may not be able to offer the telecommunication resources associated with the femtocell for allocation or use by mobile devices that subscribe to a lessee network. Similarly, a DSA component may not be able to instruct a lessee wireless device to commence using an underutilized fixed wireless device in the lessor network unless that DSA component is able determine, with a sufficiently high degree of confidence, that the wireless device is within the effective operating range of the fixed wireless device.

As further examples, the lessor network may not be able to lease out all of its available assets/resources in a geographic region unless it is able to determine the precise locations of all the assets/resources within that geographic region. A lessee network may not be able to adequately utilize the allocated spectrum resources (e.g., resources associated with a fixed wireless device, etc.) of the lessor network if the precise locations of the resources are not known and not readily determinable. It may be difficult or challenging for a DSC component to send information regarding the availability of spectrum resources to a DPC when the precise locations of the fixed wireless devices (e.g., femtocell associated with the available spectrum resources, etc.) are not known and not readily determinable.

Similarly, it may be difficult or challenging for a DPC to allocate, transfer, manage, coordinate, or lease the available resources of a first network (e.g., first E-UTRAN) for access and use by components in a second network (e.g., second E-UTRAN) when the precise locations of the fixed wireless devices associated with the available spectrum resources are not known in advance. It may also be difficult or challenging for a DPC to identify and select the most suitable/best available network from which a first network may lease or purchase additional resources if the locations of the resources is not known. It may also be difficult or challenging for a DSC to handover wireless devices 102 from lessee network to lessor network (i.e., perform handins), or to handover wireless devices 102 from lessor network back to lessee network (i.e., perform backoff), when the precise locations of the resources are not known.

Thus, it is important for DSA components to be able to accurately determine and their locations and/or their proximities to other devices. In some embodiments, the DSA components may determine their locations by using a geo-spatial positioning technology, such as GPS. However, there are a number of challenges associated with using geo-spatial positioning technologies, and it may be difficult or inefficient for the DSA components to ascertain the locations of all the resources (e.g., fixed wireless devices, etc.) in the network with a sufficiently high degree of accuracy and precision at all times via existing geo-spatial positioning technologies.

One of the challenges associated with using geo-spatial positioning technologies is that a device's ability to acquire satellite signals and navigation data to calculate its geospatial location (called "performing a fix") may be hindered when the device is indoors, below grade, and/or when the satellites are obstructed (e.g., by tall buildings, etc.). Another challenge associated with using geo-spatial positioning technology on or with a DSA component is that the presence of physical obstacles, such as metal beams or walls, may cause multipath interference and signal degradation of the wireless communication signals when the device/component is indoors or in urban environments that include tall buildings or skyscrapers. Similarly, in rural environments, the device/component may not have sufficient access to satellite communications (e.g., to a global positioning system satellite) to effectively ascertain and broadcast its current location. Yet another challenge associated with using geo-spatial positioning technology on or with a DSA component is that position information (e.g., Lon, Lat and Alt values) generated by existing technologies are often not sufficiently accurate or precise so that they may be used in a public safety network (e.g., a network dedicated to one or more of police, fire, emergency medical service or government agencies) or for emergency services (e.g., emergency location based services, etc.). The various embodiments include improved location determination solutions that overcome the above-described limitations of existing solutions and/or overcome the challenges associated with using geo-spatial positioning technologies.

The various embodiments include DSA components that are configured to overcome the above-described limitations of existing or conventional solutions.

In some embodiments, the DSA components may be configured determine the precise locations of various fixed and mobile wireless devices so that the lessor network may better or more efficiently lease out its available assets/resources, and so that the lessee network may better and more efficiently utilize leased spectrum resources of the lessor network.

In some embodiments, DSA components may be configured to determine the precise locations of the fixed and mobile wireless devices in GPS stressed environments and/or without the relying entirely on the use of geo-spatial positioning technologies.

In some embodiments, the DSA components may be configured to determine the location of a fixed or mobile wireless device at a level of position accuracy and/or with a sufficiently high degree of confidence so that the determined location (or generated location information) may be used in (or used by) public safety networks and/or for emergency services.

In some embodiments, the DSA components may be configured to use eLBS techniques to generate LBS information, and use the LBS information to enable self-realized telecommunication resources leases that improve the performance, functioning, efficiency and speed of the DSA system and telecommunication network.

In some embodiments, the DSA components may be configured to identify, locate and select all the fixed wireless devices (or FINs, FIDs, etc.) within a defined lease area for leasing of resources (e.g., wireless telecom spectrum and capacity associated with the fixed wireless devices, etc.) via the above described DSA operations.

In some embodiments, the DSA components may be configured to determine the precise locations of fixed wireless devices within a geographical area, such as an area defined in a bid area, a lease area, a grid area, or via a grid-map information structure that identifies telecommunication cells and resources in a specific geographical area. The "grid area" and "lease area" may be information structures that define a custom polygon or a partial economic area (e.g., with highly defined latitude and longitude coordinates) marking a two-dimensional geographical area. The grid/lease area may also include an altitude value, making the grid or lease area a three-dimensional area.

In some embodiments, the grid area and/or the lease area may include, may be included in, or may be a grid-map structure. In an embodiment, the DSA components may be configured to generate or update the grid-map structure based on information received from the wireless devices attached to the resources of the lessee or lessor networks. In an embodiment, the DSA components may be configured to generate or update the grid-map structure based on location information received from the fixed wireless devices. In an embodiment, the DSA components may be configured to generate the grid-map structure that includes/stores information suitable for identifying various cells/sectors and their respected coverage zones. For example, the grid-map structure may identify the cells/sectors that are in geographical area purchased or won by a lessee network as part of the DSA operations. The grid-map structure may classify each of the cells/sectors as interior or border cells. The grid-map structure may further classify the interior cells/sectors into layers, zones, or tiers based on their proximity to the border cells.

In some embodiments, the DSA components may be configured to use the locations and movements of the wireless devices with respect to the cells/sectors to determine whether to initiate intra-network and/or inter-network handover operations (i.e. to handover the device from the lessee network to the lessor network, or vice versa). The inter-network handover operations may include handin operations, backoff operations, and move-back operations.

In some embodiments, the DSA components may be configured to implement or use self-organizing network (SON) techniques and technologies. SON is an automation technology designed to improve the planning, configuration, management, optimization and healing of mobile radio access networks. The LTE specifications inherently support various SON features, such as Automatic Neighbor Relation (ANR) detection. As such LTE networks make extensive use of SON features. SON technologies have also been retrofitted for use with older radio access technologies, such as UMTS. Therefore, the use of SON technologies is not limited to LTE networks, and nothing in the claims should be limited to a specific network technology unless expressly recited as such in the claims. Further, using SON technologies, newly added network components and resources may self-configure themselves (e.g., in line with a "plug-and-play" paradigm). Operational components/resources may regularly self-optimize their parameters, operations and behaviors (e.g., in response to observed network performance, radio conditions, etc.). In addition, the network component may trigger self-healing mechanisms in order to temporarily compensate for a detected equipment outage (e.g., while awaiting a more permanent solution).

In some embodiments, the DSA components may be configured to implement or use eLBS techniques to generate LBS information that may be used to further enable or improve the SON features discussed above and/or to enable or improve any or all of the SON techniques and technologies known in the art. In some embodiments, the DSA components may be configured to use eLBS techniques in conjunction with the available SON features (e.g., of an LTE network participating in the DSA) to automatically self-configure, self-organize, and/or self-optimize their operations, including any or all of the above-described DSA operations for allocating, transferring, managing, coordinating, or leasing the available resources of a first network (e.g., an LTE network, E-UTRAN 140a, etc.) for access and use by components in a second network. In some embodiments, the DSA components may be configured to self-configure, self-organize, and/or self-optimize their operations without manual intervention or input.

By using a combination of SON and eLBS techniques to determine the precise locations of the fixed and mobile wireless devices in a given network or in a geographical area, the DSA components may self-configure, self-organize, and/or self-optimize their operations. Further, by self-configuring, self-organizing, and/or self-optimizing their operations, the embodiment DSA components may generate, use, or otherwise accomplish a self-realized lease that improves the operations of allocating, transferring, managing, coordinating, or leasing the available resources of a first network for access and use by components in a second network. These operations improve the performance, functioning, efficiency and speed of the DSA system and telecommunication network The architecture for accomplishing a self-realized lease with eLBS for wireless device could be a centralized architecture, distributed architecture or hybrid architecture.

In the various embodiments, a DSC component may be configured to establish communication links to a plurality of fixed wireless devices (e.g., femtocells and/or other fixed infrastructure devices, etc.). The fixed wireless devices may include communication links to an OAM component. The OAM component may be, or may include, a SON entity, module, or component. The OAM component (or SON entity) may include communication links to one or more DSCs. The OAM component may communicate with the DSC for lease management.

In a centralized network architecture, the OAM may have complete knowledge of the entire network and its components. The DSC may communicate with the OAM to obtain location and lease management information, perform various operations for lease management (e.g., to control the allocation and use of resources in accordance with a resource lease, etc.), generate lease management information, and/or send lease management information to the fixed wireless devices (e.g., femtocells, eNodeBs, etc.) in order to manage or control the allocation and use of resources.

In a distributed architecture and/or a hybrid architecture, each fixed wireless device (e.g., eNodeBs, etc.) could be equipped with an eLBS component or module that is configured to determine the precise location of its corresponding fixed wireless device. As such, each fixed wireless device may be aware of its precise location and position, including its current latitude, longitude, and altitude. The fixed wireless devices could also use their SON features or capabilities to determine their relative locations, and intelligently determine whether they should be included in, or excluded from, a telecommunication resource lease.

With the distributed or hybrid configuration, the self-realized lease information can be provided by the OAM or a combination of both DSC, OAM/SON, or eNodeB to eNodeB. A wireless device or FID equipped with the ability to determine its geographic location within a LTE network can utilize SON functions to determine the active leases in its area. This is useful in scenarios where a fixed wireless device is added to the network.

Additionally, when a fixed wireless device is brought up after its maintenance window, and a lease has been configured during that window, the determination of the FID's involvement or noninvolvement with the lease is critical. This assumes the wireless device will be equipped with a GIS module along with the eLBS module needed to determine its location.

Though the current discussion focuses on eNodeBs and LTE SON architecture, the concept can be extended to other FIDs with similar capabilities and applicable network architectures.

SON using eLBS for FID may be implemented in a network using several configurations. Three of the possible configurations involve a centralized, distributed and hybrid SON using eLBS. In a centralized SON architecture, OAM stores the configuration information of all the leases in the area. As soon as an eNodeB comes up, it downloads this information from OAM or the DSC. Once it determines its eLBS location using its eLBS module and the devices around it with the help of trilateration, it enables the GIS module to cull the applicable leases from the list downloaded from OAM/DSC. All the leases whose geographical area overlaps with the current eNodeB's location information shall be considered applicable. This eNodeB can also have configuration indicating whether it needs to act as lessor or lessee or both and based on this configuration, it can further filter the leases. Once the applicable leases are determined, it either self-configures them or reports the filtered leases to OAM/DSC for further decisions or actions by administrators on the eNodeB.

Figure 22:
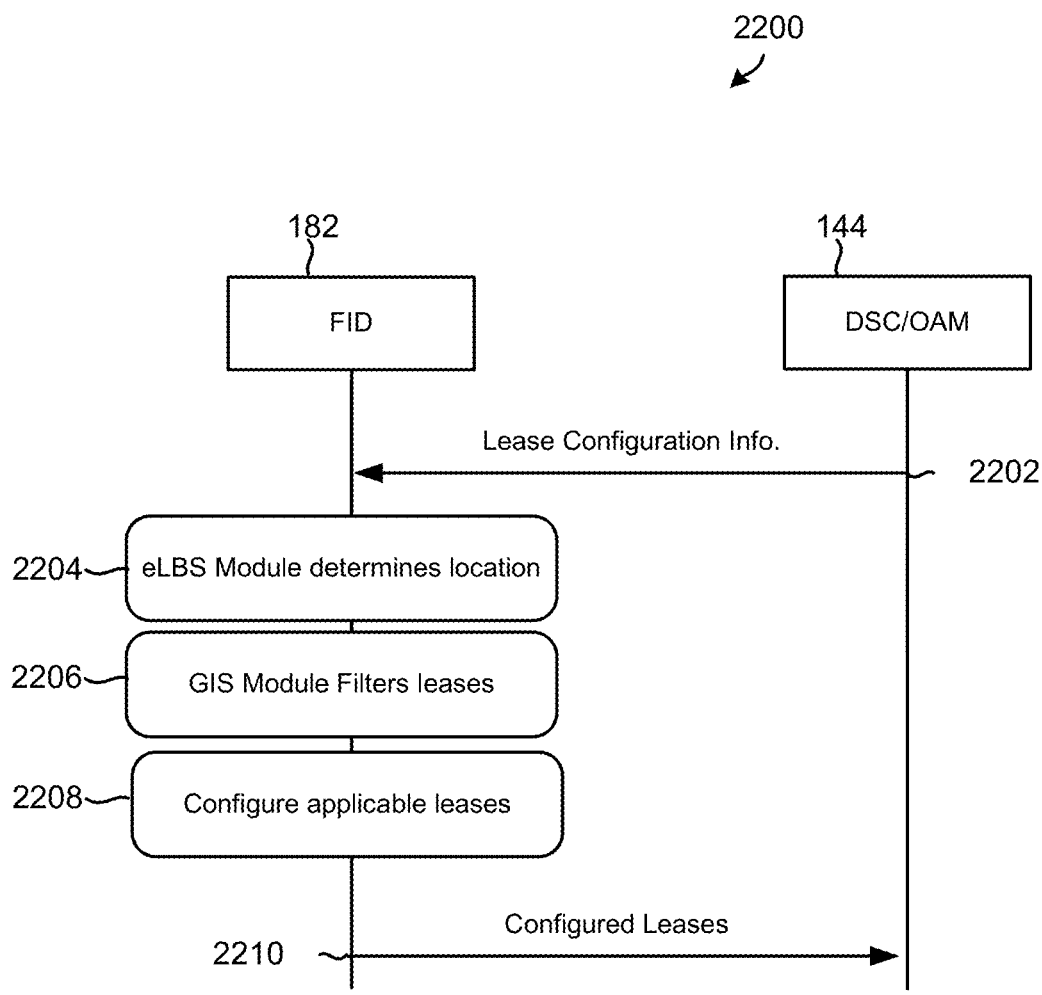
FIGS. 22 through 27 are process flow diagrams that illustrate methods of using eLBS in order to enabling self-realization of telecommunication resource leases.

FIG. 22 illustrates a self-configuration method 2200 for configuring a fixed wireless device with appropriate leases in accordance with an embodiment. In the example illustrated in FIG. 22, method 2200 is performed by processing cores in a DSC/OAM 144 component and/or a FID 182 component.

In operation block 2202, a processor of the DSC/OAM 144 may deliver lease configuration information to the FID 182. In operation block 2204, a processor (and/or an eLBS module) of FID 182 may compute, generate or determine a waypoint or location value for FID 182. The location value may include, for example, latitude, longitude and/or altitude information corresponding to the location of FID 182. In an embodiment, the waypoint or location value may include eLBS information. In an embodiment, the processor may use SON and/or eLBS techniques to determine its precise location within the network or geographical area in block 2204, and generate the location value or waypoint based on this information.

In operation blocks 2206 and 2208, processor in the FID may self-configure one or more DSA leases. In the illustrated example, in operation block 2206, the processor (and/or a GIS module) may filter the received lease configuration information based on the generated location value (e.g., eLBS information generated by the eLBS module, etc.) and identify applicable leases. In operation block 2208, the FID 182 may self-configure the identified lease based on applicable leases identified by the GIS module. In operation block 2210, FID 182 may inform DSC/OAM 144 of the self-configured leases.

Figure 23:
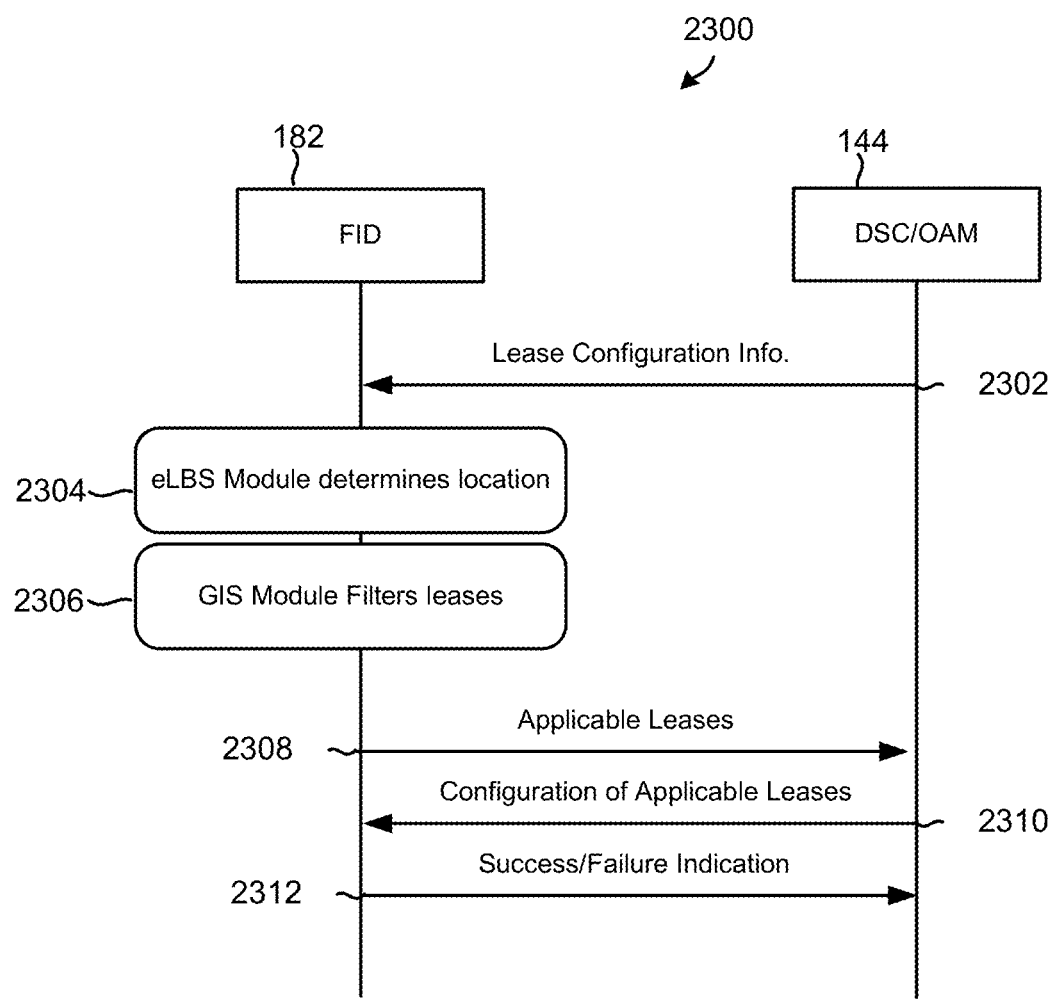

FIG. 23 illustrates a FID self-configuration method 2300 for configuring a FID with appropriate leases in accordance with an embodiment. Method 2300 may be performed by processing cores in a DSC/OAM 144 component and/or a FID 182 component.

In operation block 2302, a processor in a DSC/OAM 144 may deliver lease configuration information to FID 182. In operation block 2304, an eLBS module of FID 182 may determine a location for FID 182. Such location includes, for example, latitude, longitude and/or altitude information corresponding to the location of FID 182. In operation block 2306, a GIS module filters, based on the location of FID 182 determined by the eLBS module, the lease configuration information provided by DSC/OAM 144 to identify applicable leases. FID 182, in operation block 2308, informs DSC/OAM 144 of the identified applicable leases. DSC/OAM 144, in operation block 2310, provides configuration information for the identified applicable leases to FID 182. FID 182 self-configures based on the provided configuration information for the identified applicable leases and, in operation block 2312, provides an indication of success and/or failure to DSC/OAM 144.

In a distributed SON architecture, either the newly deployed eNodeB can request other eNodeBs with which it established X2 connections to share their lease information or the existing eNodeBs can proactively share their lease information during X2 setup procedure. Once the eNodeB receives the lease configuration information, it then triggers the GIS module to determine whether the lease(s) are applicable to it based on its eLBS location. The list can be further filtered based on the lessee/lessor configuration, if any available.

Figure 24:
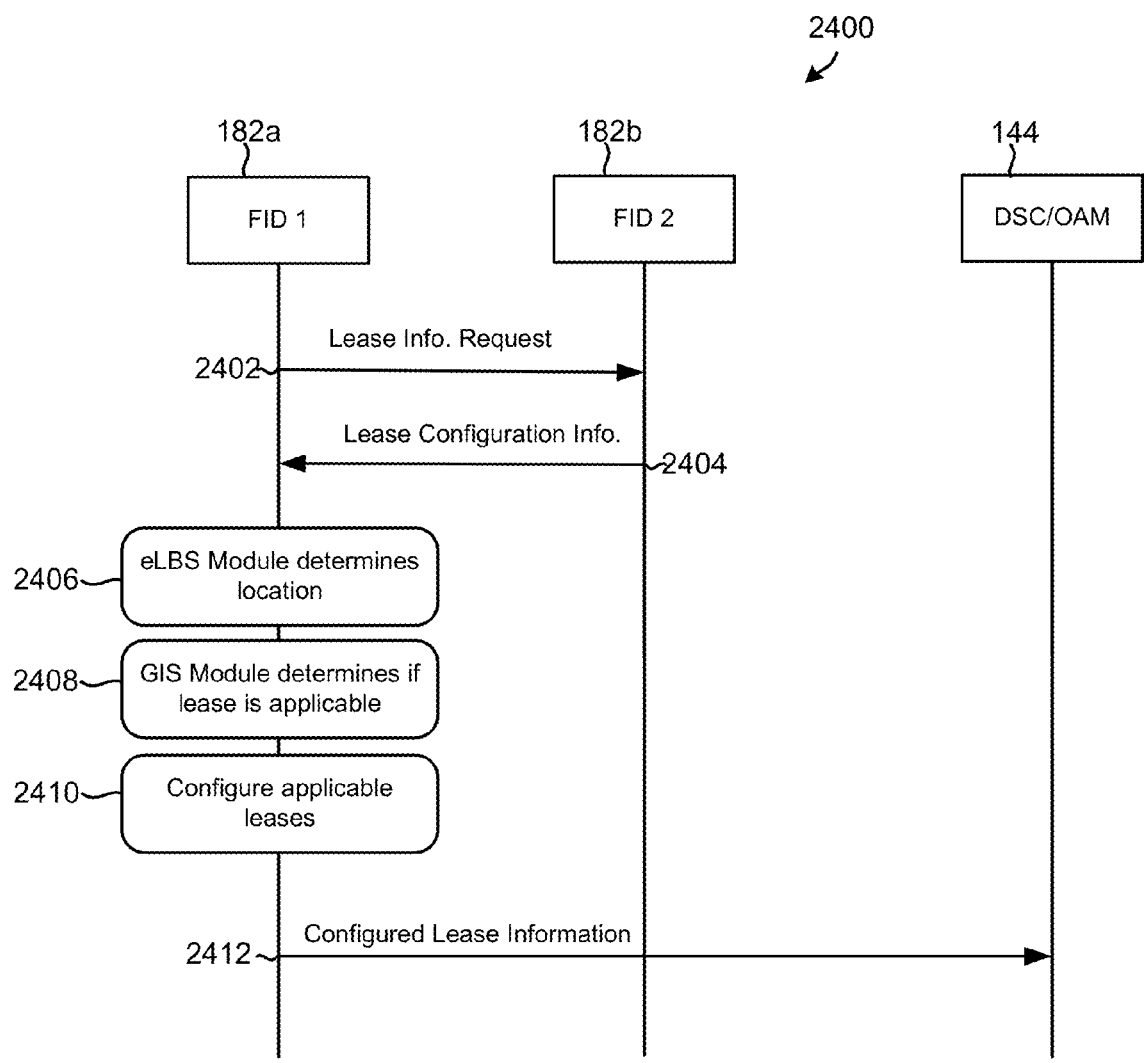

FIG. 24 shows an example of the information flow between a plurality of FIDs once a FID becomes part of the network in a distributed or hybrid architecture. Specifically, in FIG. 24, the FID 2 is already part of the network and is aware of which leases it is involved with. Once FID 1 identifies itself with the network, it can obtain lease information from FID 2. The use of having lease information provided by FID 2 can involve improvements in the FID's location using eLBS for FID and determine which lease it may be included.

More specifically, FIG. 24 illustrates a FID self-configuration method 2400 for configuring a FID with appropriate leases in accordance with an embodiment. In the example illustrated in FIG. 24, method 2400 is performed by processing cores in a DSC/OAM 144 component and FID 182a, 182b components.

In operation block 2402, FID 1 182a requests lease information from a neighboring FID, such as FID 2 182b. In operation block 2404, FID 2 182b delivers lease configuration information to FID 1 182a. In operation block 2406, an eLBS module of FID 1 182a determines a location for FID 1 182a. Such location includes, for example, latitude, longitude and/or altitude information corresponding to the location of FID 1 182a. In operation block 2408, a GIS module filters, based on the location of FID 1 182a determined by the eLBS module, the lease configuration information provided by FID 2 182b to identify application leases. FID 1 182a, in operation block 2410, completes self-configuration based on applicable leases identified by the GIS module. In operation block 2412, FID 1 182a informs DSC/OAM 144 of those applicable leases self-configured by FID 1 182a.

Figure 25:
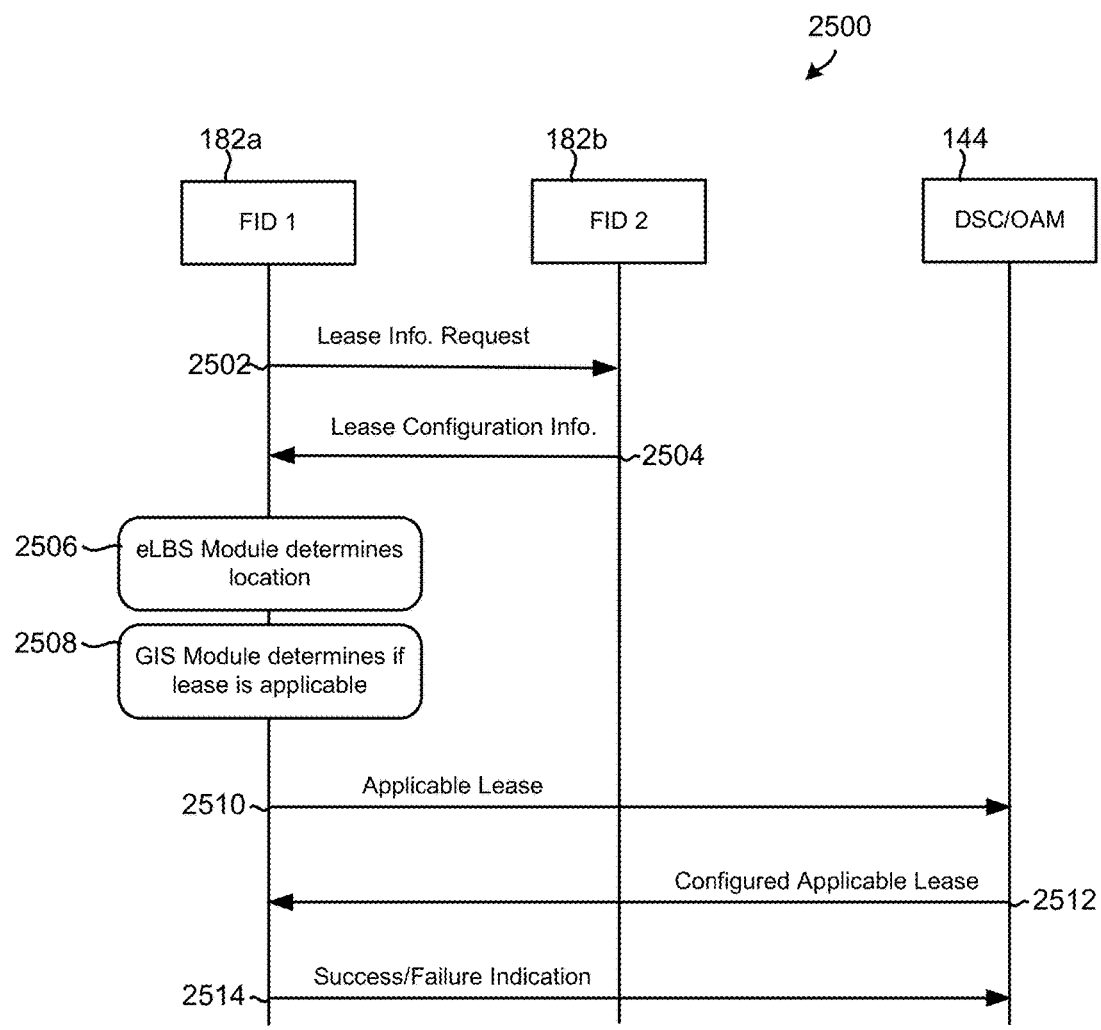

FIG. 25 is an expansion of FIG. 24 where the FID self-configures to be part of lease(s) as shown in FIG. 24 or shares the info with configuring entity as shown in FIG. 25. The use of having lease information provided by FID 2 can involve improvements in the FIDs location using eLBS for FID and determine which lease it may be included with and if it is allowed to begin transmitting if there are spectrum encumbrances like those imposed on CBSD.

FIG. 25 illustrates a FID self-configuration method 2500 for configuring a FID with appropriate leases in accordance with an embodiment. In the example illustrated in FIG. 25, method 2500 is performed by processing cores in a DSC/OAM 144 component and FID 182a, 182b components.

In operation block 2502, FID 1 182a requests lease information from a neighboring FID, such as FID 2 182b. In operation block 2504, FID 2 182b delivers lease configuration information to FID 1 182a. In operation block 2506, an eLBS module of FID 1 182a determines a location for FID 1 182a. Such location includes, for example, latitude, longitude and/or altitude information corresponding to the location of FID 1 182a. In operation block 2508, a GIS module filters, based on the location of FID 1 182a determined by the eLBS module, the lease configuration information provided by FID 2 182b to identify applicable leases. FID 1 182a, in operation block 2510, inform is DSC/OAM 144 of the identified applicable leases. DSC/OAM 144, in operation block 2512, provides configuration information for the identified applicable leases to FID 1 182a. FID 1

182a self-configures based on the provided configuration information for the identified applicable leases and, in operation block 2514, provides an indication of success and/or failure to DSC/OAM 144.

In a hybrid SON architecture, each eNodeB or FID can follow either a centralized SON approach, as described above in relation to FIGS. 22-23, or a distributed SON approach, as described above in relation to FIGS. 24-25. In LTE, the eNodeB can download configuration information from a DSC/OAM or request the configuration information from other eNodeBs with which it established X2 connections. The eNodeB can then come up with the leases that are applicable to it based on its eLBS location. Once applicable leases are determined, it can either self-configure or report the leases to the configuring entity in the network as shown above.

DSA in many instances has a LTE network leasing some of its capacity or spectrum to another wireless network operator or mobile virtual network operator (MVNO). DSA may also be used for leasing spectrum or providing a more robust command and control scheme than reliance on a database that is self-policed.

Further embodiments may include methods, and computing devices configured to implement the methods, for determining a more precise location of a wireless device and providing an enhanced location based service (eLBS). A processor in a wireless device may be configured to determine an approximate location of the wireless device, receive location information from a wireless device, and determine a more precise location of the wireless device based on the approximate location and the location information received from the wireless device.

Figure 26:
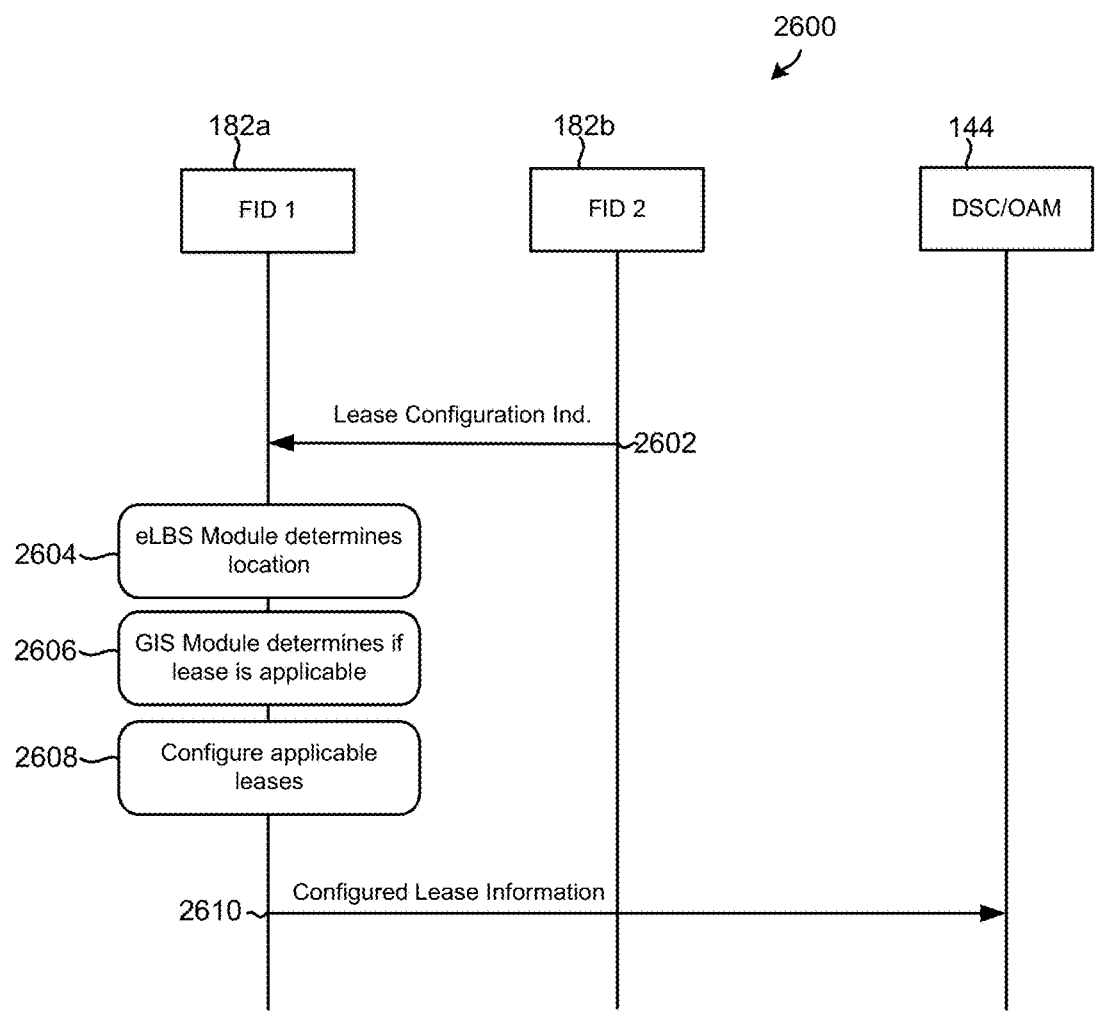
Figure 27:
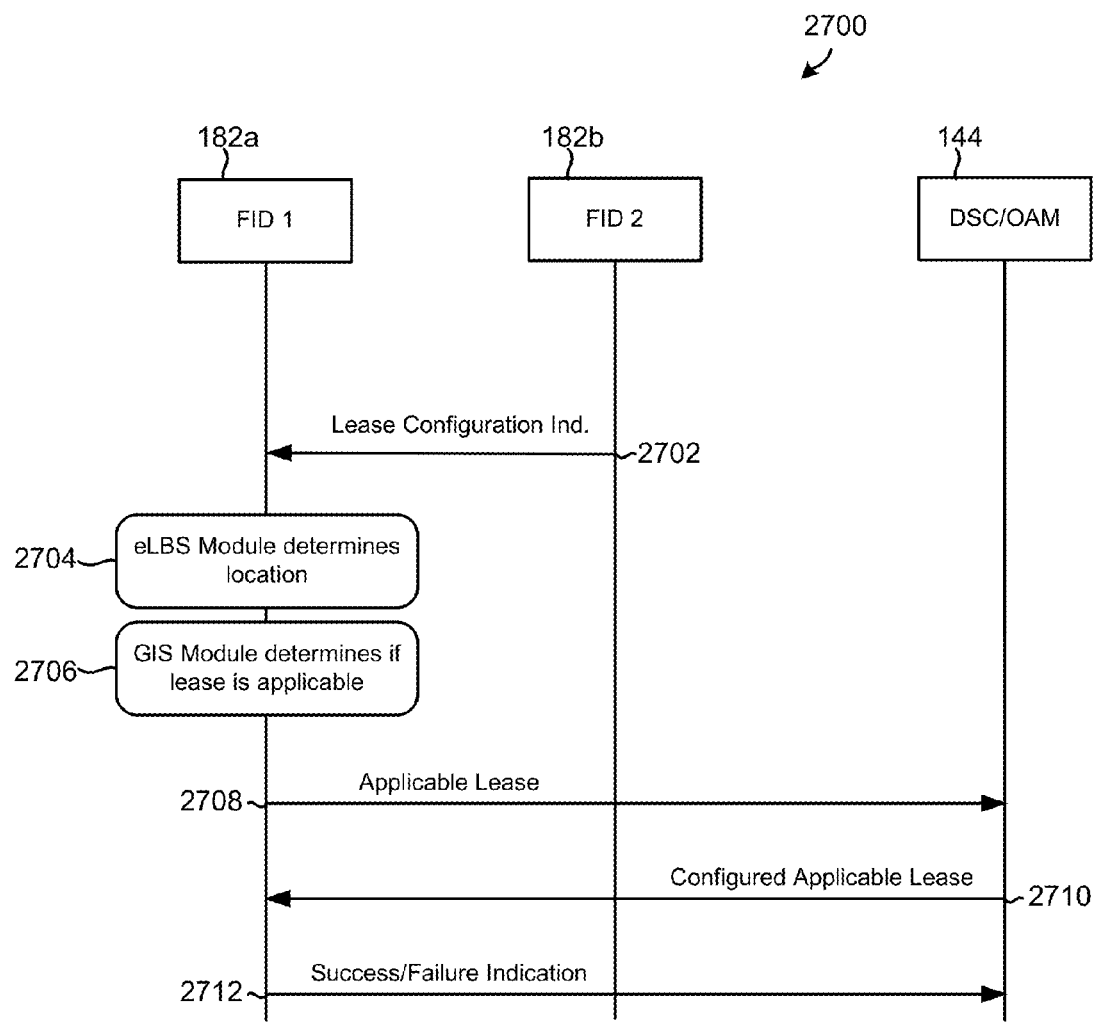
Figure 28:
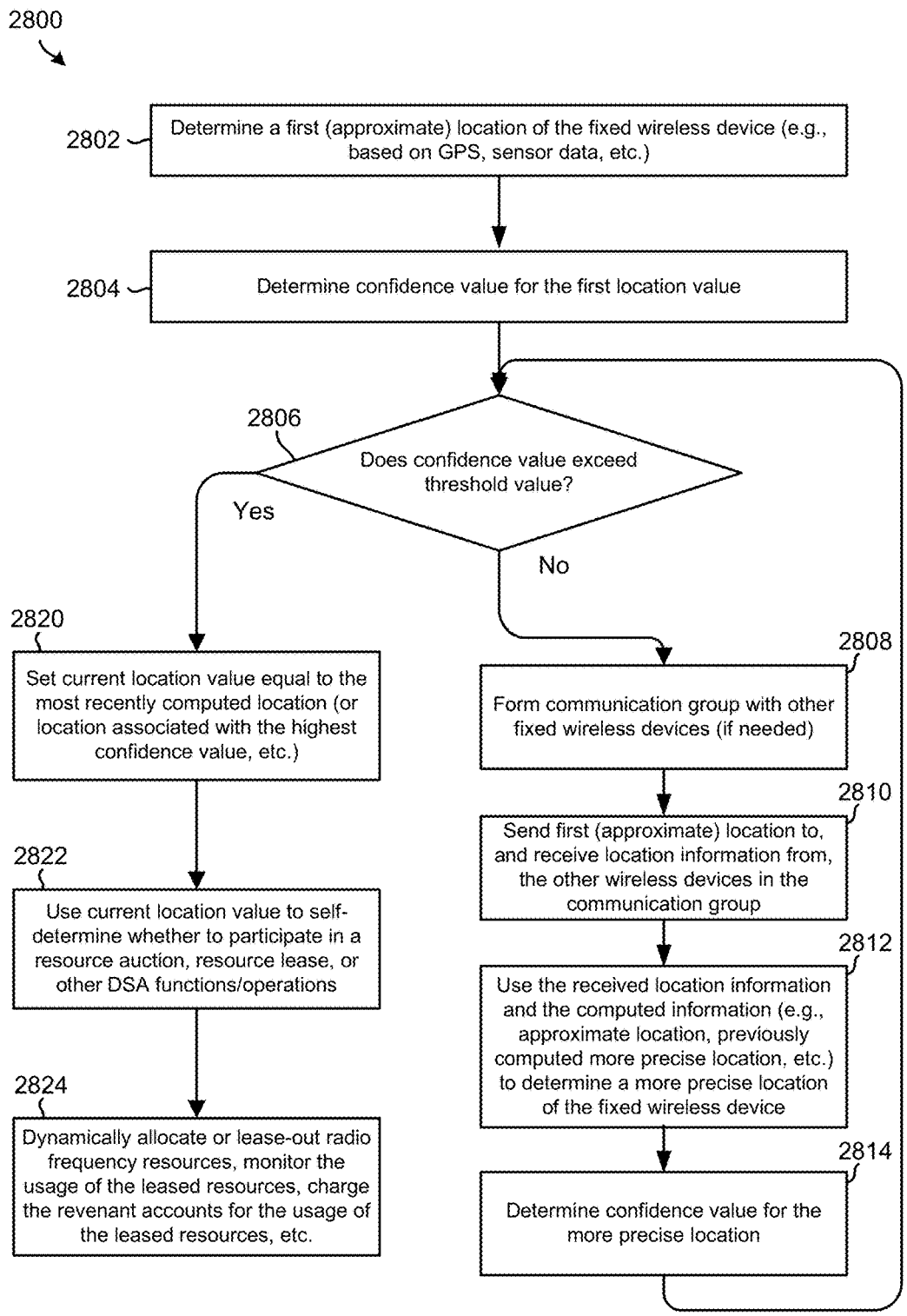
FIG. 28 is a process flow diagram illustrating a method of determining a more precise location of a wireless device and providing an eLBS in accordance with an embodiment.

FIG. 26 shows an example of the information flow between a plurality of FIDs once a FID becomes part of the network in a distributed or hybrid architecture. Specifically, in FIG. 26, the FID 2 is already part of the network and is aware of which leases it is involved with. Once FID 1 identifies itself with the network, FID2 can share the lease information with FID 1. The use of having lease information provided by FID 2 can involve improvements in the FID's location using eLBS for FID and determine which lease it may be included.

More specifically, FIG. 26 illustrates a FID self-configuration method 2600 for configuring a FID with appropriate leases in accordance with an embodiment. In the example illustrated in FIG. 26, method 2600 is performed by processing cores in a DSC/OAM 144 component and FID 182a, 182b components.

In operation block 2602, FID 2 182b indicates the lease information to FID 1 182a. In operation block 2604, an eLBS module of FID 1 182a determines a location for FID 1 182a. Such location includes, for example, latitude, longitude and/or altitude information corresponding to the location of FID 1 182a. In operation block 2606, a GIS module filters, based on the location of FID 1 182a determined by the eLBS module, the lease configuration information provided by FID 2 182b to identify application leases. FID 1 182a, in operation block 2608, completes self-configuration based on applicable leases identified by the GIS module. In operation block 2610, FID 1 182a informs DSC/OAM 144 of those applicable leases self-configured by FID 1 182a.

FIG. 34 is an expansion of FIG. 26 where the FID self-configures to be part of lease(s) as shown in FIG. 26 or shares the info with configuring entity as shown in FIG. 34. The use of having lease information provided by FID 2 can involve improvements in the FIDs location using eLBS for FID and determine which lease it may be included with and if it is allowed to begin transmitting if there are spectrum encumbrances like those imposed on CBSD.

FIG. 34 illustrates a FID self-configuration method 3400 for configuring a FID with appropriate leases in accordance with an embodiment. In the example illustrated in FIG. 34, method 3400 is performed by processing cores in a DSC/OAM 144 component and FID 182a, 182b components.

In operation block 3402, FID 2 182b indicates the lease information to FID 1 182a. In operation block 3404, an eLBS module of FID 1 182a determines a location for FID 1 182a. Such location includes, for example, latitude, longitude and/or altitude information corresponding to the location of FID 1 182a. In operation block 3406, a GIS module filters, based on the location of FID 1 182a determined by the eLBS module, the lease configuration information provided by FID 2 182b to identify applicable leases. FID 1 182a, in operation block 3408, informs DSC/OAM 144 of the identified applicable leases. DSC/OAM 144, in operation block 3410, provides configuration information for the identified applicable leases to FID 1 182a. FID 1 182a self-configures based on the provided configuration information for the identified applicable leases and, in operation block 3412, provides an indication of success and/or failure to DSC/OAM 144.

FIG. 35 illustrates a method 3500 of using eLBS information to enable self-realizing of a lease in accordance with an embodiment. In block 3502, a processor in a fixed wireless device may determine a first (approximate) location of the fixed wireless device (e.g., based on GPS, sensor data, etc.). In block 3504, the processor may determine a confidence value for the first (approximate) location value. In determination block 3506, the processor may determine whether the generated or determined confidence value exceeds a threshold value (e.g., an accuracy threshold, a confidence threshold, etc.).

In response to determining that the confidence value does not exceed the threshold value (i.e., determination block 3506="No"), in block 3508, the processor may form communication group with other wireless devices (if needed). In block 3510, the processor may send first (approximate) location to, and receive location information from, the other wireless devices in the communication group. In block 3512, the processor may use the received location information and the computed information (e.g., approximate location, previously computed more precise location, etc.) to determine a more precise location of the fixed wireless device. In block 3514, the processor may determine a new or updated confidence value for the more precise location. The processor may perform the operations in blocks 3506 through 3514 continuously or repeatedly until the desired level of accuracy is reached or until confidence value exceeds the threshold value.

In response to determining that the confidence value exceeds the threshold value (i.e., determination block 3506="Yes"), in block 3520, the processor may set current location value equal to the most recently computed location (or location associated with the highest confidence value, etc.). In block 3522, the processor may use current location value to self-determine whether to participate in a resource auction, resource lease, or other DSA functions/operations. In block 3524, the processor may dynamically allocate or lease-out radio frequency resources, monitor the usage of the leased resources, charge the revenant accounts for the usage of the leased resources, and perform other similar DSA operations to self-realize of telecommunication resource lease negotiated by the DSA system.

In an embodiment, using eLBS techniques (or the eLBS operations) may include a processor in the fixed wireless device collecting or receiving location information in the form of waypoints from a plurality of other devices. For example, the wireless device may receive a first waypoint from a first external device, a second waypoint from a second external device, a third waypoint from a third external device, and a fourth waypoint from a forth external device. The wireless device may use any combination of these received waypoints (e.g., first through fourth waypoints) in conjunction with stored and historical information (e.g., previously computed waypoints, movement information, etc.) to determine or compute its approximate and/or more precise location with a high degree of accuracy. In some embodiments, the wireless device may be configured to apply the received waypoints to Kalman filter (e.g., for processing via a Kalman filter component, etc.) in order to generate more accurate location information (e.g., a final location waypoint).

In some embodiments, the fixed wireless device may be coupled to a sensor hub, context hub, or a sensor network. The wireless device may be configured to perform advanced sensor fusion operations to generate location information (e.g., a location estimate set/value, waypoint, etc.), use a differential $RMS^2$ method (or any other method known in the art) compute confidence values, and compare the computed confidence values to one or more threshold values to determine whether there is a sufficiently high degree of confidence in the accuracy of the generated location information (e.g., location estimate set/value, final location waypoint, etc.). In some embodiments, the wireless device may be configured to compute a confidence value between 0.0 and 1.0 that identifies a confidence level in the accuracy of the measurement for each data field in the location estimation set (e.g., a confidence value for each of the latitude, longitude and altitude data fields, etc.). For example, confidence values of 0.90, 0.95, and 0.91 may indicate that the x, y, and z coordinates are accurate within 30 meters between 90 and 95 percent of the time.

In some embodiments, the fixed wireless device may be configured to perform normalization operations to normalize/synchronize the timing of the received location information (the "location information timing"). In some embodiments, this may be accomplished via a timing component or mechanism (a timer, system clock, processor cycles, etc.) in the device. The wireless device may use a common time value (or common timer, reference clock, etc.) to synchronize and/or coordinate the information included in the received waypoints. The wireless device may generate normalized waypoints that include normalized values and/or which are normalized, synchronized and/or updated to account for various delays and inconsistencies, including the propagation delay between the wireless device and the corresponding external device, the time difference between when the waypoint was captured in external device and when the waypoint received in the wireless device, the relative movements of the devices, communication pathway time delays, delays associated with processing the requests, etc.

In some embodiments, the fixed wireless device may be configured to associate or assign a time value to each normalized waypoint (e.g., by storing the waypoint relative to the time value in a map or table, etc.), and determine whether each normalized waypoint is valid. For example, wireless device may determine whether the time value associated is within a valid duration or whether the waypoint includes sufficiently accurate information (e.g., by determining whether a precision or confidence value associated with the waypoint exceeds a threshold value, etc.). In response to determining that a waypoint is valid, the wireless device may determine or compute one or more rankings for that waypoint, and associate and/or assign the rankings to the waypoint (by storing it as a field. In some embodiments, the wireless device may determine and assign an overall rank and a device-specific rank to each valid waypoint, and store the waypoints in memory (e.g., in a location database, etc.).

In some embodiments, the fixed wireless device may be configured to determine the number of stored waypoints that are suitable for use in determining the device's current location. For example, the wireless device may determine whether the memory stores four or more valid waypoints, whether the stored waypoints are associated with sufficiently high rankings, whether the stored waypoints identify four or more independent locations, whether the stored waypoints identify the locations of four or more external devices relative to the current location of the wireless device with a sufficiently high level of accuracy, etc. In response to determining that there are four or more suitable waypoints stored in memory, the wireless device may intelligently select the four most suitable waypoints (e.g., waypoints having the highest overall rank and/or device-specific rank, etc.), apply the selected waypoints as inputs to a kalman filter, and use the output of the kalman filter to generate location information that identifies the wireless device's current location with a high level of accuracy (e.g., within one meter in all directions, etc.).

Further embodiments may include a fixed wireless device (e.g., a femtocell device, a beacon device, etc.) that is configured to receive or obtain information from an internal or external geospatial system (e.g., an internal GPS receiver, etc.), and determine whether the information obtained via the geospatial system is sufficiently accurate (or whether it is able to determine its current location with a sufficiently high degree of precision, accuracy, or confidence based on the geospatial information).

In some embodiments, in response to determining that it is not able to establish a location fix (i.e., determine its current location with a sufficiently high degree of precision, accuracy, or confidence), the fixed wireless device may establish a communication group with other devices that are within proximity of the FWD (e.g., within 1 meter, 10 meters, 100 meters, or 1 KM of the device, etc.).

In some embodiments, in response to establishing the communication group and determining that it is unable to adequately establish a location fix based on the obtained geospatial information, the fixed wireless device (FWD) may begin collecting location information from the other devices in its communication group. For example, the FWD may request and receive GPS timing information from a mobile wireless device (MWD) or a second FWD (e.g., a cell tower antenna, an eNodeB, a small cell device, a femto cell device, a WiFi access node, or a beacon device, etc.) that is within 100 meters of the FWD.

The FWD may use any combination of the received, generated or collected location information (e.g., location fix, current location waypoint, GPS timing information, etc.) to compute a new three-dimensional location value. In some embodiments, computing the new three-dimensional location value may include generating a waypoint that includes a latitude value, a longitude value, and an altitude value. The FWD may use the computed three-dimensional location value to provide a location based service (e.g., emergency location service), to better or more accurately allocate telecommunication resources (e.g., as part of the dynamic spectrum allocation operations discussed above with reference to FIGS. 1F, 2A, 2B, 3, 4, 5, 6, 7, 18 and 24-26), to participate in the DSA operations, or to self-actuate, self-execute, self-engage, or self-participate in telecommunication resource lease.

Further embodiments may include methods of performing trilaterion operations for fixed wireless device using enhanced location based positions (location information such as the computed more precise location, final location waypoint, etc.) with wireless devices. A further embodiment may include the fixed wireless device determining the latitude, longitude and altitude of a eNodeB, micro cell, pico cell, small cell, beacon, access point or another wireless device in a GPS stressed environment.

Further embodiments may include components (e.g., DSA network components, fixed wireless devices, mobile devices, etc.) that are configured to use location determination solutions and techniques, such as an enhanced location based service (eLBS) solution, to accurately and efficiently identify and locate telecommunication resources in GPS stressed environments (e.g., as part of the DSA operations). The components may be further configured to use the location information to self-actuate, self-execute, self-engage, and/or self-participate in the DSA operations or telecommunication resource leases, even when then are located in a GPS stressed environment or otherwise unable to acquire satellite signals or navigation data.

In some embodiments, the fixed wireless device may be a DSA component that is included in a telecommunication network (e.g., lessor network, lessee network, etc.) that is participating in a resource auction or dynamic spectrum arbitrage. The fixed wireless device may be a fixed infrastructure device (FID), such as a femtocell, cell tower antenna, an eNodeB, a small cell device, a WiFi access node, a beacon device, citizen band service device (CBSD), etc. The approximate location may be a first waypoint having first precision value, and the more precise location may be a second waypoint having a second precision value that is greater than the first precision value.

In some embodiments, a self-realized lease may be an information structure or information unit that may be used to by a wireless device to determine its availability for inclusion in a lease (e.g., telecommunication resource lease, resource allocation agreement, etc.). For example, a self-realized lease may include location information (e.g., latitude, longitude and altitude) that allows a femtocell to determine that it should offer its functionality or resources (e.g., excess bandwidth, spectrum, etc.) for use by mobile devices that are in close proximity (e.g., for use as part of a DSA leasing agreement). A self-realized lease may also include information that allows the mobile device to determine that the resources of the femtocell are able for use (via a leasing agreement). A self-realized lease may also include information that allows a DSC (or an OAM that is receiving information from the DSC) to intelligently determine whether it should be included in, or excluded from, one or more leases.

In some embodiments, wireless device may be configured to communicate with a server computing device. For example, the wireless device may be configured to send received location information, sensor information (e.g., information collected from an accelerometer, a gyroscope, a magnetometer, a pressure sensor, a barometer, etc.), and information relating to a more precise location (e.g., more precise latitude, longitude, and altitude values, final location waypoint, etc.) to a server computing device. In response, the wireless device may receive updated location information from the server. The wireless device may re-compute the more precise location (or generate an updated final location waypoint) based on the updated location information received from the server.

In some embodiments, the wireless device may be configured to compute the more precise location information (or final location waypoint) by using horizontal data to determine a position relative to the Earth's surface, using vertical data to determine a height of the position relative to sea level, and generating three-dimensional location and position information based on the determined position and determined height. The wireless device may use the computed more precise location information or generated location and position information (e.g., in conjunction with the location information collected from the plurality of wireless devices) to determine or compute the more precise location information (or final location waypoint), and to provide a location based service (e.g., emergency location services, commercial location services, internal location services, lawful intercept location services, etc.) based on the more precise location information.

In some embodiments, the wireless device may be configured to determine whether the wireless device is able to acquire satellite signals and navigation data from a geospatial system. The wireless device may be configured to collect location information (e.g., by receiving a latitude coordinate, a longitude coordinate, and an altitude coordinate) from a plurality of wireless devices in its communication group in response to deter mining that it is not able to acquire satellite signals and/or navigation data from the geospatial system. The wireless device may compute the more precise location information (e.g., a final location waypoint that includes three-dimensional location and position information) for the wireless device based on the location information collected from the plurality of wireless devices.

In some embodiments, the wireless device may be configured to determine whether information obtained via a geospatial system of the wireless device is accurate. The wireless device may be configured to collect location information from a plurality of wireless devices in its communication group in response to determining that the information obtained via the geospatial system of the wireless device is not accurate. The wireless device may compute the more precise location information (or final location waypoint) based on the location information collected from the plurality of wireless devices, and use the computed more precise location information generated to provide the location based service.

In some embodiments, the wireless device may be configured to establish a first connection to a data network (in which the first connection is not a cellular data uplink transmission path), obtain location information for a current location of the wireless device (or initial location waypoint) via the first connection, determine a variance between the received location information and a wireless device determined location, determine whether the variance exceeds a threshold value, collect location information from a plurality of transceivers in the communication group in response to determining that the variance exceeds the threshold value, compute more precise location information (or final location waypoint) for the wireless device based on the location information collected from the plurality of transceivers, and use the more precise location information to provide the location based service.

In some embodiments, the wireless device may be configured to determine an initial position (or an initial location waypoint), generate at least one set of local position information (or a local location waypoint) based on locally determined location information, receive location information from one or more external location tracking systems, generate at least one set of external position information (or an external location waypoint) based on the location information received from the one or more external location tracking systems, receive distance information from multiple wireless devices in a communication group, generate at least one set of proximity position information (or a proximity waypoint) based on the distance information received from the multiple wireless devices in the communication group, generate a final location estimation set (or final location waypoint), and use the final location estimation set to provide a location based service. In some embodiments, the wireless device may be configured to generate the final location estimation set (or final location waypoint) to include a position value, a velocity value and an acceleration value. In some embodiments, the wireless device may generate the final location estimation set (or final location waypoint) based on at least one set of local position information (or local location waypoint), at least one set of external position information (or external location waypoint), at least one set of proximity position information (or proximity waypoint), and the initial position (or initial location waypoint).

In some embodiments, the wireless device may be configured to determine whether the wireless device is currently connected to a communications network, establish connections to a plurality of wireless devices to form a communication group in response to determining that the wireless device is not currently connected to the communications network, receive distance information from the plurality of wireless devices in the communication group, generate a location estimation set (or a local waypoint) based on the received distance information, and transmit the generated location estimate set to one or more of the plurality of wireless devices in the communication group for relaying to a network resource. In some embodiments, generating the location estimation set (or local waypoint) may include the wireless device calculating a current coordinate position of the wireless device based on a distance of the wireless device from each of the plurality of wireless devices in the communication group.

In some embodiments, the wireless device may be configured to determine or compute an initial position value (or an initial location waypoint), generate local position information (or a local location waypoint), generate external position information (or an external location waypoint) based on location information received from an external location tracking system, and generate proximity position information (or a proximity waypoint) based on distance information received from a second wireless device. The wireless device may generate the final location information (or final location waypoint) based on the determined initial position, the generated local position information, the generated external position information, and the generated proximity position information. The wireless device may use the generated final location information to provide a location based service.

In some embodiments, the wireless device may be configured to determine an initial location value (or an initial location waypoint) that identifies the current location of the wireless device, compute an initial location accuracy value for the determined initial location value, establish a communications group with a plurality of transceivers in response to determining that the computed initial location accuracy value exceeds a threshold value, receive (e.g., in response to establishing the communications group) location information from each of the plurality of transceivers in the communications group, determine a trilateration position value (or a trilateration waypoint) based on the location information received from each of the plurality of transceivers in the communications group, and compute a trilateration variance value based on the determined trilateration position value. The wireless device may determine a final location value (or final location waypoint) based on the determined initial location value, the computed initial location accuracy value, the determined trilateration position value, and the computed trilateration variance value. The wireless device may then use the final location value to provide the enhanced location based service.

In some embodiments, the wireless device may be configured to receive (e.g., in a processor of the wireless device via an antenna of the wireless device) a first set of externally determined location information (or a first external location waypoint) and a second set of externally determined location information (or a second external location waypoint) from one or more external location tracking systems. The wireless device may generate a best stride length estimate based on the first set of externally determined location information, the second set of externally determined location information, and the output of an accelerometer of the wireless device. The wireless device may generate a best altitude estimate based on output of a barometer of the wireless device and at least one of the first set of externally determined location information and the second set of externally determined location information. The wireless device may generate a best compass heading estimate based on output of a magnetometer of the wireless device, output of the accelerometer of the wireless device, and at least one of the first set of externally determined location information and the second set of externally determined location information. The wireless device may generate dead reckoning location information based on the best stride length estimate, the best altitude estimate, and the best compass heading estimate. The wireless device may calculate a best location estimate (or final location waypoint) based on the dead reckoning location information and a set of externally determined location information. The wireless device may use the best location estimate to provide a location based service in the wireless device.

In some embodiments, the wireless device may be configured to receive externally determined location information (or an external location waypoint), and generate a best stride length estimate based on the externally determined location information and accelerometer information. In some embodiments, the wireless device may generate the best altitude estimate based on the externally determined location information and barometer information. In some embodiments, the wireless device may generate the best compass heading estimate based on the externally determined location information and magnetometer information. In some embodiments, the wireless device may generate dead reckoning location information based on the best stride length estimate, the best altitude estimate, and the best compass heading estimate.

In some embodiments, the wireless device may be configured to determine its location via enhanced location based trilateration. For example, the wireless device may be configured to receive location information from one or more external devices. The received location information may include a waypoint from each of the one or more external devices. Each waypoint may include a coordinate value, an altitude value and a range value. The range value may include information identifying a distance from an external device to the wireless device. The wireless device may determine the validity of each of the received waypoints, perform normalization operations to normalize the received valid waypoints, assign an overall ranking to each of the normalized waypoints, assign a device-specific ranking to each of the normalized waypoints, and store the normalized waypoints in memory. The wireless device may select four waypoints from memory based on a combination of the overall ranking and the device-specific ranking associated with each waypoint. The wireless device may apply the four selected waypoints to a kalman filter to generate a final location waypoint (or final location information, final location estimation set, final location value, best location estimate, etc.). The wireless device may use the generated final location waypoint to provide a location based service.

In some embodiments, as part of determining the approximate location, the wireless device may estimate its position and/or generate a position estimate. In some embodiments, the position estimates may include latitude, longitude and elevation information that is accurate to within one (1) meter (and many times within one meter accuracy).

In some embodiments, the wireless device may be equipped with a "sensor fusion" system/component. The sensor fusion component may be configured to collect and use information from sensors in the wireless device to further improve the location position determinations. As such, the sensor fusion component may allow the device to better determine its approximate location and/or to generate a better position estimate (e.g., a more precise value, more accurate coordinates, etc.).

In some embodiments, the wireless device may be configured to perform advanced location based operations (e.g., advanced sensor fusion operations, etc.) to generate location information (e.g., a location estimate set/value), use a differential $RMS^2$ method (or any other method known in the art) compute confidence values, and compare the computed confidence values to one or more threshold values to determine whether there is a sufficiently high degree of confidence in the accuracy of the generated location information (e.g., location estimate set/value). In some embodiments, the wireless device may be configured to compute a confidence value between 0.0 and 1.0 that identifies a confidence level in the accuracy of the measurement for each data field in the location estimation set (e.g., a confidence value for each of the latitude, longitude and altitude data fields, etc.). For example, confidence values of 0.90, 0.95, and 0.91 may indicate that the x, y, and z coordinates are accurate within 30 meters between 90 and 95 percent of the time.

In some embodiments, the wireless device may be configured to compute a precision value that identifies, or which is indicative of, the repeatability factor of the computation/measurements over multiple measurements. The wireless device may use the precision value to determine how often a reporting device reports the same position/location (i.e., based on evaluating multiple reports indicating that the device has not moved more than X meters, etc.). This may in turn be used to determine the precision of the measurement (e.g., within 1 meter, etc.). The precision value may also be used to determine the likelihood that repeating the computation (e.g., using the same inputs or input sources) will result in substantially the same values.

In some embodiments, the wireless device may be configured to perform normalization operations to normalize/synchronize the timing of the received location information (the "location information timing"). In some embodiments, this may be accomplished via a timing component or mechanism (a timer, system clock, processor cycles, etc.) in the wireless device. The wireless device may use a common time value (or common timer, reference clock, etc.) to synchronize and/or coordinate the information included in the received waypoints. The wireless device may generate normalized waypoints that include normalized values and/or which are normalized, synchronized and/or updated to account for various delays and inconsistencies, including the propagation delay between the wireless device and the corresponding external device, the time difference between when the waypoint was captured in external device and when the waypoint received in the wireless device, the relative movements of the devices, communication pathway time delays, delays associated with processing the requests, etc.

In some embodiments, the wireless device may be configured to associate or assign a time value to each normalized waypoint (e.g., by storing the waypoint relative to the time value in a map or table, etc.), and determine whether each normalized waypoint is valid. For example, wireless device may determine whether the time value associated is within a valid duration or whether the waypoint includes sufficiently accurate information (e.g., by determining whether a precision or confidence value associated with the waypoint exceeds a threshold value, etc.). In response to determining that a waypoint is valid, the wireless device may determine or compute one or more rankings for that waypoint, and associate and/or assign the rankings to the waypoint (by storing it as a field. In some embodiments, the wireless device may determine and assign an overall rank and a device-specific rank to each valid waypoint, and store the waypoints in memory (e.g., in a location database, etc.).

In some embodiments, the wireless device may be configured to determine the number of stored waypoints that are suitable for use in determining the device's current location. For example, the wireless device may determine whether the memory stores four or more valid waypoints, whether the stored waypoints are associated with sufficiently high rankings, whether the stored waypoints identify four or more independent locations, whether the stored waypoints identify the locations of four or more external devices relative to the current location of the wireless device with a sufficiently high level of accuracy, etc. In response to determining that there are four or more suitable waypoints stored in memory, the wireless device may intelligently select the four most suitable waypoints (e.g., waypoints having the highest overall rank and/or device-specific rank, etc.), apply the selected waypoints as inputs to a kalman filter, and use the output of the kalman filter to generate location information that identifies the wireless device's current location with a high level of accuracy (e.g., within one meter in all directions, etc.).

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for using an enhanced location based service (eLBS) in a fixed wireless device, comprising:
   determining, via a processor of the fixed wireless device, a location of the fixed wireless device based on location information received from one or more other devices, comprising:
      determining whether the fixed wireless device is able to acquire satellite signals and navigation data from a geospatial system;
      collecting location information from one or more devices in a communication group in response to determining that the fixed wireless device is not able to acquire satellite signals or navigation data from the geospatial system; and
      computing more precise location information for the fixed wireless device based on the location information collected from the one or more devices in the communication group; and
   dynamically determining, via the processor, whether to include the fixed wireless device in a telecommunication resource lease based on the determined location.

2. The method of claim 1, wherein determining the location of the fixed wireless device based on the location information received from the one or more other devices further comprises:
   determining an approximate location of the fixed wireless device;
   grouping the fixed wireless device with the one or more other devices based on their proximity to the fixed wireless device to form the communication group;
   sending the determined approximate location of the fixed wireless device to the one or more other devices in the communication group; and
   receiving the location information in the fixed wireless device from the one or more other devices.

3. The method of claim 1, wherein determining the location of the fixed wireless device based on the location information received from the one or more other devices further comprises determining a three-dimensional location of the fixed wireless device based on a latitude coordinate value, a longitude coordinate value, and an altitude coordinate value received from each of the one or more other devices.

4. The method of claim 1, wherein the fixed wireless device is one of a small cell, a femtocell, a WiFi access node, or a beacon.

5. The method of claim 1, wherein dynamically determining whether to include the fixed wireless device in the telecommunication resource lease based on the determined location comprises determining whether to activate a service of the fixed wireless device based on the determined location.

6. The method of claim 1, wherein the fixed wireless device is included in a first network, and dynamically determining whether to include the fixed wireless device in the telecommunication resource lease based on the determined location comprises dynamically determining whether the fixed wireless device should allocate radio frequency resources for use by wireless devices that subscribe to a second network based on the determined location.

7. The method of claim 1, wherein determining the location of the fixed wireless device based on the location information received from the one or more other devices further comprises:
- determining, via the processor, whether information obtained via the geospatial system is accurate; and
- collecting location information from one or more devices in the communication group in response to determining that the information obtained via the geospatial system is not accurate.

8. The method of claim 1, wherein determining the location of the fixed wireless device based on the location information received from the one or more other devices further comprises:
- obtaining location information for a current location of the fixed wireless device via a first connection to a data network, wherein the first connection is not a cellular data uplink transmission path;
- determining a variance between the received location information and a fixed wireless device determined location;
- determining whether the variance exceeds a threshold value; and
- collecting the location information from a plurality of devices in the communication group in response to determining that the variance exceeds the threshold value.

9. The method of claim 1, further comprising:
- allocating radio frequency resources of the fixed wireless device for use by devices that subscribe to a different network in response to determining that the fixed wireless device should be included in the telecommunication resource lease based on the determined location.

10. A fixed wireless device, comprising:
- a processor configured with processor-executable instructions to perform operations comprising:
  - determining a location of the fixed wireless device based on location information received from one or more other devices, comprising:
    - determining whether the fixed wireless device is able to acquire satellite signals and navigation data from a geospatial system;
    - collecting location information from one or more devices in a communication group in response to determining that the fixed wireless device is not able to acquire satellite signals or navigation data from the geospatial system; and
    - computing more precise location information for the fixed wireless device based on the location information collected from the one or more devices in the communication group; and
  - dynamically determining whether to include the fixed wireless device in a telecommunication resource lease based on the determined location.

11. The fixed wireless device of claim 10, wherein the processor is configured with processor-executable instructions to perform operations such that determining the location of the fixed wireless device based on the location information received from the one or more other devices further comprises:
- determining an approximate location of the fixed wireless device;
- grouping the fixed wireless device with the one or more other devices based on their proximity to the fixed wireless device to form the communication group;
- sending the determined approximate location of the fixed wireless device to the one or more other devices in the communication group; and
- receiving the location information in the fixed wireless device from the one or more other devices.

12. The fixed wireless device of claim 10, wherein the processor is configured with processor-executable instructions to perform operations such that determining the location of the fixed wireless device based on the location information received from the one or more other devices comprises determining a three-dimensional location of the fixed wireless device based on a latitude coordinate value, a longitude coordinate value, and an altitude coordinate value received from each of the one or more other devices.

13. The fixed wireless device of claim 10, wherein the fixed wireless device is one of a small cell, a femtocell, a WiFi access node, or a beacon.

14. The fixed wireless device of claim 10, wherein the processor is configured with processor-executable instructions to perform operations such that dynamically determining whether to include the fixed wireless device in the telecommunication resource lease based on the determined location comprises determining whether to activate a service of the fixed wireless device based on the determined location.

15. The fixed wireless device of claim 10, wherein:
- the fixed wireless device is included in a first network; and
- the processor is configured with processor-executable instructions to perform operations such that dynamically determining whether to include the fixed wireless device in the telecommunication resource lease based on the determined location comprises dynamically determining whether the fixed wireless device should allocate radio frequency resources for use by wireless devices that subscribe to a second network based on the determined location.

16. The fixed wireless device of claim 10, wherein the processor is configured with processor-executable instructions to perform operations such that determining the location of the fixed wireless device based on the location information received from the one or more other devices further comprises:
- determining whether information obtained via the geospatial system is accurate; and
- collecting location information from one or more devices in the communication group in response to determining that the information obtained via the geospatial system is not accurate.

17. The fixed wireless device of claim 10, wherein the processor is configured with processor-executable instructions to perform operations such that determining the location of the fixed wireless device based on the location information received from the one or more other devices further comprises:
- obtaining location information for a current location of the fixed wireless device via a first connection to a data network, wherein the first connection is not a cellular data uplink transmission path;
- determining a variance between the received location information and a fixed wireless device determined location;
- determining whether the variance exceeds a threshold value; and
- collecting the location information from a plurality of devices in the communication group in response to determining that the variance exceeds the threshold value.

18. The fixed wireless device of claim 10, wherein the processor is configured with processor-executable instructions to perform operations further comprising allocating radio frequency resources of the fixed wireless device for use by devices that subscribe to a different network in response to determining that the fixed wireless device should be included in the telecommunication resource lease based on the determined location.

19. A non-transitory computer readable storage medium having stored thereon processor-executable software instructions configured to cause a computing device processor in a fixed wireless device to perform operations comprising:
   determining a location of the fixed wireless device based on location information received from one or more other devices, comprising:
      determining whether the fixed wireless device is able to acquire satellite signals and navigation data from a geospatial system;
      collecting location information from one or more devices in a communication group in response to determining that the fixed wireless device is not able to acquire satellite signals or navigation data from the geospatial system; and
      computing more precise location information for the fixed wireless device based on the location information collected from the one or more devices in the communication group; and
   dynamically determining whether to include the fixed wireless device in a telecommunication resource lease based on the determined location.

20. The non-transitory computer readable storage medium of claim 19, wherein the stored processor-executable instructions are configured to cause a processor to perform operations such that determining the location of the fixed wireless device based on the location information received from the one or more other devices comprises:
   determining an approximate location of the fixed wireless device;
   grouping the fixed wireless device with the one or more other devices based on their proximity to the fixed wireless device to form the communication group;
   sending the determined approximate location of the fixed wireless device to the one or more other devices in the communication group; and
   receiving the location information in the fixed wireless device from the one or more other devices.

21. The non-transitory computer readable storage medium of claim 19, wherein the stored processor-executable instructions are configured to cause a processor to perform operations such that determining the location of the fixed wireless device based on the location information received from the one or more other devices comprises determining a three-dimensional location of the fixed wireless device based on a latitude coordinate value, a longitude coordinate value, and an altitude coordinate value received from each of the one or more other devices.

22. The non-transitory computer readable storage medium of claim 19, wherein the fixed wireless device is one of a small cell, a femtocell, a WiFi access node, or a beacon.

23. The non-transitory computer readable storage medium of claim 19, wherein the stored processor-executable instructions are configured to cause a processor to perform operations such that dynamically determining whether to include the fixed wireless device in the telecommunication resource lease based on the determined location comprises determining whether to activate a service of the fixed wireless device based on the determined location.

24. The non-transitory computer readable storage medium of claim 19, wherein the stored processor-executable instructions are configured to cause a processor to perform operations such that the fixed wireless device is included in a first network, and dynamically determining whether to include the fixed wireless device in the telecommunication resource lease based on the determined location comprises dynamically determining whether the fixed wireless device should allocate radio frequency resources for use by wireless devices that subscribe to a second network based on the determined location.

25. The non-transitory computer readable storage medium of claim 19, wherein the stored processor-executable instructions are configured to cause a processor to perform operations such that determining the location of the fixed wireless device based on the location information received from the one or more other devices further comprises:
   determining whether information obtained via the geospatial system is accurate; and
   collecting location information from one or more devices in a communication group in response to determining that the information obtained via the geospatial system is not accurate.

26. The non-transitory computer readable storage medium of claim 19, wherein the stored processor-executable instructions are configured to cause a processor to perform operations such that determining the location of the fixed wireless device based on the location information received from the one or more other devices comprises:
   obtaining location information for a current location of the fixed wireless device via a first connection to a data network, wherein the first connection is not a cellular data uplink transmission path;
   determining a variance between the received location information and a fixed wireless device determined location;
   determining whether the variance exceeds a threshold value; and
   collecting the location information from a plurality of devices in the communication group in response to determining that the variance exceeds the threshold value.

27. The non-transitory computer readable storage medium of claim 19, wherein the stored processor-executable instructions are configured to cause a processor to perform operations further comprising allocating radio frequency resources of the fixed wireless device for use by devices that subscribe to a different network in response to determining that the fixed wireless device should be included in the telecommunication resource lease based on the determined location.

* * * * *